United States Patent Office 3,635,961
Patented Jan. 18, 1972

3,635,961
CEPHALOSPORINS AND PROCESS FOR THEIR PREPARATION
Kenneth Butler, Waterford, Conn., assignor to Pfizer, Inc., New York, N.Y.
No Drawing. Filed Mar. 27, 1968, Ser. No. 716,305
Int. Cl. C07d 99/24
U.S. Cl. 260—243 C                 13 Claims

ABSTRACT OF THE DISCLOSURE

Esters of α-carboxy- and α-carbothiolic-α-aryl acetyl derivatives of: (a) 7-aminocephalosporanic acid; (b) desacetyl 7-aminocephalosporanic acid; (c) desacetoxy 7-aminocephalosporanic acid; and (d) the tertiary amine derivatives of 7-aminocephalosporanic acid; the corresponding acids derived therefrom, and the salts thereof, which compounds exhibit antimicrobial activity, and methods for their preparation.

BACKGROUND OF THE INVENTION

This invention relates to a series of novel antibiotic compounds which are active against gram-positive and gram-negative microorganisms and to methods for their preparation. More particularly, it relates to novel esters of α-carboxy- and α-carbothiolic α-aryl acetyl derivatives of the amino acids: (a) 7-aminocephalosporanic acid; (b) desacetyl 7-aminocephalosporanic acid; (c) desacetoxy 7-aminocephalosporanic acid; and (d) the tertiary amine derivatives of 7-aminocephalosporanic acid, and to methods for their preparation by acylation of the appropriate amine with an aryl carboxy ketene ester or an aryl carbothiolic ketene phenyl ester. It also relates to the salts and acids derived from the esters and to the salts of said acids.

The acylation of 7-aminocephalosporanic acid and the closely related acids mentioned above by means of simple or mixed anhydrides and acid halides is well known in the art (Shull et al., U.S. Pat. 3,173,916; Flynn, U.S. Pat. 3,270,009; Belgian Pat. 696,026). Although the use of ketenes as acylating agents is well known in the art, the acylation of 7-aminocephalosporanic acid and the above mentioned closely related acids by such agents has not been reported.

SUMMARY OF THE INVENTION

It has now been found that a series of novel esters of 7-aminocephalosporanic acid and of the closely related derivatives thereof mentioned above can readily and conveniently be prepared by the acylation of these acids with esters of aryl carboxy ketenes and of aryl carbothiolic ketenes. The products are anti-bacterial agents. Prior art methods for introducing α-carboxy-α-aryl acetyl groups into amino compounds such as, for example, 6-aminopenicillanic acid, have made use of the acid anhydrides, mixed or simple, and acid halides of aryl malonic acids. The use of such acylating agents requires extreme caution during reaction and recovery steps in order to obtain satisfactory yields and avoid decarboxylation of the α-carboxy group. The acylating agents used in the present invention, on the other hand, react smoothly and rapidly with amines such as 7-aminocephalosporanic acid, and derivatives thereof mentioned above, at low temperatures and produce no undesirable by-products.

The novel products of this invention are represented by the formula:

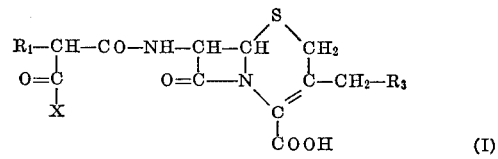

wherein $R_3$ is selected from the group consisting of hydrogen, hydroxy, acetoxy and tertiary amino; $R_1$ is an aryl group and is selected from the group consisting of thienyl, furyl, pyridyl, phenyl and substituted phenyl wherein the substituent is selected from the group consisting of (lower) alkyl, chloro, bromo, (lower) alkoxy, di(lower)alkylamino and trifluoromethyl; and X is selected from the group consisting of —OR$_2$ and —SR$_7$ wherein $R_2$ is selected from the group consisting of:

hydrogen
phenyl
substituted phenyl wherein the substituent is selected from the group consisting of at least one of chloro, bromo, fluoro, lower alkyl, lower alkoxy, lower alkanoyl, carbo (lower)alkoxy, nitro, and di(lower)alkyl amino;
furyl
quinolyl
methyl substituted quinolyl
phenazinyl
(1,3-benzodioxolyl)
3-(2-methyl-4-pyronyl)
3-(4-pyronyl) and
N-(methylpyridyl);

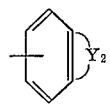

wherein $Y_2$ is selected from the group consisting of:

—CH=CH—O—
—CH=CH—S—
—CH$_2$—CH$_2$—S—
—CH=N—CH=CH—
—CH=CH—CH=CH—
—C(O)—CH=CH—C(O)—
—C(O)—C(O)—CH=CH— and

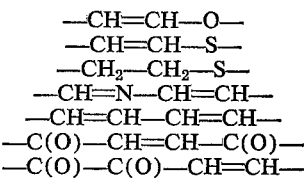

wherein Z is lower alkylene and is selected from the group consisting of

—(CH$_2$)$_3$— and —(CH$_2$)$_4$— and substituted derivatives thereof wherein the substituent is selected from the group consisting of methyl, chloro and bromo;

benzyl and
substituted benzyl wherein the substituent is selected from the group consisting of chloro, bromo, fluoro, lower alkyl, lower alkoxy, lower alkanoyl, carbo(lower)alkoxy, nitro, and di(lower)alkylamino;
phthalimidomethyl
benzohydryl trityl
cholesteryl;
alkenyl having up to 8 carbon atoms;
alkynyl having up to 8 carbon atoms;
(1-indanyl)methyl
(2-indanyl)methyl
furylmethyl
pyridylmethyl
(2-pyrrolidono)methyl
(4-imidazolyl)methyl
[2,2-di(lower alkyl)-1,3-dioxolon-4-yl]methyl
cycloalkyl and (lower alkyl)substituted cycloalkyl having from 3 to 7 carbon atoms in the cycloalkyl moiety;
bicyclo [4.4.0] decyl
alkyl and substituted lower alkyl wherein the substituent is selected from the group consisting of at least one of:

chloro
bromo
fluoro
nitro
carbo(lower alkoxy)
lower alkanoyl
lower alkoxy and
cyano;
(lower)alkylmercapto
(lower)alkylsulfinyl
(lower)alkylsulfonyl
ac-indanyl and substituted derivatives thereof wherein the substituent is selected from the group consisting of methyl, chloro and bromo;
ac-tetrahydronaphthyl and substituted derivatives thereof wherein the substituent is selected from the group consisting of methyl, chloro and bromo;

—CH$_2$—CH$_2$—NR$_5$R$_6$
—CH$_2$—CH$_2$—CH$_2$—NR$_5$R$_6$
—CH$_2$—CH(CH$_3$)—NR$_5$R$_6$ and
—CH(CH$_3$)—CH$_2$—NR$_5$R$_6$ wherein —NR$_5$R$_6$ is selected from the group consisting of —NH(lower alkanoyl),

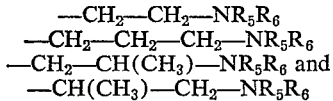

wherein the (lower alkyl) groups may be alike or different;
—N(lower alkyl)anilino and substituted —N(lower alkyl)anilino wherein the substituent is selected from the group consisting of chloro, bromo, lower alkyl and lower alkoxy; and —(lower alkylene)—Y$_1$ wherein (lower alkylene) contains from 1 to 3 carbon atoms; and Y$_1$ is selected from the group consisting of:

azetidino
aziridino
pyrrolidino
piperidino
morpholino
thiomorpholino
N-(lower alkyl)piperazino
pyrrolo
imidazolo
2-imidazolino
2,5-dimethylpyrrolidino
1,4,5,6-tetrahydropyrimidino
4-methylpiperidino and
2,6-dimethylpiperidino;

and R$_7$ is selected from the group consisting of phenyl and mono-, di-, and tri-substituted phenyl wherein the substituent is selected from the group consisting of at least one of chloro, bromo, fluoro, lower alkyl, lower alkoxy and trifluoromethyl; and hydrogen.

Of the lower alkyl, lower alkoxy, lower alkanoyl and carbo(lower)alkoxy groups those having from one to four carbon atoms in the alkyl, alkoxy and alkanoyl moieties are preferred since the reactants bearing such groups are more readily available than are those required for such groups having a greater number of carbon atoms.

The tertiary amino group —(R$_3$)— includes tri(lower alkyl)amines and heterocyclic tertiary bases, such as pyridine and substituted pyridines, e.g. nicotine, 2-aminopyridine, nicotinamide, 2,4,6-trimethylpyridine, 3-hydroxypyridine, isonicontinic acid, picolinic acid, pyrimidine, sulfadiazine, sulfathiazole and sulfapyridine. Additionally, other substituted pyridines, such as 2-hydroxymethylpyridine, 2 - amino-6-methylpyridine, nicotinic acid, 3-acetylpyridine, pyridine-2,3 - dicarboxylic acid and quinoline can also be used to produce related cephalosporin C$_A$ compounds. The point of attachment of the tertiary amine group (R$_3$, Formula III) is the N atom. The cephalosporin C$_A$ derivatives are believed to exist as zwitterions.

Also included within the scope of this invention are acids (Formula I, X=—OH or —SH) obtained by hydrolysis of Formula I esters and the pharmaceutically acceptable salts of the novel compounds of Formula I and the acids thereof, in which one or both acid groups are involved in salt formation. Salts such as the sodium, potassium, calcium, magnesium, ammonium and substituted ammonium salts, e.g. procaine, dibenzylamine, N,N'-dibenzylethylenediamine, N,N'-bis(dehydroabietyl)ethylenediamine, 1-ephenamine, N-ethylpiperidine, N-benzyl-β-phenethylamine, trialkylamines, including triethylamine, as well as salts with other amines which have been used to form salts with benzylpenicillin are useful for the preparation of pharmaceutically elegant compositions of the valuable antibiotics described herein wherein R$_3$ is other than tertiary amino.

Also included are the pharmaceutically acceptable acid salts of the compounds of Formula I wherin R$_3$ is tertiary amino with acids such as hydrochloric, hydrobromic, nitric, sulfuric, phosphoric, naphthalenesulfonic and p-toluenesulfonic acids.

The novel compounds of this invention contain the common structural feature, the Δ$^3$-cephem nucleus, a bicyclic ring system comprising a fused β-lactam ring in the 2,3-position of a 5,6-dihydro-2H-1,3-thiazine ring, and an N-acyl amino group in the 7-position of the precursor nuclei. They differ in the —CH$_2$R$_3$ moiety in the 3-position (Formulae II–V) below.

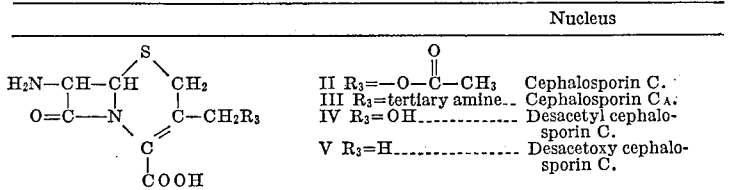

| | Nucleus |
|---|---|
| II R$_3$=—O—C(=O)—CH$_3$ | Cephalosporin C. |
| III R$_3$=tertiary amine | Cephalosporin C$_A$. |
| IV R$_3$=OH | Desacetyl cephalosporin C. |
| V R$_3$=H | Desacetoxy cephalosporin C. |

For convenience, the novel compounds of Formula I will be broadly referred to as cephalosporins. For more precise identification they are named by reference to both the particular R$_1$—CH—(COX)— moiety attached to the —CONH— group (Formula I) at the 7-position and to the specific nucleus present. Thus, when the following acyl moiety C$_6$H$_5$—CH—(COOCH$_3$)—CO— is attached to the nucleus having Formula II, the compound is named α-carbomethoxy benzylcephalosporin C. The cephalosporins derived from the nuclei having Formulae III–V are named as derivatives of the cephalosporin C$_A$, desacetyl cephalosporin C, and desacetoxycephalosporin C series, respectively.

In the case of the cephalosporin C$_A$ series, a tertiary amino compound replaces the acetoxy group in the 3-position of cephalosporin C. The $C_A$ series is named (using pyridine as exemplary of the tertiary amine) as follows: α-carbomethoxybenzyl pyridine cephalosporin $C_A$.

They can also be named as derivatives of $\Delta^3$-cephem (Morin et al., J. Am. Chem. Soc. 84, 3400, 1962). The above mentioned cephalosprin C compound then becomes 3 - acetoxymethyl - 4 - carboxy-7-(α-carbomethoxy-α-phenyl)acetamido-$\Delta^3$-cephem. The corresponding desacetyl cephalosporin C, desacetoxy cephalosporin C, and cephalosporin $C_A$ compounds are thus referred to as:

3-hydroxymethyl-4-carboxy-7-(α-carbomethoxy-α-phenyl)acetamido-$\Delta^3$-cephem;
3-methyl-4-carboxy-7-(α-carbomethoxy-α-phenyl)acetamido-$\Delta^3$-cephem; and
3-pyridinomethyl-4-carboxy-7-(α-carbomethoxy-α-phenyl acetamido-$\Delta^3$-cephem, respectively.

For convenience and simplicity, however, these novel compounds will be named as analogs of cephalosporin C and its closely related derivatives.

DETAILED DESCRIPTION OF THE INVENTION

The acylation of 7-aminocephalosporanic acid (II) and the above-mentioned closely related compounds (III–V) is conducted at a temperature of from about −70° C. to about 50° C. and preferably at a temperature of from about 0° C. to about 30° C. The reaction period is generally from a few minutes up to about 5 hours. A reaction-inert solvent such as ethyl acetate, dioxane, tetrahydrofuran, methyl isobutyl ketone, chloroform or methylene chloride is generally used to facilitate stirring and temperature control. It has been found especially convenient to first form the arylcarboxy or arylcarbothiol ketene ester as described below and to use the reaction mixture, without isolation of the ketene ester, directly in the amine acylation reaction. In such instances an organic base, i.e. a tertiary amine such as triethylamine or other trialkylamine, preferably a tri(lower alkyl)amine, is used to remove the hydrogen halide produced in formation of the ketene ester. From a practical standpoint, the 7-aminocephalosporanic acid or related compound is used as its triethylamine salt. For this reason, methylene chloride is a preferred solvent since the triethylamine salt is readily soluble therein. The sodium or potassium salts of the amino acid reactant can also be used but the preferred salt is the triethylamine salt because of its greater solubility in the solvent systems used. An excess of the amine to be acylated, can, of course, be used as acid acceptor but is generally avoided, not only for economic reasons but also to prevent possible ammonolysis of the ester group. The reaction is desirably conducted under an atmosphere of nitrogen.

The N-acylation reaction can also be conducted in neutral or alkaline aqueous solution by taking advantage of the slower rate of reaction of the arylcarboxy or arylcarbothiol ketene esters with water at neutral or alkaline pH levels relative to the rate of reaction with the amino group. The reaction is conducted at temperatures ranging from just about the freezing point of the aqueous system to about 50° C. and preferably at from 0° C. to about 20° C. To permit attainment of low temperatures and to facilitate reaction, it is advantageous to employ a mixed solvent system, i.e. water plus a water miscible reaction-inert organic solvent such as dioxane, acetone or tetrahydrofuran. The ketene ester is, of course, desirably used as a solution in the same reaction-inert solvent and is preferably added to the aqueous solution of the 7-aminocephalosporanic acid or other herein mentioned amino acid reactant.

An alternative method for producing the compounds of Formula I wherein $R_3$ is other than acetoxy comprises conversion of the appropriate cephalosporin C compound (Formula I, $R_3$=acetoxy) to the desired cephalosporin wherein $R_3$ is hydrogen, hydroxy or tertiary amino group by known methods. The cephalosporin $C_A$ series of compounds, for example, are readily obtained by treating the corresponding cephalosporin C with a tertiary amine of the type described herein according to the procedures described in Belgian Pat. 593,777 published Nov. 30, 1960, or in U.S. Pat. 3,217,000 issued Nov. 9, 1965. This comprises reacting the cephalosporin C compound with a 3 to 10 molar excess of the chosen tertiary amine at a pH of about 3–8.5 in aqueous solution at a temperature of from about 40°–100° C. for a period of 4 to 8 hours. The desacetyl cephalosporin C compounds are produced by treating the cephalosporin C compound with citrus acetylestrase in an aqueous buffer at pH 6.5–7 for several hours according to the procedures described by Jeffery et al., Biochemical Journal 81, 591–6 (1961) and U.S. Pat. 3,117,126, issued Jan. 7, 1964.

The desacetoxy cephalosporin C compounds are prepared by the procedures described by Morin et al. in U.S. Pats. 3,129,234 and 3,275,626 issued Apr. 14, 1964 and Sept. 27, 1966, respectively. The first method comprises catalytic hydrogenation of the appropriate cephalosporin C compounds in the presence of palladinized-charcoal. The second procedure involves rearrangement of the appropriate penicillin derivative to the desacetoxy cephalosporin C compound by first converting the penicillin to its sulfoxide derivative by reaction with an organic peracid or other source of active oxygen in aqueous solution at room temperature. The sulfoxide is then heated in the presence of a strong acid at a temperature of about 100° to 175° C. for a period of up to one hour. The penicillin compounds are obtained by acylating 6-aminopenicillanic acid with an aryl carboxy ketene ester, an aryl carbothiolic ketene ester or an active derivative of the desired aryl malonic acid in the same manner as is described herein for the acylation of 7-aminocephalosporanic acid. A number of α-carboxy-3-thienylmethyl penicillins described in the art (U.S. Pat. 3,142,673, issued July 28, 1964; U.S. Pat. 3,282,926, issued Nov. 1, 1966) are useful for producing the corresponding desacetoxy cephalosporin C compounds.

The precursor amino acid of Formula II is obtained by digestion of the naturally produced cephalosporin C compound with a mineral acid in the absence of light according to the procedure of Belgian Pat. 593,777. An alternative, and preferred, procedure for producing 7-aminocephalosporanic acid (II) comprises the reaction of cephalosporin C with nitrosyl chloride in an hydrous formic acid at 20°–30° C. according to the procedure described in U.S. Pat. 3,188,311 isused Jan. 8, 1965. The known precursors of Formulae III–V are then obtained from II by the methods described above.

The requisite acrylcarboxyl- and arylcarbothiolic-ketene esters are produced by reaction of the appropriate aryl halocarbonyl ketene with the desired alcohol or thiophenol. The reaction is conducted on a 1:1 molar ratio at a temperature of from about −70° C. to about 30° C. when conversion of the arylhalocarbonyl ketene to a ketene ester is desired. A reaction-inert solvent, such as ethyl ether, methyl ether, dioxane, methylene chloride, chloroform, is desirably used to permit better mixing and control of the reaction. The use of greater than a 1:1 molar ratio of arylhalocarbonyl ketene to alcohol or thiophenol or temperatures above 30° C. produces malonic acid diesters. For example, when two moles of alcohol is used per mole of arylhalocarbonyl ketene the corresponding diester of the arylmalonic acid is produced. Isolation of the intermediate ester is not necessary. A tertiary amine may be used as acid acceptor to remove the hydrogen halide produced during formation of the ester. The reaction mixture is used desirably in the acylation reaction without isolation of the ketene ester as is mentioned above.

The arylchloro (and bromo) carbonyl ketenes are obtained by reaction of an arylmalonic acid with a halogenating agent selected from the group consisting of $P(X)_5$, $P(X)_3$, $PO(X)_3$ and $SO(X)_2$ wherein X is as defined above at temperatures ranging from about 0° C. to about 50° C. for periods ranging from about one hour to about 10 hours. The reaction is conducted in the presence of a solvent system, preferably a reaction-inert solvent system. Suitable solvents are dialkyl ethers, e.g. diethyl ether, dipropyl ether, mono- and dimethyl ethers of ethylene glycol and propylene glycol, methylene chloride and chloroform.

The reaction period is, of course, dependent upon the reaction temperature and the nature of the reactants. However, for a given combination of reactants, the lower temperatures require longer reaction periods than do higher temperatures.

The molar proportions of reactants, i.e. arylmalonic acid and halogenating agent, can vary widely, e.g. up to 1:10 or higher, but for satisfactory yields should be at least stoichiometric. In actual practice the stoichiometric ratio of reactants is preferred.

The reactants may be added all at once or separately; if separately, the order of addition is not critical. However, it appears that the reaction is smoother and subject to fewer side-reactions, as evidenced by the color of the reaction mixture, particularly upon distillation, when the arylmalonic acid is added to the halogenating agent. The reaction mixture, under such conditions, generally progresses from a yellow to a red color. The reaction mixture on reverse addition, i.e. the addition of halogenating agent to the arylmalonic acid, progresses from yellow to black.

The arylhalocarbonyl ketene products are isolated from the reaction by distillation in vacuo. Because of their great reactivity they are generally stored under a nitrogen atmosphere at low temperatures and in the absence of light.

The cephalosporin products are isolated by conventional methods. A typical method, for example, comprises evaporating the reaction mixture to dryness under reduced pressure, dissolving the residue in citrate buffer (pH 5.5) and extracting the product therefrom with chloroform. The chloroform extracts are washed with citrate buffer (pH 5.5), dried with anhydrous sodium sulfate and evaporated to dryness. In another method, which is of value for the isolation of acylation products poorly soluble in methylene chloride, or chloroform, the above method is followed but using n-butanol as extracting solvent in place of chloroform. The product remaining after removal of the n-butanol solvent by evaporation, is triturated with ether to produce an amorphous solid.

In still another method, essentially a variation of the above methods, saturated sodium bicarbonate (or potassium bicarbonate) is used in place of the citrate buffer. This method of course, produces the sodium (or potassium) salt of the acylation product. If necessary, to obtain a solid product, the salt is triturated with ether.

In yet another method, the residue remaining after removal of the volatiles from the reaction mixture is taken up in water at pH of from about 2.3 to 2.9, usually about pH 2.7, and the free acid form of the acylation product extracted from the acid solution with chloroform, ether, n-butanol or other suitable solvent. The chloroform, ether or n-butanol extract is then washed with aqueous acid (pH 2.3–2.9) and the product recovered by lyophilization or by conversion to a solvent-insoluble salt as by neutralization with an n-butanol solution of sodium or potassium 2-ethyl-hexanoate.

The esters are converted by known methods to the corresponding acids; for example, when $R_2$ is benzyl or a substituted benzyl group, its removal is accomplished by catalytic hydrogenation in a reaction-inert solvent such as water, ethanol, dioxane, at pH of from about 5 to about 9 and at about atmospheric pressure and ambient temperature. Favored catalysts are platinum, rhodium, nickel and palladium. When $R_2$ is other than benzyl or substituted benzyl its removal is effected by mild acid treatment or enzymatically with an esterase such as liver homogenate.

When preparation of the free acid form of the herein described cephalosporins is desired, the preferred ester groups are those wherein $R_2$ is trityl, t-butyl and β-diisopropylaminoethyl. These groups are readily removed by mild acid treatment resulting in satisfactory yields of the desired acid forms of the cephalosporins.

Another method for producing the free acid form of the compounds of Formula I (X=hydroxy) comprises acylation of the appropriate precursor of Formulae II–V with an active derivative of the desired aryl malonic acid, such as the acid chloride, acid bromide or anhydride, especially the mixed anhydride with carboxylic acids, such as ethoxy and isobutoxy carbonic acid, at a pH of from about 3–9 and a temperature of from about 0° C. to about 50° C. Still another method comprises condensing the precursors II–V with the desired aryl malonic acid in the presence of a condensing agent, such as 1,3-dicyclohexyl carbodiimide, 1,3-diiospropylcarbodiimide, and the like.

The valuable products of this invention are highly effective as industrial antibacterial agents against numerous types of microorganisms in a variety of environments, and are characterized by resistance to pencillinase.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

Phenylchlorocarbonyl ketene (A) To phenylmalonic acid (20 g.) in ethyl ether (100 ml.) there is added phosphorous pentachloride (46 g.). A vigorous reaction occurs. The reaction mixture is refluxed for four hours then the ether partially removed by heating on a steam bath. The reaction mixture become black when about half the ether is removed and the remaining ether is removed under reduced pressure (at 100 mm.). The residue is distilled under vacuum and the fraction boiling at 75°–90° C. at 1.5–4 mm. collected. The product, a yellow liquid, is redistilled at 74° C. and 1.5 mm. It shows a strong peak in the infrared region of the spectrum at 4.69μ.

Repetition of this procedure but using 10 g. of phenylmalonic acid instead of 20 g. produces a less vigorous reaction on addition of the phosphorous pentachloride. The same product is obtained.

(B) Phosphorous pentachloride (23 g.) is added over a 5-minute period to a stirred solution of phenylmalonic acid (10 g.) in ethyl ether (50 ml.) initially at a temperature of 0°–5° C. The temperature rises to 13° C. during the addition. The mixture is then refluxed for five hours and allowed to stand overnight at room temperature. Removal of the ether at 20 mm. produces a dark concentrate which is vacuum distilled to give the desired product: B.P. 80°–88° C. at 1.5–2.0 mm. and 74° C. at 0.2 mm.

(C) To a stirred solution of phosphous pentachloride (46 g.) in ethyl ether (100 ml.) there is added phenylmalonic acid (10 g.) over a two-minute period. The mixture is stirred at room temperature for four hours then refluxed for four hours and allowed to stand overnight at room temperature. The excess phosphorous pentachloride is filtered off and the ether boiled off at atmospheric pressure. The reaction mixture gradually progresses in color from dark yellow to red. The residue is distilled in vacuo to give the product: B.P. 83°–86° C. at 1.5 mm. as yellow liquid.

(D) Repetition of this procedure but using an equivalent amount of phosphorous oxychloride as halogenating agent in place of phosphorous pentachloride produes the same product.

EXAMPLE II

The procedure of Example I–C is repeated but using the appropriate malonic acid derivative in place of phenylmalonic acid to produce the following compounds.

$$R_1-C=C=O$$
$$O=C-Cl$$

R₁

| | |
|---|---|
| 2-thienyl | 3-furyl |
| 3-thienyl | 2-pyridyl |
| 2-furyl | 3-pyridyl |
| o-tolyl | o-bromophenyl |
| m-tolyl | 4-pyridyl |
| p-tolyl | m-bromophenyl |
| o-methoxyphenyl | o-chlorophenyl |
| m-methoxyphenyl | p-chlorophenyl |
| p-methoxyphenyl | m-chlorophenyl |
| o-trifluoromethylphenyl | o-butoxyphenyl |
| p-trifluoromethylphenyl | o-dimethylaminophenyl |
| m-trifluoromethylphenyl | o-diethylaminophenyl |
| o-isopropylphenyl | m-dimethylaminophenyl |
| | p-dimethylaminophenyl |

EXAMPLE III

Repetition of the procedures of Examples I–C and II but using PBr₅ in place of PCl₅ produces the corresponding bromo compounds.

EXAMPLE IV

Methyl ester of phenylcarboxy ketene

To a solution of phenylchlorocarbonyl ketene (0.5 g.) in dry chloroform (5 ml.) there is added anhydrous methanol (0.1 ml.) at room temperature. Hydrogen chloride is liberated. The mixture, maintained under an atmosphere of nitrogen, is stirred for 20 minutes and the product recovered by evaporation of the solvent.

EXAMPLE V

Dibenzyl phenyl malonate

Benzyl alcohol (0.6 ml.) is added to a solution of phenylchlorocarbonyl ketene (1.0 g.) in dry, ethanol-free, chloroform (12 ml.) at room temperature. Hydrogen chloride is evolved almost immediately upon addition of the benzyl alcohol. The mixture is stirred for five minutes, additional benzyl alcohol (0.6 ml.) added, and stirring continued for three hours. The chloroform solvent is evapoarted off. The residue, upon standing, crystallizes. After two recrystallizations from hexane, it melts at 69°–70° C.

*Analysis.*—Calcd. for C₂₃H₂₀O₄ (percent): C, 76.65; H, 5.59. Found (percent): C, 76.92; H, 5.49.

EXAMPLE VI

A mixture of phenylmalonic acid (5 g.) and thionyl chloride (30 ml.) is heated to reflux for six hours to give a clear yellow solution. Removal of the excess thionyl chloride by evaporation provides the crude phenylchlorocarbonyl ketene. The pure compound is obtained by distillation in vacuo.

EXAMPLE VII

Esters of arylcarboxy ketenes—General Preparation method

To a solution of the appropriate aryl halocarbonyl ketene (0.1 mole) in methylene chloride (sufficient to provide a clear solution and generally from about 5 to 10 ml. per gram of ketene) there is added the proper alcohol R₂OH (0.1 mole). The reaction mixture is maintained under an atmosphere of nitrogen and stirred for a period of from 20 minutes to 3 hours, care being taken to exclude moisture. The temperature may range from about −70° C. to about −20° C.

The compounds thus prepared are presented below.

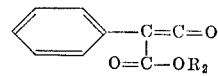

| R₂ | R₂ |
|---|---|
| 1-methyl-2-nitroethyl. | 1-methyl-4-oxoptyl. |
| 4-nitrobutyl. | 1-methyl-3-oxobutyl. |
| 1-methyl-2-nitropropyl. | 1-acetyl-1-methylpropyl. |
| 2,2-dinitroethyl. | 2-acetylbutyl. |
| 1-methyl-2-chloro-2-nitroethyl. | 2-acetylpropyl. |
| 1-trichloromethyl-2-nitroethyl. | 5-oxohexyl. |
| 1,1-diemthyl-2,2,2-trichlorethyl. | 1-methoxy-2,2,2-trichlorethyl. |
| 2-methoxyethyl. | 1-methoxy-2,2,2-trifluoroethyl. |
| 2-ethoxyethyl. | Methyl. |
| 2-isobutoxyethyl. | Ethyl. |
| 4-ethoxy-n-butyl. | n-Propyl. |
| 1,1-dimethyl-2-ethoxyethyl. | n-Butyl. |
| 1-cyanoethyl. | sec-Butyl. |
| 4-cyanobutyl. | t-butyl. |
| 2-cyano-1-methylethyl. | Decyl. |
| 1-chloromethyl-2-cyanoethyl. | Octadecyl. |
| 1-cyano-2,2-dichloropropyl. | 2-chloroethyl. |
| 1-cyano-2,2,2-trichloroethyl. | 3-chloropropyl. |
| 1-methyl-1-(1'-cyano-1'-methylethoxy)ethyl. | 1-methyl-2-chloroethyl. |
| 2-acetoxyethyl. | 1-ethyl-2-chloroethyl. |
| 2-butyryloxyethyl. | 1-methyl-2-chloropropyl. |
| 2-acetoxy-n-butyl. | 1,1-dimethyl-2-chloroethyl. |
| Carbomethoxymethoxymethyl. | 2-bromoethyl. |
| 2-carbethoxyethyl. | 2-bromo-1-butyl. |
| 4-carbethoxybutyl. | 1,3-dichloropropyl. |
| 2-carbethoxypropyl. | 1,1-dichloromethylethyl. |
| 1-carbethoxyethyl. | 2-bromo-3-chloropropyl. |
| 1-chloromethyl-2-carbethoxyethyl. | 1-bromomethyl-2-chloroethy. |
| 1-trichloromethyl-2-carbomethoxyethyl. | 1,1-dichloromethylethyl. |
| | 1,1-diemthyl-2,2-dichloroethyl. |
| 1-carbethoxy-2,2-dichloropropyl. | |
| 1-carbomethoxy-2,2,2-trichloroethyl. | 2,3,3-tribromopropyl. |
| 1-carbomethoxymethyl-2,2,2-trichloroethyl. | 2,2,3,3-tetrabromopropyl. |
| Acetonyl. | 2,2,2-trifluoroethyl. |
| Acetonylmethyl. | 2-nitroethyl. |
| 4-oxopentyl. | 2,3-diacetoxypropyl. |
| 2-fluoroethyl. | 2,3-distearoyloxypropyl. |
| 2-dimethylamino. | (1,2,3-tricarbomethoxy)-2-propyl. |
| 2-dibutylaminoethyl. | 2,2,3,3,4,4,4-hetpafluorobutyl. |
| 2-diisopropylaminoethyl. | Phenyl. |
| 3-diisopropylaminopropyl. | o-Chlorophenyl. |
| 3-diethylaminopropyl. | p-Chlorophenyl. |
| 2-diethylaminoethyl. | m-Bromophenyl. |
| 2-di-(n-propyl)aminoethyl. | o-Tolyl. |
| 3-di-methylaminopropyl. | p-Tolyl. |
| 3-di-(n-propyl)amino-2-propyl. | m-Ethylphenyl. |
| 2-(2,5-dimethylpyrrolidino)ethyl. | o-Isopropylphenyl. |
| 2-(4-methylpiperidino)ethyl. | p-t-Butylphenyl. |
| 3-piperidinopropyl. | o-Methoxyphenyl. |
| 3-pyrrolidino-2-propyl. | m-Ethoxyphenyl. |
| 3-piperidino-2-propyl. | p-Butoxyphenyl. |
| 2-(2-imidazolino)ethyl. | o-Fluorophenyl. |
| 3-(2-imidazolino)propyl. | o-Formylphenyl. |
| 2-piperidinoethyl. | p-Acetylphenyl. |
| 2-morpholinoethyl. | p-Butyrylphenyl. |
| 3-morpholinopropyl. | o-Nitrophenyl. |
| 3-thiomorpholinopropyl. | m-Nitrophenyl. |
| 2-pyrrolidinoethyl. | o-Carbomethoxyphenyl. |
| 2-pyrroloethyl. | p-Carbomethoxyphenyl. |
| 2-N-methylpiperazinoethyl. | m-Carbethoxyphenyl. |
| 3-N-butylpiperazinopropyl. | o-Dimethylaminophenyl. |
| 2-(1,4,5,6-tetrahydropyrimidino)ethyl. | m-di-n-propylaminophenyl. |
| 3-dimethylamino-2-propyl. | p-Methylethylaminophenyl. |
| 2-diethylamino-1-propyl. | 2,3-dimethylphenyl. |
| 2,3,4,6-tetramethylphenyl. | |
| 2,6-dichlorophenyl. | 3,5-dimethylphenyl. |
| 2,4,6-tribromophenyl. | 2,6-diethylphenyl. |
| Pentafluorophenyl. | 5-ethyl-3-methylphenyl. |
| 2,4-dinitrophenyl. | 2,3,4-drimethylphenyl. |
| 2,3,6-trinitrophenyl. | 2,6-diethyl-4-methylphenyl. |
| 2,4-difluorophenyl. | 7-isoquinolyl. |
| 3-chloro-2-fluorophenyl. | 4-benzofuryl. |
| 2-chloro-6-methoxyphenyl. | 3-thionaphthenyl. |
| 3-methoxy-2-methylphenyl. | Cyclopropyl. |
| 2-carbomethoxy-5-fluorophenyl. | Cyclobutyl. |
| 2-acetyl-4-fluorophenyl. | Cyclopentyl. |
| 3-bromo-5-methylphenyl. | Cyclohexyl. |
| 4-chloro-2,6-dimethylphenyl. | Cycloheptyl. |
| 3-chloro-4-fluoro-6-nitrophenyl. | 1-methyl-1-cyclopentyl. |
| 4-indanyl. | 3-methyl-1-cyclopentyl. |
| 8-quinolyl. | 2,2-dimethyl-1-cyclopentyl. |
| 4-(6-methylquinolyl). | 2-methyl-1-cyclohexyl. |
| 1-naphthyl. | 3,5-dimethyl-1-cyclohexyl. |
| 5-(1,2,3,4-tetrahydronaphthyl). | 3-isopropyl-1-cyclopentyl. |
| 2-phenazinyl. | 1-methyl-1-cyclobutyl. |
| 3-(2-methyl-4-pyronyl). | 1-indanyl. |
| 2-(1,4-naphthoquinonyl). | 2-bicyclo[4.4.0]-decyl. |
| 2-methyl-1-indanyl. | 4-cyclohexyl-1-cyclohexyl. |
| 2-chloro-1-indanyl. | 1-methyl-1-cycloheptyl. |
| Propargyl. | 2-furyl. |
| 1-butyn-3-yl. | 2-(1,2,3,4-tetrahydronaphthyl). |
| 1-pentyl-3-yl. | Allyl. |
| 3-methyl-1-pentyn-3-yl. | Crotyl. |
| 2-hexen-1-yl. | 3-buten-1-yl. |
| 2-heptyn-1-yl. | 3-penten-1-yl. |
| 2-octyn-1-yl. | 3-penten-2-yl. |
| 3,4,4-trimethyl-5-pentyn-1-yl. | 2-methyl-3-buten-1-yl. |
| 3-ethyl-1-pentyn-3-yl. | 4-hexen-1-yl. |
| 2-octen-1-yl. | 1-hexen-3-yl. |
| | 2,2-dimethyl-3-buten-1-yl. |
| | 2-hepten-1-yl. |
| | 2-hepten-4-yl. |

TABLE.—Continued

| R₇ | R₂ |
|---|---|
| 1-octen-3-yl. | 3-(N-methyl)pyridyl. |
| 4-(N-methyl)pyridyl. | Benzyl. |
| σ-Ethoxybenzyl. | σ-Chlorobenzyl. |
| m-Acetylbenzyl. | p-Butyrylbenzyl. |
| p-Butyrylbenzyl. | p-Bromobenzyl. |
| σ-Carbomethoxybenzyl. | m-Methylbenzyl. |
| p-(Carbo-t-butoxy)benzyl. | σ-Fluorobenzyl. |
| σ-Fluorobenzylbenzyl. | p-Methoxybenzyl. |
| p-Dimethylaminobenzyl. | σ-Nitrobenzyl. |
| Benzohydryl. | Trityl. |
| 1-indanylmethyl. | Cholesteryl. |
| 2-pyridylmethyl. | [2,2-dimethyl-1,3-dioxolon-4-yl]-methyl. |
| 2-furylmethyl. | |
| (2-pyrrolidono)methyl. | Phthalimidomethyl. |

In like manner but using the appropriate thiophenol in place of R₂OH, the following compounds are prepared.

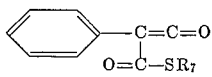

| R₇ | R₇ |
|---|---|
| Phenyl. | p-Fluorophenyl. |
| σ-Tolyl. | 2,4-dichlorophenyl. |
| p-Tolyl. | 2,4,5-trichlorophenyl. |
| m-Ethylphenyl. | p-Methoxyphenyl. |
| σ-n-Propylphenyl. | σ-Ethoxyphenyl. |
| p-Isopropylphenyl. | 3-methoxy-4-methylphenyl. |
| p-t-Butylphenyl. | 4-methoxy-2,5-dimethylphenyl. |
| 2,5-dimethylphenyl. | 6-chloro-3-isopropylphenyl. |
| 2,5-diethylphenyl. | 4-bromo-3-methylphenyl. |
| 2-methyl-5-isopropylphenyl. | 2-chloro-3,5-dimethylphenyl. |
| m-Chlorophenyl. | 4,6-dichloro-3-dimethylphenyl. |
| σ-Bromophenyl. | σ-Trifluoromethylphenyl. |

EXAMPLE VIII

The following additional ketene esters are prepared by the general procedure of Example VII from arylhalo carbonyl ketenes of Examples II and III wherein R₁ is 2-furyl, 2-thienyl, 3-thienyl, 2-pyridyl, 4-pyridyl, p-tolyl, σ-methoxyphenyl, p-methoxyphenyl, σ-trifluoromethylphenyl, p-chlorophenyl, σ-dimethylaminophenyl and p-dimethylaminophenyl. For convenience only the R₂ values are listed.

| R₂ | R₂ |
|---|---|
| Methyl. | Benzyl. |
| n-Butyl. | 3-cyanopropyl. |
| Ethyl. | 2-cyanoethyl. |
| t-Butyl. | 2-cyano-1-methylpropyl. |
| Decyl. | 1-cyano-2-chloropropyl. |
| Tetradecyl. | 1-cyano-2,2-dichloropropyl. |
| 2-chloroethyl. | 1-cyano-2,2,2-trichloroethyl. |
| 2-chloropropyl. | 1-methyl-1-(1'-cyano-1'-methylethoxy)propyl. |
| 4-chloro-1-butyl. | 2-acetoxyethyl. |
| 1-methyl-3-chloropropyl. | 2-butyryloxyethyl. |
| 2-bromoethyl. | 3-acetoxypropyl. |
| 1-ethyl-2-bromoethyl. | Carbomethoxymethyl. |
| 1,3-dichloropropyl. | 2-carbethoxyethyl. |
| 2-bromo-3-chloropropyl. | 3-carbobutoxypropyl. |
| 3,4-dichloro-1-butyl. | 2-carbethoxypropyl. |
| 2,2-dichloroethyl. | 1-trichloromethyl-2-carbomethoxyethyl. |
| 1,1-dimethyl-2,2-dichloroethyl. | 1-carbethoxy-2,2-dichloropropyl. |
| 2,2,3-tribromopropyl. | 1-carbomethoxy-2,2,2-trichloroethyl. |
| 2,2,3-trichlorobutyl. | Acetonyl. |
| 2,2,2-trichloroethyl. | 2-oxopentyl. |
| 2,2,2-trifluoroethyl. | 4-oxopentyl. |
| 3-nitropropyl. | 2-acetylbutyl. |
| 2-nitrobutyl. | 1-methyl-3-oxohexyl. |
| 2,2-dinitroethyl. | 3-oxopentyl. |
| 2-chloro-2-nitropropyl. | 4-oxohexyl. |
| 1-trichloromethyl-2-nitroethyl. | 1-ethoxy-2,2,2-trichloroethyl. |
| 1-trifluoromethylethyl. | 1-methoxy-2,2,2-trifluoroethyl. |
| 1,1-dimethyl-2,2,2-trifluoroethyl. | 2,3-diacetoxypropyl. |
| 1-ethyl-1-methyl-2,2,2-trichloroethyl. | 2,3-distearoyloxypropyl. |
| 2-methoxyethyl. | (1,2,3-tricarbomethoxy)-2-propyl. |
| 3-sec-butoxypropyl. | 3-fluoropropyl. |
| 4-methoxy-n-butyl. | 4,4,4-trichlorobutyl. |
| 1,1-dimethyl-2-methoxyethyl. | Chlorodicarbomethoxymethyl. |
| Carbethoxy ethoxymethyl. | 1,1-dicarbethoxymethyl-2-ethoxyethyl. |
| Phenyl. | 2,6-dichlorophenyl. |
| σ-Chlorophenyl. | 2-chloro-4-fluorophenyl. |
| m-Chlorophenyl. | 2,3,5,6-tetrabromophenyl. |
| p-Bromophenyl. | 2,4-dinitrophenyl. |
| m-Tolyl. | 5-fluoro-2-nitrophenyl. |
| σ-Ethylphenyl. | 6-methoxy-2-methylphenyl. |
| p-t-Butylphenyl. | 2-acetyl-4-fluorophenyl. |
| σ-Methoxyphenyl. | 3-dimethylamino-4-methylphenyl. |
| m-Isopropoxyphenyl. | 3-chloro-4-fluoro-6-nitrophenyl. |

| R₂ | R₃ |
|---|---|
| p-Butoxyphenyl. | 3-carbomethoxy-4-chlorophenyl. |
| p-Acetylphenyl. | 2-carbomethoxy-4-chloro-5-methylphenyl. |
| m-Butyrylphenyl. | 1-naphthyl. |
| σ-Nitrophenyl. | 2-naphthyl. |
| p-Carbomethoxyphenyl. | 5-indanyl. |
| σ-Dimethylaminophenyl. | 6-(1,2,3,4-tetrahydronaphthyl). |
| 2,3-dimethylphenyl. | 3-quinolyl. |
| 3-methyl-6-propylphenyl. | 7-quinolyl. |
| 2,4-dimethyl-3-ethylphenyl. | 5-(1,3-benzodioxolyl). |
| 3,4-dimethyl-2,6-diethylphenyl. | 7-(1,2-naphthoquinonyl). |
| 2-dimethylaminoethyl. | 1-chloro-2-indanyl. |
| 2-diisopropylaminoethyl. | Cyclopropyl. |
| 3-diethylaminopropyl. | Cyclohexyl. |
| 2-piperidinoethyl. | 1-indanyl. |
| 3-morpholinopropyl. | 3-pyridylmethyl. |
| 3-thiomorpholinopropyl. | 2-methyl-1-cyclopentyl. |
| 2-pyrrolidinoethyl. | 4-methyl-1-cyclohexyl. |
| 2-(2-imidazolino)ethyl. | 3,3-dimethyl-1-cyclohexyl. |
| 2-pyrroloethyl. | 4-t-butyl-1-cyclohexyl. |
| 3-N-methylpiperazinopropyl. | 1,2,4-trimethyl-1-cyclopentyl. |
| 2-diethylamino-1-propyl. | 3,3,5-trimethyl-5-cyclohexyl. |
| 3-diethylamino-2-propyl. | 1-methyl-1-cycloheptyl. |
| 3-morpholino-2-propyl. | 3-bicyclo-[4.4.0]-decyl. |
| 2-(1,4,5,6-tetrahydropyrimidino)ethyl. | 3-furylmethyl. |
| 1-(1,2,3,4-tetrahydronaphthyl). | 1-ethyl-1-indanyl. |
| Allyl. | σ-Chlorobenzyl. |
| Crotyl. | m-Bromobenzyl. |
| 4-pentyn-1-yl. | p-Butylbenzyl. |
| 3-pentyn-1-yl. | σ-Methylbenzyl. |
| 1-methyl-1-buten-3-yl. | m-Nitrobenzyl. |
| 3-hexen-2-yl. | σ-Fluorobenzyl. |
| 5-methyl-3-penten-2-yl. | p-Methoxybenzyl. |
| 2-methyl-4-penten-2-yl. | (4-imidazolyl)methyl. |
| 2,2-dimethyl-3-buten-1-yl. | σ-Acetylbenzyl. |
| 4-hepten-1-yl. | p-Carbethoxybenzyl. |
| 4-hepten-4-yl. | σ-Dimethylaminobenzyl. |
| 4-octen-1-yl. | Benzohydryl. |
| Propargyl. | Trityl. |
| 1-Butyn-4-yl. | Cholesteryl. |
| 1-pentyn-3-yl. | 2-indanylmethyl. |
| 1-hexyn-3-yl. | 3-octyn-2-yl. |
| 5-methyl-3-hexyn-2-yl. | 3-(N-methyl)pyridyl. |
| 4-(N-methyl)pyridyl. | |

Repetition of this procedure but using the appropriate thiophenol (R₇SH) in place of R₂OH produces the compounds:

| R₇ | R₇ |
|---|---|
| Phenyl. | 2,3-4,trichlorophenyl. |
| σ-Tolyl. | m-Methoxyphenyl. |
| p-Ethylphenyl. | 3-methoxy-2-methylphenyl. |
| m-Tolyl. | σ-Ethoxyphenyl. |
| p-Butylphenyl. | 6-methoxy-2-methylphenyl. |
| 3,5-dimethylphenyl. | 4-methoxy-3,5-dimethylphenyl. |
| 2,5-diethylphenyl. | 5-chloro-2-methylphenyl. |
| 2-methyl-5-isopropylphenyl. | 5-bromo-2-methylphenyl. |
| σ-Chlorophenyl. | 4-chloro-3,5-dimethylphenyl. |
| m-Bromophenyl. | 2,4-dichloro-3-methylphenyl. |
| p-Fluorophenyl. | p-Trifluoromethylphenyl. |
| 2,5-dichlorophenyl. | |

EXAMPLE IX

Again following the procere of Example VII, the arylcarboxyketene esters listed below are prepared. The aryl group, R₁, for each of the R₂ values is 3-furyl, m-tolyl, m-methoxyphenyl, p-trifluoromethylphenyl, 3-pyridyl, σ-isopropylphenyl, σ-chlorophenyl, σ-bromophenyl, m-bromophenyl, m-chlorophenyl, σ-butoxyphenyl, σ-butylphenyl, σ-diethylaminophenyl and m-dimethylaminophenyl.

| R₂ | R₂ |
|---|---|
| Methyl. | 3-N-(methyl)pyridyl. |
| n-Propyl. | 2-cyanoethyl. |
| t-Butyl. | 3-cyanopropyl. |
| Dodecyl. | 1-cyano-2-chloropropyl. |
| Octadecyl. | 1-cyano-2,3,3-trichloroethyl. |
| 3-chloropropyl. | 1-methyl-1-(1'-cyano-1'-methylethoxy)propyl. |
| 3-chloro-1-butyl. | 2-propionyloxyethyl. |
| 1-methyl-2-chloropropyl. | 2-acetoxy-n-butyl. |
| 1,1-dimethyl-2-chloroethyl. | 4-propionyloxy-b-butyl. |
| 2-bromopropyl. | Carbomethoxymethyl. |
| 4-bromo-1-butyl. | 2-carbethoxyethyl. |
| 1,3-dichloropropyl. | 3-carbomethoxypropyl. |
| 1,4-dibromo-2-butyl. | 1-carbethoxyethyl. |
| 2,2-dichloroethyl. | 1-trichloromethyl-2-carbomethoxyethyl. |
| 2,2,3-trichlorobutyl. | 1-carbethoxy-2-chloropropyl. |
| 2,2,2-trichloroethyl. | 1-carbomethoxy-2,2,2-trichloroethyl. |
| 2-(2-trifluoromethyl)propyl. | 1-carbomethoxymethyl-2,2,2-trichloroethyl. |
| 2-nitroethyl. | Acetonyl. |

TABLE.—Continued

| R₂ | R₂ |
|---|---|
| 2-nitrobutyl. | 2-oxopentyl. |
| 4-nitrobutyl. | 2-acetylbutyl. |
| 1-methyl-2-nitropropyl. | 3-oxopentyl. |
| 2-chloro-2-nitropropyl. | 4-oxohexyl. |
| 1-trifluoromethylethyl. | 1-methoxy-2,2,2-trichloroethyl. |
| 2-methoxyethyl. | 2,3-diacetoxypropyl. |
| 2-isobutoxyethyl. | 2-fluoroethyl. |
| 3-methoxypropyl. | 1-trifluoromethyl-2-nitroethyl. |
| 4-ethoxy-n-butyl. | Carbethoxyethoxymetnyl. |
| Phenyl. | 2,4-dibromophenyl. |
| o-Tolyl. | Pentachlorophenyl. |
| m-Ethylphenyl. | 2-bromo-4-fluorophenyl. |
| o-n-Propylphenyl. | 5-bromo-2-methoxyphenyl. |
| p-Chlorophenyl. | 3-methoxy-2-methylphenyl. |
| m-Bromophenyl. | 2-acetyl-4-fluorophenyl. |
| p-Methoxyphenyl. | 2-dimethylamino-3,5-dimethylphenyl. |
| o-Ethoxyphenyl. | 4-carbethoxy-2-chlorophenyl. |
| o-Fluorophenyl. | p-(Carbo-t-butoxy)phenyl. |
| m-Nitrophenyl. | 2,3-dimethoxyphenyl. |
| o-Carboisopropoxyphenyl. | 5-indanyl. |
| p-Dimethylaminophenyl. | 5-(1,2,3,4-tetrahydronaphthyl). |
| 2,5-dimethylphenyl. | 4-quinolyl. |
| 4-isopropyl-3-methylphenyl. | 2-(1-methylimidazolyl). |
| o-Formylphenyl. | 1-naphthyl. |
| Cyclopropyl. | 2-dimethylaminoethyl. |
| Cyclohexyl. | 3-diethylaminopropyl. |
| 1-methyl-1-cyclohexyl. | 2-piperidinoethyl. |
| 1-indanyl. | 3-morpholino-2-propyl. |
| 2-methyl-1-indanyl. | 2-(4-methylpiperidino)ethyl. |
| 4-octyn-1-yl. | 3-piperidino-2-propyl. |
| 1-isopropyl-1-cyclohexyl. | 2-diethylamino-1-propyl. |
| 2-methyl-6-ethyl-1-cyclohexyl. | 3-diethylamino-2-propyl. |
| b̲icyclo-[4.4.0]-3-decyl. | 2-morpholinoethyl. |
| 1′-methyl-1-cycloheptyl. | 3-thiomorpholinopropyl. |
| 1′2,5-trimethyl-1-cyclopentyl. | 2-pyrrolidinoethyl. |
| 3′ethyl-1-pentyn-3-yl. | 3-pyrrolopropyl. |
| 4-chloro-1-indanyl. | 2-diisopropylaminoethyl. |
| 3-bromo-1-indanyl. | 2-(1,4,5,6-tetrahydropyrimidino)-ethyl benzyl. |
| 1-(2-chloro-1,2,3,4-tetrahydronaphthyl) allyl. | 2-heptyn-1-yl. |
| 3-buten-1-yl. | o-Bromobenzyl. |
| 3-penten-2-yl. | p-Chlorobenzyl. |
| 1-penten-5-yl. | p-Fluorobenzyl. |
| 2-methyl-3-buten-1-yl. | o-Nitrobenzyl. |
| 4-hexen-1-yl. | o-dimethylaminobenzyl. |
| 4-methyl-3-penten-2-yl. | m-Methylbenzyl. |
| Propargyl. | o-Acetylbenzyl. |
| 2-butyn-1-yl. | p-Ethoxybenzyl. |
| 1-pentyn-3-yl. | Benzohydryl. |
| 1-hexyn-3-yl. | Trityl. |
| Cholesteryl. | (1-indanyl)methyl. |
| (2-pyrrolidono)methyl. | |

Replacement of R₂OH in the above procedure by R₇SH produces the following compounds:

| R₇ | R₇ |
|---|---|
| Phenyl. | 2,4,5-trichlorophenyl. |
| o-Tolyl. | p-Methoxyphenyl. |
| o-Ethylphenyl. | m-Ethoxyphenyl. |
| p-Isopropylphenyl. | 2-methoxy-4-methylphenyl. |
| 3,5-diethylphenyl. | 4-methoxy-2,5-dimethylpheny |
| 2-methyl-5-ethylphenyl. | 4-chloro-2-methylphenyl. |
| p-Chlorophenyl. | 4-bromo-3-methylphenyl. |
| o-Bromophenyl. | 5-chloro-2,4-dimethylphenyl. |
| p-Fluorophenyl. | 4,6-dichloro-3-methylphenyl. |
| p-Trifluoromethylphenyl. | |

EXAMPLE X

General methods for acylation of 7-aminocephalosporanic acid and related derivatives To a solution of the appropriate aryl halocarbonyl ketene (0.1 mole) in methylene chloride (sufficient to provide a clear solution and generally from about 5 to 10 ml. per gram of ketene) there is added the proper alcohol R₂OH (0.1 mole). The reaction mixture is maintained under an atmosphere of nitrogen and stirred for a period of from 20 minutes to 3 hours, care being taken to exclude moisture. The temperature may range from about −70° C. to about −20° C. The infrared spectrum of the mixture is then taken to determine and confirm the presence of the ketene ester. A solution of 7-aminocephalosporanic acid-triethylamine salt (0.1 mole) in methylenechloride (50 ml.) is added and the mixture stirred at −70° to −20° C. for ten minutes. The cooling bath is then removed and the reaction mixture stirred continuously and allowed to warm to room temperature. The product is isolated by one of the methods below.

*Method A.*—The reaction mixture is evaporated to dryness under reduced pressure and the residue taken up in citrate buffer (pH 5.5). The product is extracted from the buffer solution with chloroform. The chloroform extract is washed with citrate buffer (pH 5.5) then dried with anhydrous sodium sulfate and evaporated to dryness to give the sodium salt.

*Method B.*—The procedure of Method A is followed but using n-butanol as extracting solvent in place of chloroform. The product obtained after evaporation of the n-butanol solvent is triturated with ether to give an amorphous solid.

*Method C.*—This procedure, a variation of Method A, uses a saturated aqueous solution of sodium (or potassium) bicarbonate in place of citrate buffer to produce the sodium (or potassium) salt of the cephalosporin product. It is generally used for the recovery of those cephalosporins which are poorly soluble in methylene chloride or chloroform.

*Method D.*—The reaction mixture is extracted twice with saturated aqueous sodium or potassium bicarbonate, washed with water, dried and evaporated to dryness to give the sodium (or potassium) salt. The product, if not a solid, is triturated with ether.

*Method E.*—This method a modification of Method D, is used for those cephalosporins which are difficultly soluble in methylene chloride. The sodium (or potassium) bicarbonate solution (Method D) is extracted with n-butanol, the butanol extract dried and evaporated to dryness.

*Method F.*—This method is used to isolate the free acid form of the cephalosporin.

The residue remaining after evaporation of the reaction mixture to dryness is taken up in aqueous acid, e.g. HCl, at pH 2.7 and the product extracted therefrom by means of n-butanol. The butanol extract is washed with aqueous acid (pH 2.7) and then lyophilized.

*Method F-1.*—The butanol extract of Method F is neutralized with an n-butanol solution of potassium 2-ethyl hexanoate to precipitate the potassium salt of the cephalosporin products.

The following cephalosporins are thus prepared from the appropriate precursors of Formulae II–V.

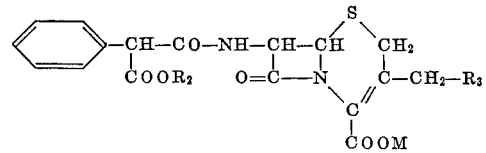

When R₃ is a tertiary amino group, M is hydrogen and the compounds are isolated by Method F. When more than one value of R₃ is given, the procedure designated in the "Method" column applies to R₃ values other than R₃=tertiary amino.

| R₂ | Method | M | R₃* |
|---|---|---|---|
| Methyl | A | Na | Ac, H, pyridine, OH. |
| Ethyl | A | Na | Ac, H, pyridine. |
| n-Propyl | A | Na | Ac. |
| i-Propyl | A | Na | Ac, OH. |
| n-Butyl | A | Na | Ac, TEA. |
| i-Butyl | A | Na | H. |
| t-Butyl | A | Na | Ac, pyridine. |
| 2-ethyl-1-butyl | D | K | Ac. |
| Octyl | D | K | H, OH. |
| Dodecyl | F | H | Pyridine. |
| Octadecyl | D | K | Ac, H. |
| 2-chloroethyl | A | Na | Ac, H, nicotine. |
| 3-chloropropyl | A | Na | Ac, H, TEA. |
| 1-methyl-2-chloroethyl | A | Na | Ac, OH. |
| 2-chloro-1-butyl | A | Na | Ac. |
| 4-chloro-1-butyl | A | Na | H. |
| 1-ethyl-2-chloroethyl | A | Na | H. |
| 1-methyl-3-chloropropyl | A | Na | H. |
| 2,2-dimethyl-2-chloroethyl | A | Na | Ac. |
| 2-bromoethyl | B | K | Ac, OH. |
| 2-bromopropyl | B | K | Ac. |
| 3-bromopropyl | B | K | H, TEA. |
| 2-bromo-1-butyl | B | K | Ac. |
| 4-bromo-1-butyl | B | K | Ac. |
| 1,1-dimethyl-2-bromoethyl | B | K | Ac. |
| 1,3-dichloropropyl | A | Na | Ac, H. |
| 2,3-dibromopropyl | A | Na | H, OH. |
| 2-chloro-3-bromopropyl | A | Na | Ac. |

See footnote at end of table.

TABLE.—Continued

| R₂ | Method | M | R₃* |
|---|---|---|---|
| 1,4-dibromo-2-butyl | A | Na | Ac. |
| 3,4-dichloro-1-butyl | A | Na | Ac. |
| 1-bromomethyl-2-chloroethyl | A | Na | Ac. |
| 2,3-dibromo-2-methylpropyl | A | Na | Ac. |
| 2,2-dichloroethyl | A | Na | Ac, TEA. |
| 1-methyl-1-trichloromethylethyl | A | Na | Ac, OH. |
| 2,3,3-tribromopropyl | A | Na | Ac. |
| 2,2,3-trichlorobutyl | A | Na | Ac. |
| 2-chloro-2,3-dibromobutyl | A | Na | Ac. |
| 2,2,3,3-tetrabromopropyl | A | Na | Ac. |
| 2,2,2-trichloroethyl | A | Na | Ac, H, pyridine. |
| 2,2,2-trifluoroethyl | A | Na | H, OH. |
| 2-(2-trifluoromethyl)propyl | A | Na | Ac. |
| 3,3,3-trifluoropropyl | A | Na | Ac. |
| 2-nitroethyl | B | K | Ac, H, TEA. |
| 3-nitropropyl | B | K | H, OH. |
| 1-methyl-2-nitroethyl | B | K | Ac, H. |
| 2-nitrobutyl | B | K | Ac, H. |
| 4-nitrobutyl | B | K | H. |
| 1-ethyl-2-nitroethyl | B | K | H. |
| 2-methyl-2-nitropropyl | B | K | Ac. |
| 2,2-dinitroethyl | C | Na | Ac. |
| 1-methyl-2,2-dinitroethyl | F | H | Pyridine. |
| 2-bromo-2-nitroethyl | B | Na | H. |
| 2-chloro-2-nitropropyl | B | Na | H, OH. |
| 1-methyl-2-chloro-2-nitroethyl | B | Na | Ac. |
| 3-methyl-3-nitropropyl | B | Na | Ac. |
| 2-chloro-nitrobutyl | B | Na | Ac. |
| 1-trichloromethyl-2-nitroethyl | B | Na | Ac, H. |
| 1-trifluoromethylethyl | A | Na | H. |
| 1,1-dimethyl-2,2,2-trifluoroethyl | A | Na | Ac, OH. |
| 1,1-dimethyl-2,2,2-trichlorethyl | A | Na | Ac, pyridine. |
| 2-methylmercaptoethyl | A | Na | Ac, H. |
| 2-methoxyethyl | F-1 | K | Ac, H, TEA. |
| 2-ethoxyethyl | F | H | TEA, 2-aminopyridine. |
| 2-isopropoxyethyl | F-1 | K | Ac. |
| 2-n-butoxyethyl | F-1 | K | Ac. |
| 3-methoxypropyl | F-1 | K | H, TEA. |
| 3-n-propoxypropyl | F-1 | K | Ac, OH. |
| 4-methoxy-n-butyl | F-1 | K | Ac. |
| 4-butoxy-n-butyl | F-1 | K | Ac. |
| 1,1-dimethyl-2-methoxyethyl | F-1 | K | Ac. |
| 1-cyanoethyl | E | K | Ac, H, pyridine. |
| 2-cyanoethyl | F | H | Nicotine, TEA. |
| 3-cyanopropyl | E | K | Ac, OH. |
| 4-cyanobutyl | E | K | Ac. |
| 1-cyano-1-methylethyl | E | K | Ac. |
| 1-chloromethyl-2-cyanoethyl | B | K | Ac. |
| 1-cyano-2-chloropropyl | B | K | Ac. |
| 1-cyano-2,2-dichloropropyl | B | K | Ac, H. |
| 1-cyano-2,2,2-trichloroethyl | B | K | Ac. |
| 1-cyano-2,2,2-tribromoethyl | B | K | H, OH. |
| 1-methyl-1-(1'-cyano-1'-methylethoxy)ethyl | B | K | H. |
| 2-formyloxyethyl | B | Na | Ac. |
| 2-acetoxyethyl | F | H | Isonicotinic acid. |
| 2-butyryloxyethyl | B | Na | Ac. |
| 2-acetoxypropyl | B | Na | Ac, H. |
| 3-acetoxypropyl | B | Na | Ac, OH. |
| 2-acetoxy-n-butyl | B | Na | H. |
| 4-acetoxy-n-butyl | B | Na | Ac. |
| 1-methyl-2-acetoxyethyl | B | Na | Ac, H. |
| Carbomethoxymethyl | B | Na | Ac, H. |
| Carbobutoxymethyl | B | Na | H, OH. |
| 2-carbethoxyethyl | B | Na | Ac, pyridine. |
| 2-carboisopropoxyethyl | B | Na | Ac. |
| 3-carbomethoxypropyl | B | Na | Ac, H. |
| 4-carbethoxybutyl | C | Na | Ac. |
| 2-carbethoxypropyl | C | Na | Ac. |
| 1-carbethoxyethyl | C | Na | Ac. |
| 1-carbethoxypropyl | C | Na | Ac. |
| 1-chloromethyl-2-carbethoxyethyl | B | K | Ac, H. |
| 1-trichloromethyl-2-carbomethoxyethyl | B | K | H, pyrimidine, OH. |
| 1-carbethoxy-2-chloropropyl | B | K | H. |
| 1-carbethoxy-1-chloromethyl-2-chloroethyl | B | K | H. |
| 1-carbomethoxy-2,2,2-trichloroethyl | B | K | H. |
| 1-carbethoxy-2,2-dichloroethyl | B | K | Ac. |
| 1-carbomethoxy-2-chloroethyl | B | K | Ac. |
| 1-carbomethoxymethyl-2,2,2-trichloroethyl | B | K | Ac, OH. |
| Acetonyl | E | Na | Ac, H, sulfadiazine. |
| Acetonylmethyl | E | Na | H, TPA. |
| 2-oxopentyl | E | Na | Ac, H, OH. |
| 4-oxopentyl | E | Na | Ac. |
| 1,1-dimethylacetonyl | E | Na | Ac. |
| 1-ethyl-2-oxobutyl | E | Na | Ac. |
| 1-acetyl-1-methylpropyl | B | Na | Ac. |
| 1,2-dimethyl-3-oxobutyl | B | Na | Ac. |
| 2-acetylbutyl | B | Na | Ac. |
| 1-methyl-3-oxohexyl | B | Na | Ac. |
| 1-ethyl-2-methyl-3-oxobutyl | B | Na | Ac. |
| 1-methyl-4-methyl-3-oxopentyl | B | Na | Ac. |
| 2-acetylpropyl | B | Na | Ac, OH. |
| 5-oxohexyl | B | Na | Ac, H, pyridine. |
| 1-methoxy-2,2,2-trichloroethyl | A | Na | Ac, OH. |
| 2-butylmercaptoethyl | A | Na | H, OH. |
| 1-ethoxy-2,2,2-trichloroethyl | A | Na | H. |
| 1-butoxy-2,2,2-trichloroethyl | A | Na | Pyridine, TEA. |
| 1-methoxy-2,2,2-trifluoroethyl | F | H | Pyridine, TEA. |
| 1-ethoxy-2,2,2-trifluoroethyl | A | Na | H. |
| 2,3-diacetoxypropyl | B | K | Ac, OH. |
| 2,3-dicapryloxypropyl | B | K | H. |
| 2,3-distearoyloxypropyl | B | K | H, pyridine. |
| (1,2,3-tricarbomethoxy)-2-propyl | B | K | Ac, H. |
| (1,2,3-tricarbobutoxy)-2-propyl | B | K | H. |
| 2-chloro-3,3-dimethoxypropyl | B | K | Ac, H. |
| 2-chloro-3,3-diethoxypropyl | B | K | Ac, TEA. |
| 3,3-diethoxypropyl | B | K | Ac. |
| 2-oxo-3-chloropropyl | B | K | Ac, OH. |
| 1-trichloromethyl-3-oxobutyl | B | K | Ac, H. |
| 1,1,3-trimethyl-2-oxobutyl | B | K | Ac. |
| 2-chloromethyl-3-chloro-2-nitropropyl | B | K | Ac, H. |
| 3-chloro-3-nitropropyl | B | K | Ac. |
| 2-fluoroethyl | A | Na | H, TEA. |
| 3-fluoropropyl | A | Na | H. |
| 1-chloromethyl-2-fluoroethyl | A | Na | Ac. |
| 2,2,3,3,4,4-heptafluorobutyl | A | Na | Ac, H, pyridine. |
| 1-nitro-1-trifluoromethyl-2,2,2-trifluoromethyl | A | Na | Ac. |
| 2-(N-methyl-p-toluidino)ethyl | F-1 | K | Ac, OH. |
| 2-(N-methyl-2-chloroanilino)ethyl | F-1 | K | H. |
| 3-(N-ethyl-4-bromoanilino)propyl | F-1 | K | Ac. |
| 2-(N-methyl-4-methoxyanilino)ethyl | F | H | TEA. |
| 3-(N-methyl-p-toluidino)-2-propyl | F-1 | K | Ac. |
| 2-(N-ethyl-2-chloroanilino)-1-propyl | F-1 | K | H, OH. |
| 1-methoxy-2-chloro-2,2-difluoroethyl | A | Na | H. |
| 1-trifluoromethyl-2,2,2-trifluoroethyl | A | Na | H, Ac. |
| Dicarbethoxyethoxymethyl | B | Na | Ac, H, TMA. |
| 1,1-dicarbethoxymethyl-2-ethoxyethyl | B | Na | H, pyridine. |
| Carbethoxyethoxymethyl | B | Na | H, pyridine, OH |
| Chlorodicarbomethoxymethyl | B | Na | Ac. |
| 1-isopropyoxy-2,2,2-trichloroethyl | A | Na | Ac, H, OH. |
| 1-t-butoxy-2,2,2-trichloroethyl | A | Na | H. |
| Dicarbomethoxyethoxymethyl | B | Na | H. |
| Cyclopropyl | A | Na | Ac, H, TEA. |
| Cyclobutyl | A | Na | Ac, H, OH. |
| Cyclopentyl | A | Na | Ac. |
| Cyclohexyl | A | Na | Ac. |
| Cycloheptyl | A | Na | Ac, nicotinamide |
| 1-methyl-1-cyclopentyl | A | Na | Ac, H. |
| 3-methyl-1-cyclopentyl | A | Na | Ac. |
| 2,2-dimethyl-1-cyclopentyl | B | K | Ac. |
| 2,4-dimethyl-1-cyclopentyl | B | K | Ac, H. |
| 2,3,4-trimethyl-1-cyclopentyl | B | K | Ac. |
| 3-isopropyl-1-cyclopentyl | B | K | Ac. |
| 3-methyl-1-cyclohexyl | B | K | Ac, H. |
| 3-methyl-1-indanyl | A | Na | Ac, nicotine. |
| 5-methyl-1-indanyl | B | K | Ac, nicotine. |
| 2,3-dimethyl-1-indanyl | B | K | Ac, H. |
| 2-chloro-1-indanyl | A | Na | Ac. |
| 2-bromo-1-indanyl | A | Na | H. |
| 1-chloro-2-indanyl | A | Na | H. |
| 9-fluorenyl | B | K | Ac. |
| 2,4-dipropyl-1-cyclopentyl | B | K | Ac. |
| 1,5-dimethyl-2-isopropyl-1-cyclohexyl | B | K | Ac. |
| 2,2,4,4,6-pentamethyl-1-cyclohexyl | B | K | H. |
| 1-(2-methyl-1,2,3,4-tetrahydronaphthyl) | B | K | Ac, pyridine. |
| 4-ethylmercaptobutyl | A | Na | Ac. |
| 2-methylsulfinylethyl | D | K | Ac. |
| 1-(7-methyl-1,2,3,4-tetrahydronaphthyl) | B | K | Ac, TEA. |
| 1-(1,2,7-trimethyl-1,2,3,4-tetrahydronaphthyl) | B | K | Ac. |
| 1-(1,5,8-trimethyl-1,2,3,4-tetrahydronaphthyl) | B | K | Ac, H. |
| 2-(1-methyl-1,2,3,4-tetrahydronaphthyl) | B | K | OH. |
| 2-(2,6-dimethyl-1,2,3,4-tetrahydronaphthyl) | B | K | Ac. |
| 2-(1,1,4,5-tetramethyl-1,2,3,4-tetrahydronaphthyl) | B | K | Ac. |
| 1-(2-chloro-1,2,3,4-tetrahydronaphthyl) | B | K | Ac, H. |
| 2-(1-bromo-1,2,3,4-tetrahydronaphthyl) | B | K | Ac. |
| Phenyl | B | Na | Ac, H, pyridine, OH. |
| o-Tolyl | B | Na | Ac, H. |
| m-Tolyl | B | Na | H, OH. |
| p-Tolyl | B | Na | H, TEA. |
| o-Isopropylphenyl | F | H | Pyrimidine. |
| p-t-Butylphenyl | F | H | Sulfapyridine. |
| o-Methoxyphenyl | B | Na | Ac, TEA. |
| m-Methoxyphenyl | B | Na | Ac. |
| p-Methoxyphenyl | B | Na | H, OH. |
| p-Ethoxyphenyl | B | Na | H. |
| o-Chlorophenyl | A | Na | Ac, H. |
| m-Chlorophenyl | A | Na | Ac. |
| p-Chlorophenyl | F | H | Pyridine. |
| m-Bromophenyl | F | H | 3-hydroxypyridine. |
| m-Fluorophenyl | F | H | Sulfapyridine. |
| om-ormylphenyl | A | Na | Ac, H. |
| m-Formylphenyl | A | Na | Ac, OH. |
| o-Acetylphenyl | A | Na | Ac, TBA. |
| p-Butyrylphenyl | A | Na | Ac. |
| o-Nitrophenyl | C | K | Ac, H. |
| m-Nitrophenyl | C | K | Ac, OH. |
| p-Nitrophenyl | F | H | Isonicotinic acid. |
| o-Carbomethoxyphenyl | C | Na | Ac, OH. |
| m-Carbomethoxyphenyl | C | Na | H. |
| o-Carbethoxyphenyl | C | Na | H. |
| p-Cargo-n-propoxyphenyl | C | Na | Ac. |
| p-Carbo-n-octyloxyphenyl | C | Na | Ac. |
| o-Dimethylaminophenyl | F-1 | K | H, pyrimidine. |
| o-Di-n-butylaminophenyl | F-1 | K | H, OH. |
| m-Dimethylaminophenyl | F-1 | K | Ac, H. |
| m-Di-n-propylaminophenyl | F-1 | K | H. |
| p-Dimethylaminophenyl | F-1 | K | H, TEA. |
| p-Methylethylaminophenyl | F-1 | K | H. |
| 2,4-dimethylphenyl | D | K | Ac, H. |

See footnote at end of table.

TABLE.—Continued

| R₂ | Method | M | R₃* |
|---|---|---|---|
| 2,6-dimethylphenyl | D | K | Ac, OH. |
| 2,3-diethylphenyl | D | K | Ac. |
| 2,4-di-n-propylphenyl | D | K | Ac. |
| 5-ethyl-3-methylphenyl | D | K | Ac. |
| 2-ethyl-4-methylphenyl | D | K | H. |
| 3-methyl-4-t-butylphenyl | B | Na | H. |
| 2,3,4-trimethylphenyl | B | Na | H. |
| 4,5-dimethyl-2-isopropylphenyl | B | Na | H. |
| 2,3,4,6-tetramethylphenyl | B | Na | Ac. |
| Pentamethylphenyl | B | Na | Ac. |
| 2,6-dichlorophenyl | A | Na | H. |
| 2,4-dibromophenyl | F | H | Pyridine. |
| 2,3,4-trichlorophenyl | A | Na | H, OH. |
| 2,4,6-tribromophenyl | A | Na | Ac. |
| 2,3,5,6-tetrachlorophenyl | A | Na | Ac. |
| Pentachlorophenyl | A | Na | H. |
| Pentabromophenyl | A | Na | H. |
| 2,4-dinitrophenyl | C | Na | Ac, TEA. |
| 2,3,4,6-tetranitrophenyl | C | Na | Ac. |
| 2-butylsulfinylethyl | D | K | Ac. |
| Pentanitrophenyl | C | Na | Ac, H. |
| 2,4-difluorophenyl | A | Na | Ac. |
| 2,3,5-trifluorophenyl | A | Na | Ac. |
| Pentafluorophenyl | A | Na | Ac. |
| 3-chloro-4-fluorophenyl | A | Na | Ac. |
| 2-bromo-4-fluorophenyl | A | Na | Ac. |
| 4,5-dichloro-2-fluorophenyl | A | Na | Ac. |
| 3-fluoro-2,4,6-trichlorophenyl | A | Na | Ac. |
| 2-methoxy-4-methylphenyl | A | Na | Ac, H. |
| 4-bromo-3-methoxyphenyl | A | Na | Ac. |
| 2-chloro-6-methoxyphenyl | A | Na | Ac, OH. |
| 2-ethoxy-3-methylphenyl | B | K | Ac, pyridine. |
| 2-methoxy-6-propylphenyl | B | K | Ac. |
| 2-carbomethoxy-5-fluorophenyl | B | K | Ac. |
| 5-fluoro-2-methoxyphenyl | B | K | Ac. |
| 4-acetyl-2-fluorophenyl | B | K | Ac, TEA. |
| 4-chloro-2-methylphenyl | B | Na | Ac, H. |
| 2-fluoro-4-methylphenyl | B | Na | Ac, OH. |
| 3-bromo-5-methylphenyl | B | Na | Ac, |
| 2-bromo-4-t-butylphenyl | B | Na | Ac. |
| 2-ethyl-4-fluorophenyl | B | Na | Ac. |
| 6-bromo-3,4-dimethylphenyl | B | K | Ac. |
| 4-chloro-2,5-dimethylphenyl | F | H | pyridine. |
| 4-chloro-6-isopropyl-3-methylphenyl | B | Na | Ac. |
| 4-chloro-2,3-diethylphenyl | B | K | Ac. |
| 2-chloro-4,5-dimethylphenyl | B | K | H. |
| 4,6-dichloro-2-methylphenyl | B | K | TEA. |
| 4,6-dibromo-2-methylphenyl | B | K | H. |
| 4-chloro-2-nitrophenyl | B | K | H. |
| 6-chloro-2,4-dinitrophenyl | B | K | Ac. |
| 3-fluoro-4-nitrophenyl | B | K | Ac, H. |
| 3-chloro-4-fluoro-6-nitrophenyl | B | K | H. |
| 2,4-dibromo-3-fluoro-6-nitrophenyl | E | K | H. |
| 4-acetyl-2-fluoro-5-nitrophenyl | E | K | Ac. |
| 2-fluoro-4-propionylphenyl | E | K | Ac. |
| 3,4-dicarbomethoxy-2,5,6-tribromophenyl | B | K | Ac. |
| 2-acetyl-4-chlorophenyl | F | H | 3-hydroxypyridine. |
| 4-acetyl-2-bromophenyl | B | K | TEA. |
| 2-chloro-2,3-dichlorophenyl | A | Na | H. |
| 4-chloro-2-propionylphenyl | A | Na | Ac. |
| 2-acetyl-6-dimethylaminophenyl | F | H | Sulfathiazole. |
| 4-dimethylamino-2-methylphenyl | F-1 | K | Ac. |
| 4-carbomethoxy-2-dimethylaminophenyl | F-1 | K | H, OH. |
| 2-carbomethoxy-5-dimethylaminophenyl | F-1 | K | Ac. |
| 4-t-butyl-3-nitrophenyl | B | Na | Ac. |
| 2-methyl-4-nitro-5-isopropylphenyl | B | Na | H. |
| 2-methoxy-5-nitro-4-propylphenyl | B | Na | Ac. |
| 2-nitro-3,4,5-trimethyophenyl | F | H | Pyrimidine. |
| 2,3-dimethoxyphenyl | A | Na | H. |
| 3,4-dimethoxy-4-methylphenyl | A | Na | H. |
| 3,4,5-trimethoxyphenyl | A | Na | Ac. |
| m-Acetylphenyl | B | K | Ac, H. |
| o-Propionylphenyl | B | K | H, OH. |
| p-Propionylphenyl | F | H | TEA. |
| 3-carbomethoxy-5-methoxyphenyl | F | H | TEA. |
| 2-carbomethoxy-4-methoxyphenyl | B | K | H, OH. |
| 2,5-dicarbomethoxyphenyl | B | K | H. |
| 3,4-dicarbethoxyphenyl | B | K | Ac. |
| 2,4-dicarbomethoxy-3,5-dimethylphenyl | B | K | Ac. |
| 2-carbomethoxy-3-methoxy-5-methylphenyl | E | K | H. |
| 3-propylsulfinylpropyl | D | K | Ac, TMA. |
| 4-carbomethoxy-2,6-dichlorophenyl | E | K | H. |
| 4-carbomethoxy-2,6-dimethoxyphenyl | E | K | Ac, TBA. |
| 4-carbomethoxy-2-methoxy-3-nitrophenyl | E | K | Ac. |
| 3-carbomethoxy-2,4-dinitro-6-methoxyphenyl | E | K | Ac. |
| 4-indanyl | A | Na | Ac, H, TEA, OH. |
| 5-indanyl | A | Na | Ac, H, pyridine, OH. |
| 5-methyl-4-indanyl | A | Na | Ac. |
| 1-methyl-4-indanyl | A | Na | H, OH. |
| 7-methyl-4-indanyl | A | Na | H. |
| 1-methyl-5-indanyl | A | Na | N, OH. |
| 2-methyl-5-indanyl | F | H | TEA. |
| 7-methyl-5-indanyl | A | Na | H. |
| 6-t-butyl-5-indanyl | A | Na | Ac. |
| 4,6-dimethyl-5-indanyl | C | Na | Ac, H. |
| 1,1-dimethyl-4-indanyl | C | Na | Ac. |
| 1,1,2-triethyl-4-indanyl | B | K | Ac. |
| 1,1,5,6-tetramethyl-4-indanyl | B | K | Ac. |
| 5,7-dimethyl-4-indanyl | B | K | Ac. |
| 5-chloro-4-indanyl | A | Na | H. |
| 7-bromo-4-indanyl | A | Na | H. |
| 6-chloro-5-indanyl | A | Na | Ac, TEA. |
| 4-(1-indanyl)phenyl | B | K | Ac. |
| 2,4-(dicyclopent-2-enyl)phenyl | B | K | Ac. |
| 4-(α,α-dimethylbenzyl)phenyl | B | K | Ac. |
| 1-naphthyl | B | Na | Ac, H. |
| 2-naphthyl | B | Na | H, TBA, OH. |
| 1-(5,6,7,8-tetrahydronaphthyl) | B | Na | Ac, pyridine. |
| 2-(5,6,7,8-tetrahydronaphthyl) | B | Na | H, OH. |
| 3-(2-methyl-4-pyronyl) | B | Na | Ac. |
| 3-quinolyl | F-1 | K | Ac. |
| 4-quinolyl | F-1 | K | H, OH. |
| 5-quinolyl | F-1 | K | Ac. |
| 6-quinolyl | F | H | TEA. |
| 7-quinolyl | F-1 | K | H. |
| 8-quinolyl | F | H | Pyridine. |
| 5-(1,4-naphthoquinonyl) | F | H | 2-hydroxymethyl. |
| 6-(1,4-naphthoquinonyl) | B | Na | Ac. |
| 4-(coumarinyl) | C | K | H, OH. |
| 6-(coumarinyl) | C | K | Ac. |
| 3-thianaphthenyl | B | Na | Ac. |
| 4-thianaphthenyl | F | H | Pyridine] |
| 1-phenazinyl | F | H | Do. |
| 2-phenazinyl | F-1 | K | H. |
| 4-(6-methylquinolyl) | F-1 | K | Ac. |
| 2-(4-methylquinolyl) | F-1 | K | Ac. |
| 1-fluorenyl | A | Na | H, TEA. |
| 2-fluorenyl | A | Na | Ac. |
| 6-(1,2-naphthoquinonyl) | B | Na | Ac. |
| 7-(1,2-naphthoquinonyl) | B | Na | Ac. |
| 7-isoquinolyl | F | H | Pyrimidine. |
| 8-isoquinolyl | F-1 | K | H, OH. |
| 4-(1,3-benzodioxolyl) | B | K | Ac. |
| 5-(1,3-benzodioxolyl) | B | K | Ac, pyridine. |
| 3-(4-pyronyl) | B | K | H. |
| 1-(3-methyl-5,6,7,8-tetrahydronaphthyl) | C | Na | H. |
| 2-(1-methyl-5,6,7,8-tetrahydronaphthyl) | C | Na | Ac, OH. |
| 2-(4-methyl-5,6,7,8-tetrahydronaphthyl) | F | H | TEA. |
| 1-(4,4-dimethyl-5,6,7,8-tetrahydronaphthyl) | E | K | H. |
| 2-(1,6-dimethyl-5,6,7,8-tetrahydronaphthyl) | E | K | Ac. |
| 1(2,4,6-trimethyl-5,6,7,8-tetrahydronaphthyl) | E | K | Ac. |
| 2-(1,5,6-trimethyl-5,6,7,8-tetrahydronaphthyl) | E | K | Ac: |
| 2-methylsulfonylethyl | B | Na | Ac, H. |
| 2-(5,5,8,8-tetramethyl-5,6,7,8-tetrahydronaphthyl) | E | K | Ac. |
| 3-bromo-2-propionylphenyl | E | K | Ac. |
| 2-chloro-6-isopropyl-3-methyl-4-nitrophenyl | F | H | Pyridine. |
| 2-acetyl-5-dimethylaminophenyl | F-1 | Na | Ac, OH. |
| 2-carbomethoxy-5-methoxy-4-nitrophenyl | B | K | Ac. |
| 2-furyl | E | Na | Ac, H, OH. |
| 3-furyl | B | K | H, TEA. |
| 3-carbomethoxy-2,4,6-trinitrophenyl | F | H | TBA. |
| 2-(1,4-naphthoquinonly) | B | K | Ac. |
| 2-dimethylaminoethyl | F-1 | K | Ac, OH. |
| 2-dibutylaminoethyl | F-1 | K | H. |
| 2-di-n-propylaminoethyl | F-1 | K | H. |
| 2-diethylaminoethyl | F | H | TEA. |
| 3-diethylaminopropyl | F | H | TBA. |
| 3-dibutylaminopropyl | F-1 | K | Ac. |
| 2-(2-imidazolino)ethyl | F-1 | K | Ac, OH. |
| 3-(2-imidazolino)propyl | F-1 | K | H. |
| 2-piperidinoethyl | F | H | H, OH. |
| 3-piperidinopropyl | F | H | Pyridine. |
| 2-pyrrolidinoethyl | F | H | Pyridimine. |
| 3-morpholinopropyl | F | H | Ac. |
| 3-thiomorpholinopropyl | F | H | Ac. |
| 2-(1,4,5,6-tetrahydropyrimidino)ethyl | F-1 | Na | H, Ac. |
| 2-(N-methyl)piperazinoethyl | F | H | H. |
| 3-N-butylpiperazinopropyl | F | H | H. |
| 2-(2,5-dimethylpyrrolidino)ethyl | F | H | TEA. |
| 2-aziridinoethyl | F-1 | K | Ac, H, OH. |
| 2-diisobutylaminoethyl | B | Na | Ac. |
| 3-dimethylaminopropyl | B | Na | Ac. |
| 3-di-(n-propyl)aminopropyl | A | K | Ac. |
| 2-thiomorpholonoethyl | C | Na | Ac. |
| 2-(4-methylpiperidino)ethyl | C | Na | Ac. |
| Pyrrolidinomethyl | F-1 | K | Ac, H. |
| Aziridinomethyl | F-1 | K | Ac. |
| (2-imidazolino)methyl | F-1 | K | Ac. |
| (1,4,5,6-tetrahydropyrimidino)methyl | F-1 | K | Ac. |
| Pyrrolidonomethyl | F-1 | K | Ac. |
| Piperidinomethyl | F-1 | K | Ac. |
| Morpholinomethyl | F | K | Ac. |
| Thiomorpholinomethyl | F | H | Ac. |
| 3-aziridinopropyl | C | K | H. |
| 3-di-(n-propyl)amino-2-propyl | F-1 | K | H. |
| 2-diethylamino-1-propyl | F-1 | K | H, Ac. |
| 3-pyrrolidino-2-propyl | F-1 | K | H. |
| 3-piperidino-2-propyl | F-1 | K | H, Ac. |
| 3-diethylamino-2-propyl | F-1 | K | H. |
| 3-morpholino-2-propyl | F-1 | K | H. |
| 3-di-(n-butyl)amino-2-propyl | F-1 | K | H. |
| 3-dimethylamino-2-propyl | F-1 | K | H, OH. |
| 2-pyrrolidino-1-propyl | F-1 | K | H. |
| 2-di(n-butyl)amino-1-propyl | F-1 | K | H. |
| 2-thiomorpholino-1-propyl | F-1 | K | H. |

See footnote at end of table.

TABLE.—Continued

| R₂ | Method | M | R₃* |
|---|---|---|---|
| 2-(2-imidazolino)-1-propyl | F | H | Pyridine. |
| 3-(1,4,5,6-tetrahydropyrimidino)-2-propyl | F | H | Do. |
| 2-acetamidoethyl | F | H | Do. |
| 2-butyramidoethyl | F | H | Do. |
| 3-propionamidopropyl | F | H | Do. |
| 3-acetamido-2-propyl | F | H | Do. |
| 2-acetamido-1-propyl | F | H | Do. |
| 2-butylsulfonylethyl | B | Na | Ac, OH. |
| 2-(methylethylamino)ethyl | F | H | Do. |
| 2-(methylbutylamino)ethyl | F | H | Do. |
| 3-(methylpropylamino)propyl | B | K | Ac. |
| 3-(ethylisopropylamino)propyl | B | K | Ac, H. |
| 3-(methylethylamino)-2-propyl | B | K | Ac, OH. |
| 2-(methylethylamino)-1-propyl | B | K | Ac. |
| 2-(methylbutylamino)-1-propyl | B | K | Ac. |
| 3-imidazolo-2-propyl | B | K | Ac. |
| 3-aziridino-2-propyl | F-1 | K | Ac. |
| 3-pyrrolo-2-propyl | F-1 | K | Ac, TBA. |
| 3-thiomorpholino-2-propyl | F-1 | K | Ac. |
| 3-(N-methyl)piperazino-2-propyl | F-1 | K | Ac. |
| 2-piperidino-1-propyl | F-1 | K | Ac. |
| 2-morpholino-1-propyl | F-1 | K | Ac, H. |
| 2-(N-ethyl)piperazino-1-propyl | F-1 | K | Ac. |
| 3-(2-imidazolino)-2-propyl | F-1 | K | Ac. |
| 2-(2,6-dimethylpiperidino)ethyl | B | K | Ac. |
| 2-di-(n-propyl)amino-1-propyl | F-1 | K | Ac. |
| 2-(N-methylanilino)ethyl | C | Na | Ac, H. |
| 2-(N-ethylanilino)ethyl | B | K | H, OH. |
| 2-(N-isopropylanilino)ethyl | B | K | H. |
| 2-(N-n-butylanilino)ethyl | C | K | Ac. |
| 3-(N-methylanilino)propyl | C | K | Ac, OH. |
| 3-(N-isopropylanilino)propyl | C | K | Ac. |
| 3-(N-methylanilino)-2-propyl | C | K | Ac. |
| 3-(N-n-butylanilino)-2-propyl | F | H | TEA. |
| 2-(N-methylanilino)-1-propyl | F-1 | K | TEA. |
| 3-(N-ethylanilino)propyl | F-1 | K | Ac. |
| 3-pyrrolidinopropyl | F-1 | Na | H. |
| 2-pyrroloethyl | F | H | Pyridine. |
| 3-pyrrolopropyl | F-1 | Na | Ac. |
| 2-imidazoloethyl | F-1 | Na | Ac, H. |
| 2-morpholinoethyl | F-1 | Na | Ac. |
| 2-azetidinoethyl | F-1 | K | Ac. |
| Azetidinomethyl | F-1 | K | Ac. |
| 2-pyridylmethyl | B | Na | H. |
| 4-pyridylmethyl | B | Na | H. |
| 4-imidazolylmethyl | B | Na | H. |
| 2-(N-phenylimidazolyl)methyl | B | Na | H. |
| Phthalimidomethyl | B | Na | H. |
| 3-(N-methyl)pyridyl | F-1 | K | H, Ac. |
| 4-(N-methyl)pyridyl | F-1 | K | H, OH. |
| Allyl | A | Na | H, OH. |
| Crotyl | A | Na | Ac, H. |
| 3-penten-1-yl | A | Na | Ac. |
| 3-penten-2-yl | F | H | Pyridine. |
| 1-penten-5-yl | F | H | Do. |
| 3-methyl-1-buten-3-yl | B | K | H. |
| 1-hexen-3-yl | B | K | Ac. |
| 1-hexen-4-yl | B | K | Ac. |
| 3-hexen-1-yl | C | Na | Ac. |
| 2-methyl-3-penten-2-yl | C | Na | Ac. |
| 2-hepten-1-yl | F | H | TEA. |
| 1-hepten-4-yl | B | Na | Ac. |
| 2-methyl-4-hexen-3-yl | B | Na | Ac. |
| 2,2-dimethyl-3-penten-1-yl | F-1 | Na | Ac. |
| 2,4-dimethyl-1-penten-3-yl | F-1 | Na | Ac. |
| 2,2,3-trimethyl-3-buten-1-yl | B | Na | H. |
| 2-octen-1-yl | B | Na | H, OH. |
| 1-octen-3-yl | F | H | TBA. |
| 4-ethylsulfonylbutyl | B | Na | Ac. |
| Propargyl | A | Na | Ac, H, TEA. |
| 1-butyn-3-yl | A | Na | Ac, OH. |
| 2-butyn-1-yl | A | Na | Ac. |
| 1-pentyn-3-yl | A | Na | Ac. |
| 2-methyl-3-butyn-1-yl | A | Na | Ac. |
| 2-hexyn-1-yl | B | Na | Ac. |
| 5-methyl-3-hexyn-2-yl | B | Na | Ac. |
| 3-ethyl-1-pentyn-3-yl | F | H | Pyridine |
| 3-octyn-1-yl | C | Na | Ac, OH. |
| 3-octyn-2-yl | C | Na | Ac. |
| Benzyl | A | Na | Ac, H, pyridine, OH. |
| o-Chlorobenzyl | A | Na | Ac, TEA. |
| m-Chlorobenzyl | A | Na | Ac, H. |
| p-Bromobenzyl | A | Na | Ac, H. |
| m-Methylbenzyl | B | Na | Ac, OH. |
| p-Ethylbenzyl | B | Na | Ac. |
| o-Nitrobenzyl | C | K | Ac, OH. |
| m-Nitrobenzyl | C | K | Ac. |
| o-Methoxybenzyl | C | K | Ac. |
| p-Ethoxybenzyl | C | K | Ac. |
| m-Acetylbenzyl | B | K | Ac, OH. |
| p-Butyrylbenzyl | F | H | Pyrimidine. |
| o-Carbomethoxybenzyl | B | Na | Ac, OH. |
| p-(Carbo-t-butoxy)benzyl | B | Na | H. |
| o-Fluorobenzyl | A | Na | H. |
| o-Dimethylaminobenzyl | F-1 | K | H, Ac. |
| p-Dimethylaminobenzyl | F-1 | K | H, TEA. |
| Benzohydryl | B | Na | Ac, H. |
| Trityl | B | Na | H, Ac. |
| Cholesteryl | B | Na | Ac. |
| 2-furylmethyl | D | Na | Ac. |
| 2-pyridylmenty | F | H | Ac, TEA. |
| [2,2-dimethyl-1,3-dioxolon-4-yl]-methyl | B | Na | Ac. |
| (2-pyrrolidino)methyl | B | Na | Ac. |
| (4-imidazolyl)methyl | F-1 | K | Ac, H. |
| 1-indanylmethyl | B | Na | Ac. |
| 2-indanylmethyl | B | Na | Ac. |
| Phthalimidomethyl | F-1 | K | Ac, OH. |
| 4-pyridylmethyl | F-1 | K | Ac, TEA. |

*See footnotes at end of table in col. 20.

By means of these procedures but substituting R₇SH for R₂OH, the following cephalosporin C compounds are prepared.

$$\text{Ph—CH—CO—NH—CH—CH} \begin{array}{c} S \\ \diagdown \\ CH_2 \\ \diagup \end{array}$$
$$O=C—S—R_7 \quad O=C—N \diagdown C—CH_2—R_3$$
$$\qquad\qquad\qquad\qquad\qquad COOM$$

| R₇ | Method | M | R₃* |
|---|---|---|---|
| Phenyl | A | Na | Ac, H, pyridine. |
| o-Tolyl | A | Na | Ac, OH. |
| m-Tolyl | A | Na | Ac, H. |
| p-Tolyl | A | Na | Ac, H. |
| o-Ethylphenyl | B | K | Ac, TEA. |
| p-Ethylphenyl | B | K | Ac. |
| o-Isopropylphenyl | B | K | Ac, H. |
| p-Isopropylphenyl | B | K | Ac. |
| p-Butylphenyl | B | K | Ac. |
| p-t-Butylphenyl | B | K | Ac. |
| 3,5-dimethylphenyl | F | H | Pyridine. |
| 2,5-diethylphenyl | B | K | H. |
| 4-t-butyl-2-isopropylphenyl | B | K | H. |
| o-Chlorophenyl | B | Na | Ac, OH. |
| m-Chlorophenyl | F | H | TEA. |
| p-Chlorophenyl | B | Na | H. |
| p-Bromophenyl | B | Na | Ac. |
| m-Fluorophenyl | B | Na | Ac, OH. |
| p-Fluorophenyl | B | Na | Ac, H. |
| 2,4-dichlorophenyl | A | Na | Ac. |
| 3,4-dichlorophenyl | A | Na | Ac. |
| 4-bromo-3-chlorophenyl | A | Na | Ac. |
| 2,3,5-trichlorophenyl | A | Na | Ac. |
| 2,4-dibromophenyl | A | Na | Ac. |
| 2,4,5-tribromophenyl | A | Na | Ac. |
| 4-chloro-2-methylphenyl | B | Na | Ac, H. |
| 6-chloro-3-isopropylphenyl | B | Na | Ac. |
| 4-bromo-3-methylphenyl | B | Na | Ac. |
| 2-chloro-3,5-dimethylphenyl | B | K | H. |
| 4,6-dichloro-3-dimethylphenyl | A | Na | H, Ac. |
| 2,4-difluorophenyl | A | Na | H. |
| o-Trifluoromethylphenyl | F | H | Pyridine. |
| m-Trifluoromethylphenyl | A | Na | Ac. |
| p-Trifluoromethylphenyl | A | Na | Ac, OH. |
| m-Methoxyphenyl | C | Na | H, Ac. |
| p-Methoxyphenyl | C | Na | H. |
| o-Ethoxyphenyl | F | H | TEA. |
| p-Propoxyphenyl | C | Na | H, OH. |
| p-Isobutoxyphenyl | C | Na | Ac. |
| 2-methoxy-4-methylphenyl | C | Na | Ac. |
| 3-methoxy-4-methylphenyl | C | Na | Ac. |
| 3-t-butyl-4-methoxyphenyl | B | K | H. |
| 4-methoxy-3,5-dimethylphenyl | F | H | Pyrimidine. |
| 2,5-dimethoxyphenyl | F | H | Ac. |
| 3,4-di-isopropoxyphenyl | F | H | Ac. |
| 4-methoxy-2,5-dipropylphenyl | F-1 | K | Ac. |
| 2-chloro-4-methoxyphenyl | C | Na | H. |
| 4-butoxy-2-chlorophenyl | E | Na | Ac. |
| 2,5-dichloro-4-ethoxyphenyl | B | K | Ac. |
| 3-ethyl-4-methoxyphenyl | B | K | Ac, OH. |

*Ac=acetoxy; TEA=triethylamine; TBA=tributylamine; TPA=tripropylamine; TMA=trimethylamine.

EXAMPLE XI

The following cephalosporin C compounds are prepared by the procedures of Example X from the appropriate aryl halo carbonyl ketenes of Examples II and III.

$$R_1—CH—CO—NH—CH—CH \begin{array}{c} S \\ \diagdown \\ CH_2 \\ \diagup \end{array}$$
$$\quad COOR_2 \quad O=C—N \diagdown C—CH_2R_3$$
$$\qquad\qquad\qquad\qquad COOM$$

For each of the R₂ values listed R₁=2-thienyl, 3-thienyl, 2-pyridyl, 2-furyl and o-tolyl.

| R₂ | Method | M | R₃ |
|---|---|---|---|
| Methyl | A | Na | Ac, H, OH. |
| Ethyl | F | H | Pyridine. |
| t-Butyl | F | H | Pyrimidine. |
| Decyl | D | K | Ac, OH. |
| Octadecyl | F | H | TEA. |

TABLE.—Continued

| R₂ | Method | M | R₃ |
|---|---|---|---|
| 2-chloroethyl | A | Na | Ac, H. |
| 3-chloropropyl | A | Na | Ac, OH. |
| 2-chloro-1-butyl | A | Na | Ac. |
| 4-chloro-1-butyl | A | Na | Ac. |
| 1-ethyl-2-chloroethyl | A | Na | Ac. |
| 2-bromoethyl | B | K | H. |
| 3-bromopropyl | F | H | TBA. |
| 1,3-dichloropropyl | A | Na | Ac. |
| 2-bromo-3-chloropropyl | A | Na | Ac. |
| 1,4-dibromo-2-butyl | A | Na | Ac. |
| 1-bromomethyl-2-chloroethyl | A | Na | Ac. |
| 1,1-dimethyl-2,2-dichloroethyl | A | Na | H. |
| 2,2,3-tribromopropyl | A | Na | Ac, OH. |
| 2,2,3,3-tetrabromopropyl | A | Na | Ac. |
| 2,2,2-trichloroethyl | A | Na | Ac, TEA. |
| 2,2,2-trifluoroethyl | A | Na | Ac, H. |
| 3,3,3-trifluoropropyl | A | Na | H, OH. |
| 2-nitroethyl | B | K | Ac, TEA. |
| 3-nitropropyl | B | K | H, OH. |
| 2-nitrobutyl | B | K | H. |
| 2,2-dinitroethyl | C | Na | Ac. |
| 1-ethyl-2,2-dinitroethyl | C | Na | Ac. |
| 2-chloro-2-nitropropyl | B | Na | Ac. |
| 3-methyl-3-nitropropyl | B | Na | Ac. |
| 1-trichloromethyl-2-nitroethyl | F | H | Nicotine. |
| 1,1-dimethyl-2,2,2-trifluoroethyl | A | Na | Ac, H. |
| 1,1-dimethyl-2,2,2-trichlorethyl | A | Na | Ac, OH. |
| 2-methoxyethyl | F-1 | K | Ac, pyridine. |
| 2-n-butoxyethyl | F-1 | K | Ac. |
| 3-methoxypropyl | F-1 | K | H, OH. |
| 4-methoxy-n-butyl | F-1 | K | H. |
| 1,1-dimethyl-2-methoxyethyl | F-1 | K | H. |
| 2-cyanoethyl | F | H | Sulfathiazole. |
| 4-cyanobutyl | E | K | Ac. |
| 1-cyano-2-chloropropyl | B | K | Ac. |
| 1-cyano-2,2,2-trichloroethyl | B | K | Ac. |
| 1-methyl-1-(1'-cyano-1'-methylethoxy)ethyl | B | K | H. |
| 2-acetoxyethyl | B | Na | Ac, H. |
| 2-butyryloxyethyl | B | Na | Ac. |
| 3-acetoxypropyl | B | Na | Ac, OH. |
| 2-acetoxy-n-butyl | B | Na | Ac. |
| Carbomethoxymethyl | F | H | Pyridine. |
| 3-carbobutoxypropyl | B | Na | H. |
| 4-carbethoxybutyl | C | Na | Ac, OH. |
| 2-carbethoxypropyl | C | Na | TEA. |
| 1-carbethoxyphenyl | C | Na | Ac. |
| 1-trichloromethyl-2-carbomethoxyethyl | F | H | Pyridine. |
| 1-carbethoxy-2-chloropropyl | B | K | Ac. |
| 1-carbomethoxy-2,2,2-trichloroethyl | B | K | H, TBA. |
| 1-carbomethoxy-2-chloroethyl | B | K | H. |
| 1-carbomethoxymethyl-2,2,2-trichloroethyl | B | K | Ac, OH. |
| Acetonyl | E | Na | Ac. |
| 4-oxopentyl | E | Na | H. |
| 1,1-dimethylacetonyl | E | Na | H. |
| 1-acetyl-1-methylpropyl | B | Na | H. |
| 2-methyl-3-oxopentyl | F | H | Pyrimidine. |
| 1-acetonylbutyl | F | H | Do. |
| 1-methyl-3-oxohexyl | F | H | Do. |
| 5-oxohexyl | B | Na | Ac, OH. |
| 1-methoxy-2,2,2-trichlorethyl | A | Na | Ac, OH. |
| 1-butoxy-2,2,2-trichloroethyl | A | Na | H. |
| 1-methoxy-2,2,2-trifluoroethyl | A | Na | H. |
| 1-ethoxy-2,2,2-trifluoroethyl | A | Na | H. |
| 2,3-diacetoxypropyl | B | K | Ac, OH. |
| 2,3-dicapryloxypropyl | B | K | Ac, H. |
| 2,3-distearoyloxypropyl | F | H | Pyridine. |
| (1,2,3-tricarbomethoxy)-2-propyl | B | K | Ac. |
| (1,2,3-tricarbobutoxy)-2-propyl | B | K | H. |
| 2-chloro-3,3-dimethoxypropyl | B | K | Ac. |
| 3,3-diethoxypropyl | B | K | Ac. |
| 2-oxo-3-chloropropyl | B | Na | Ac. |
| 1-trichloromethyl-3-oxobutyl | B | K | Ac, H. |
| 2-fluoroethyl | A | Na | H. |
| 3-fluoropropyl | A | Na | H. |
| 1-trichloromethyl-2,3,3,3-tetrachloropropyl | A | Na | Ac. |
| 4,4,4-trifluorobutyl | A | Na | Ac. |
| 1-methoxy-2-chloro-2,2-difluoroethyl | A | Na | H, TEA. |
| Phenyl | B | Na | Ac, H, TEA, OH. |
| σ-Tolyl | B | Na | H. |
| m-Tolyl | B | Na | Ac. |
| p-Tolyl | B | Na | H, Ac. |
| σ-Isopropylphenyl | F | H | Pyridine. |
| p-t-Butylphenyl | B | Na | Ac. |
| σ-Methoxyphenyl | B | Na | Ac, TEA. |
| p-Methoxyphenyl | B | Na | H, OH. |
| m-Ethoxyphenyl | B | Na | H. |
| p-n-Butoxyphenyl | B | Na | H. |
| σ-Chlorophenyl | A | Na | H, Ac. |
| p-Chlorophenyl | A | Na | Ac, pyridine. |
| m-Bromophenyl | A | Na | Ac. |
| m-Fluorophenyl | A | Na | Ac. |
| p-Fluorophenyl | A | Na | Ac, TBA. |
| σ-Formylphenyl | A | Na | Ac. |
| m-Formylphenyl | A | Na | Ac. |
| p-Acetylphenyl | A | Na | Ac, H. |
| p-Butyrylphenyl | A | Na | Ac. |
| σ-Nitrophenyl | C | K | Ac. |
| m-Nitrophenyl | C | K | Ac, pyrimidine. |
| m-Carbomethoxyphenyl | C | Na | |
| p-Carbomethoxyphenyl | C | Na | Ac, H. |
| σ-Carbethoxyphenyl | C | Na | Ac, TEA. |
| p-Carbo-n-propoxyphenyl | C | Na | Ac. |
| σ-Dimethylaminophenyl | F-1 | K | Ac, H. |
| m-Di-n-propylaminophenyl | F-1 | K | Ac. |
| p-Methylethylaminophenyl | F-1 | K | Ac, OH. |
| p-Methylisopropylaminophenyl | F-1 | K | Ac. |
| 2,3-dimethylphenyl | D | K | Ac. |
| 2,5-diethylphenyl | D | K | H. |
| 5-ethyl-3-methylphenyl | D | K | H. |
| 3-methyl-4-t-butylphenyl | B | Na | H. |
| 2,4,6-trimethylphenyl | B | Na | Ac. |
| 4,5-dimethyl-2-isopropylphenyl | B | Na | Ac. |
| Pentamethylphenyl | F | H | Picolinic acid. |
| 2,6-dichlorophenyl | A | Na | Ac, H. |
| 2,4-dibromophenyl | A | Na | Ac. |
| 2,3,4-trichlorophenyl | A | Na | Ac. |
| Pentachlorophenyl | A | Na | Ac. |
| Pentabromophenyl | A | Na | Ac. |
| 3,5-dinitrophenyl | C | Na | Ac. |
| 2,3,6-trinitrophenyl | C | Na | Ac, H. |
| Pentanitrophenyl | C | Na | H. |
| 2,3,5-trifluorophenyl | F | H | Sulfapyridine. |
| Pentafluorophenyl | F | H | TEA. |
| 2-chloro-5-fluorophenyl | A | Na | Ac. |
| 2-bromo-3-fluorophenyl | A | Na | Ac. |
| 2,4-dichloro-3-fluorophenyl | A | Na | Ac. |
| 2-bromo-3,5-dichloro-4-fluorophenyl | A | Na | Ac. |
| 2-methoxy-4-methylphenyl | A | Na | H, Ac. |
| 5-bromo-2-methoxyphenyl | A | Na | H. |
| 2-chloro-6-methoxyphenyl | A | Na | H. |
| 2-ethoxy-3-methylphenyl | B | K | H, OH. |
| 2-carbomethoxy-5-fluorophenyl | F | H | Pyridine. |
| 5-fluoro-2-methoxyphenyl | F | H | Do. |
| 2-acetyl-4-fluorophenyl | F | H | Do. |
| 6-chloro-2-methylphenyl | F | H | Do. |
| 2-fluoro-4-methylphenyl | B | Na | Ac. |
| 2-bromo-4-t-butylphenyl | B | Na | Ac. |
| 2-chloro-4-isopropylphenyl | B | Na | Ac. |
| 2-ethyl-4-fluorophenyl | B | Na | Ac. |
| 5-bromo-2,3-dimethylphenyl | B | K | Ac. |
| 4-chloro-2,3-dimethylphenyl | B | K | Ac, OH. |
| 4,6-dibromo-2-methylphenyl | B | K | H. |
| 2,4-dichloro-3,5-dimethylphenyl | B | K | H. |
| 4-chloro-2-nitrophenyl | B | H | K. |
| 4-chloro-2,6-dinitro-6-methylphenyl | E | K | H, OH. |
| 3-fluoro-4-nitrophenyl | B | K | H. |
| 6-bromo-4-fluoro-2-nitrophenyl | E | K | Ac. |
| 4-chloro-5-fluoro-2-nitrophenyl | E | K | Ac. |
| 4-carbethoxy-2-fluoro-5-nitrophenyl | E | K | Ac, H. |
| 2-acetyl-6-bromo-4-fluorophenyl | E | K | Ac. |
| 2-fluoro-4-butyrylphenyl | E | K | Ac. |
| 5-(1,3-benzodioxooyl) | B | K | Ac, TEA. |
| 3,4-dicarbomethoxy-2,5,6-tribromophenyl | B | K | H, TMP¹ |
| 2-acetyl-4-chlorophenyl | F | H | TEA. |
| 4-acetyl-2-bromophenyl | F | H | TEA. |
| 2-acetyl-3,5-dichlorophenyl | F | H | TEA. |
| 2-acetyl-6-chloro-4-methylphenyl | F | H | TEA. |
| 2-acetyl-6-dimethylaminophenyl | F-1 | K | H, Ac. |
| 4-dimethylamino-2-methylphenyl | F-1 | K | H, TBA. |
| 4-carbomethoxy-2-dimethylaminophenyl | F | H | Pyramidine. |
| 2-carbomethoxy-5-dimethylaminophenyl | F-1 | K | H. |
| 4-t-butyl-3-nitrophenyl | B | Na | Ac. |
| 2-methyl-4-nitro-5-isopropylphenyl | F | H | TEA. |
| 6-nitro-1,2,3,4-tetramethylphenyl | B | Na | Ac. |
| 2-methoxy-5-nitro-4-propylphenyl | B | Na | Ac, H. |
| 2,6-dimethoxyphenyl | A | Na | Ac. |
| 3,4-dimethoxy-4-methylphenyl | A | Na | Ac, pyridine. |
| 3,5-diethoxy-2,6-dimethylphenyl | A | Na | Ac. |
| 3,4,5-trimethoxyphenyl | A | Na | Ac. |
| m-Acetylphenyl | B | K | Ac, H. |
| σ-Propionylphenyl | B | K | Ac. |
| 3-carbomethoxy-5-methoxyphenyl | B | K | Ac, nicotine. |
| 2,5-dicarbomethoxyphenyl | B | K | Ac, TEA. |
| 3,4-dicarbethoxyphenyl | B | K | Ac. |
| 2,4-dicarbomethoxy-3,5-dimethylphenyl | B | K | Ac. |
| -carbomethoxy-2,5-dimethyl-4-methoxyphenyl | E | K | Ac. |
| 2-methylmercaptoethyl | A | Na | Ac, OH. |
| 3-propylmercaptopropyl | A | Na | Ac. |
| 2-methylsulfinylethyl | D | K | Ac. |
| 3-propylsulfinylpropyl | D | K | Ac, OH. |
| 2-methylsulfonylethyl | B | Na | Ac. |
| 4-ethylsulfonylbutyl | B | Na | Ac, H. |
| 2-isobutylsulfonylethyl | B | Na | Na OH. |
| -carbomethoxy-6-methoxy-4-methylphenyl | E | K | Ac. |
| 4-carbomethoxy-2,6-dichlorophenyl | E | K | Ac, H. |
| 2-carbomethoxy-3,5-dimethoxy-4,6-dimethylphenyl | E | K | Ac. |
| 5-carbomethoxy-2,3-dimethoxyphenyl | E | K | Ac. |
| 2-bromo-4-carbomethoxy-6-methoxyphenyl | E | K | Ac. |
| 4-carbomethoxy-2-methoxy-3-nitrophenyl | E | K | Ac, H. |
| 3-carbomethoxy-2,4-dinitro-6-methoxyphenol | E | K | Ac. |
| 4-indanyl | A | Na | Ac, H, pyridine. |
| 5-indanyl | A | Na | Ac, H, pyridine, OH. |
| 1-methyl-4-indanyl | A | Na | H. |
| 4-methyl-4-indanyl | A | Na | H. |
| 1-methyl-5-indanyl | A | Na | H, Ac. |
| 6-methyl-5-indanyl | A | Na | H. |
| 6-t-butyl-5-indanyl | A | Na | H. |
| 4,6-dimethyl-5-indanyl | C | Na | Ac. |
| 1,1-dimethyl-4-indanyl | C | Na | Ac. |
| 1,1,2-trimethyl-4-indanyl | C | Na | Ac. |
| 1,1,5,6-tetramethyl-4-indanyl | F | H | TEA. |

See footnote at end of table.

TABLE.—Continued

| R₂ | Method | M | R₃ |
|---|---|---|---|
| 5-chloro-4-indanyl | F | H | TEA. |
| 5-bromo-4-indanyl | F | H | TEA. |
| 6-chloro-5-indanyl | F | H | TEA. |
| 4-(1-indanyl)phenyl | B | Na | Ac. |
| 1-naphthyl | F | H | Pyrimidine. |
| 2-naphthyl | B | Na | Ac, H. |
| 1-(5,6,7,8-tetrahydronaphthyl) | B | Na | Ac, H. |
| 2-(5,6,7,8-tetrahydronaphthyl) | B | Na | Ac, H. |
| 3-(2-methyl-4-pyronyl) | B | Na | Ac. |
| 4-quinolyl | F | M | Nicotinamide. |
| 8-quinolyl | F-1 | K | Ac, OH. |
| 5-(1,4-naphthoquinonyl) | B | Na | H. |
| 6-(1,4-naphthoquinonyl) | B | Na | Ac. |
| 4-(coumarinyl) | C | K | Ac. |
| 6-(coumarinyl) | C | K | Ac. |
| 3-thianaphthenyl | B | Na | Ac. |
| 1-phenazinyl | B | F-1 | K | Ac, H. |
| 2-phenazinyl | F-1 | K | Ac. |
| 4-(6-methylquinolyl) | F-1 | K | Ac. |
| 1-fluorenyl | A | Na | Ac. |
| 2-fluorenyl | A | Na | Ac, OH. |
| 6-(1,2-naphthoquinonyl) | B | Na | Ac. |
| 7-isoquinolyl | F-1 | K | Ac. |
| 8-isoquinolyl | F-1 | K | Ac. |
| 3-(4-pyronyl) | F | H | Pyridine. |
| 1-(3-methyl-5,6,7,8-tetrahydronaphthyl) | F | H | Pyrimidine. |
| 2-(1-methyl-5,6,7,8-tetrahydronaphthyl) | F | H | Do. |
| 1-(4,8-dimethyl-5,6,7,8-tetrahydronaphthyl) | E | K | Ac. |
| 2-(1,6-dimethyl-5,6,7,8-tetrahydronaphthyl) | E | K | Ac. |
| 2-(1,5,6-trimethyl-5,6,7,8-tetrahydronaphthyl) | E | K | H. |
| 1-(1,2,4-triethyl-5,6,7,8-tetrahydronaphthyl) | E | K | Ac. |
| 4-bromo-2-carbomethoxy-5-methylphenyl | C | Na | Ac. |
| 2-chloro-4,5-dimethyl-6-nitrophenyl | B | Na | Ac. |
| 2-isobutyryl-4,6-dimethylphenyl | C | Na | Ac. |
| 2-acetyl-5-dimethylaminophenyl | F-1 | K | Ac. |
| 2-furyl | E | Na | H, TBA. |
| 3-furyl | E | K | Ac, H. |
| 2-(1,4-naphthoquinonyl) | B | H | H. |
| Cyclopropyl | F | H | Pyrimidine. |
| Cyclobutyl | A | Na | H. |
| Cyclopentyl | A | Na | Ac, OH. |
| Cyclohexyl | A | Na | Ac, H. |
| Cycloheptyl | A | Na | Ac. |
| 1-methyl-1-cyclopentyl | A | Na | Ac. |
| 3-methyl-1-cyclopentyl | A | Na | Ac. |
| 1,3-dimethyl-1-cyclopentyl | F | H | TEA. |
| 1,2,5-trimethyl-1-cyclopentyl | B | K | Ac. |
| 3-isopropyl-1-cyclopentyl | B | K | Ac. |
| 4-methyl-1-cyclohexyl | B | K | H. |
| 1-ethyl-1-cyclohexyl | B | K | H. |
| 1-isopropyl-1-cyclohexyl | B | K | H. |
| 4-t-butyl-1-cyclohexyl | B | K | Ac. |
| 2,2-dimethyl-1-cyclohexyl | B | K | Ac. |
| 1,2-dimethyl-1-cyclohexyl | B | K | Ac. |
| 2,2,6-trimethyl-1-cyclohexyl | D | Na | Ac. |
| 1,3,5-trimethyl-1-cyclohexyl | F | H | Pyridine. |
| 2-methyl-6-propyl-1-cyclohexyl | F | H | Do |
| 1,2,4,5-tetramethyl-1-cyclohexyl | F-1 | K | Ac. |
| 1-methyl-1-cycloheptyl | F-1 | K | Ac. |
| 1-(1,2,3,4-tetrahydronaphthyl) | F-1 | K | Ac. |
| 3-ethyl-1-indanyl | B | K | H. |
| 7-methyl-1-indanyl | B | K | H. |
| 2,2-dimethyl-1-indanyl | B | K | H, Ac. |
| 2,3-diethyl-1-indanyl | B | K | H. |
| 2-chloro-1-indanyl | A | Na | Ac. |
| 3-bromo-1-indanyl | A | Na | Ac. |
| 1-chloro-2-indanyl | F | H | TEA. |
| 9-fluorenyl | B | K | Ac, H. |
| 2,4-dipropyl-1-cyclopentyl | B | K | Ac. |
| 2,2,3,6,6-pentamethyl-1-cyclohexyl | B | K | Ac. |
| 1,5-dimethyl-2-isopropyl-1-cyclohexyl | B | K | Ac. |
| 1-(4-methyl-1,2,3,4-tetrahydronaphthyl) | B | K | H. |
| 1-(7-methyl-1,2,3,4-tetrahydronaphthyl) | B | K | H. |
| 1-(2,4-dimethyl-1,2,3,4-tetrahydronaphthyl) | B | K | Ac. |
| 1-(5,8-dimethyl-1,2,3,4-tetrahydronaphthyl) | B | K | Ac. |
| 1-(1,5,8-trimethyl-1,2,3,4-tetrahydronaphthyl) | F | H | TBA. |
| 1-(6-methyl-1,2,3,4-tetrahydronaphthyl) | B | K | Ac. |
| 2-(2,6-dimethyl-1,2,3,4-tetrahydronaphthyl) | B | K | Ac. |
| 2-(1,2,3,4-tetrahydronaphthyl) | F | H | TMA. |
| 1-indanyl | B | K | Ac, H. |
| 2-indanyl | B | K | H. |
| 2-methyl-1-indanyl | B | K | Ac. |
| 2-methyl-2-indanyl | B | K | Ac, OH. |
| 1-ethyl-1-indanyl | B | K | Ac. |
| 2-bicyclo-[4.4.0]-decyl | A | Na | Ac, H, OH. |
| 3-bicyclo-[4.4.0]-decyl | F | H | TEA. |
| 1-(1-methyl-1,2,3,4-tetrahydronaphthyl) | B | K | Ac. |
| 2-pyridylmethyl | B | Na | Ac. |
| 4-pyridylmethyl | B | Na | Ac. |
| 4-imidazoylmethyl | B | Na | Ac. |
| 2-(N-phenylimidazolyl)methyl | B | Na | Ac. |
| Phthalimidomethyl | B | Na | Ac. |
| 2-(N-methylanilino)ethyl | B | Na | Ac, OH. |
| 2-dimethylaminoethyl | F-1 | Na | Ac. |
| 2-dibutylaminoethyl | F-1 | Na | Ac. |
| 3-diethylaminopropyl | F-1 | Na | H. |
| 2-(2-imidazolino)ethyl | F | H | Ac. |
| 2-piperidinoethyl | F | H | Ac. |
| 3-morpholinopropyl | F | H | Ac, H. |
| 3-thiomorpholinopropyl | F-1 | K | Ac, OH. |
| 2-pyrrolidinoethyl | F-1 | K | Ac, H. |
| 2-(2-imidazolino)ethyl | F-1 | K | Ac, OH. |
| 2-pyrroloethyl | F-1 | K | Ac, H. |
| 2-(N-methyl)piperazinoethyl | F | H | Ac. |
| 3-(N-butyl)piperazinopropyl | F | H | Ac. |
| 2-(1,4,5,6-tetrahydropyrimidino)ethyl | F-1 | K | Ac, OH. |
| 3-imidazolopropyl | F-1 | K | H. |
| 3-di-(n-propylamino)-2-propyl | F-1 | K | H. |
| 2-diethylamino-1-propyl | F-1 | K | H, Ac. |
| 3-pyrrolidino-2-propyl | F-1 | K | Ac, H. |
| 3-piperidino-2-propyl | F-1 | K | H. |
| 3-diethylamino-2-propyl | F-1 | K | H, OH. |
| 3-morpholino-2-propyl | F-1 | K | Ac, H. |
| 3-di-(n-butyl)amino-2-propyl | F-1 | K | H. |
| 3-dimethylamino-2-propyl | F-1 | K | H. |
| 2-acetamidoethyl | B | K | Ac, H. |
| 3-butyramidopropyl | B | K | H. |
| 3-acetamido-2-propyl | B | K | H, OH. |
| 2-acetamido-1-propyl | B | K | H. |
| 2-(methylethylamino)ethyl | A | K | Ac. |
| 2-(ethylbutylamino)ethyl | A | K | Ac. |
| 2-(methylisopropylamino)ethyl | B | K | Ac, H. |
| 2-aziridinoethyl | B | K | Ac. |
| 2-thiomorpholinoethyl | B | K | Ac. |
| 2-(4-methylpiperidino)ethyl | B | K | Ac. |
| 3-diisopropylaminopropyl | C | Na | Ac, H. |
| 3-piperidinopropyl | C | Na | Ac. |
| 3-pyrrolidinopropyl | C | Na | Ac. |
| 3-(1,4,5,6-tetrahydropyrimidino)propyl | C | Na | Ac. |
| 3-azetidinopropyl | B | K | Ac, H. |
| 3-(2,6-dimethylpiperidino)propyl | B | K | Ac. |
| 3-(N-methylanilino)propyl | F | H | Pyridine. |
| 3-(methylethylamino)-2-propyl | F | H | Do. |
| 3-pyrrolo-2-propyl | D | K | Ac. |
| 3-(2-imidazolino)-2-propyl | D | K | H, ac. |
| 3-imidazolo-2-propyl | D | K | H. |
| 2-dimethylamino-1-propyl | D | K | H. |
| 3-di(n-butyl)amino-1-propyl | E | K | H. |
| 2-N-methylpiperazino-1-propyl | E | K | H. |
| 3-pyrrolo-1-propyl | E | K | H. |
| 2-(2-imidazolino)-1-propyl | E | K | H, OH. |
| 2-(2,5-dimethylpyrrolidino)-1-propyl | F | H | TEA. |
| Aziridinomethyl | F | H | Pyridine. |
| Piperidinomethyl | F | H | Do. |
| (2-imidazolino)methyl | F | H | Do. |
| N-ethylpiperazinomethyl | F | H | Do. |
| (4-methylpiperidino)methyl | F | H | Do. |
| Pyrrolomethyl | F | H | Do. |
| 3-(N-methylanilino)-2-propyl | F-1 | K | Ac, H. |
| 2-(N-methylanilino)-1-propyl | F-1 | K | Ac. |
| 3-(N-methyl)pyridyl | F-1 | Na | Ac. |
| Allyl | A | Na | Ac, H. |
| Crotyl | A | Na | H, OH. |
| 1-penten-5-yl | B | K | Ac. |
| 2-methyl-3-buten-1-yl | B | K | Ac. |
| 5-hexen-2-yl | C | Na | Ac. |
| 2-methyl-3-penten-2-yl | B | Na | Ac. |
| 6-hepten-1-yl | B | Na | Ac. |
| 2-hepten-4-yl | B | Na | Ac, H. |
| 2-methyl-3-hexen-2-yl | B | Na | Ac. |
| 3-methyl-5-hexen-3-yl | F-1 | Na | Ac. |
| 2,4-dimethyl-2-penten-4-yl | B | Na | Ac. |
| 2,2,3-trimethyl-3-buten-1-yl | B | Na | Ac. |
| 2-octen-1-yl | F | H | TEA. |
| Propargyl | A | Na | H, pyridine. |
| 1-butyn-3-yl | A | Na | H, OH. |
| 1-pentyn-3-yl | A | Na | Ac. |
| 1-hexyn-1-yl | B | Na | Ac. |
| 1-hexyn-3-yl | B | Na | Ac. |
| 2-heptyn-1-yl | B | Na | Ac. |
| 2,2,3-trimethyl-4-pentyn-3-yl | C | Na | Ac. |
| 3-octyn-1-yl | F | H | Pyrimidine. |
| Benzyl | A | Na | Ac, H, OH. |
| o-Chlorobenzyl | A | Na | Ac, H. |
| p-Bromobenzyl | A | Na | Ac, OH. |
| m-Methylbenzyl | A | Na | Ac. |
| p-Ethylbenzyl | B | Na | Ac. |
| o-Nitrobenzyl | C | K | Ac, OH. |
| m-Nitrobenzyl | C | K | Ac, OH. |
| o-Methoxybenzyl | C | K | Ac, H. |
| p-Ethoxybenzyl | C | K | Ac. |
| p-Butyrylbenzyl | B | K | Ac. |
| o-Carbomethoxybenzyl | B | Na | Ac. |
| o-Fluorobenzyl | A | Na | Ac. |
| o-Dimethylaminobenzyl | F-1 | K | Ac, H. |
| Benzohydryl | B | Na | Ac, H, OH. |
| Trityl | B | Na | Ac, H, OH. |
| Cholesteryl | B | Na | Ac, H. |
| 2-furylmethyl | D | Na | Ac, H. |
| 3-pyridylmethyl | F | H | Ac, H. |
| (2,2-diethyl-1,3-dioxolon-4-yl)-methyl | B | Na | Ac, H. |
| (2-pyrrolidono)methyl | B | Na | H. |
| (4-imidazolyl)methyl | F-1 | K | H. |
| 1-indanylmethyl | B | Na | H. |
| Phthalimidomethyl | F-1 | K | H. |
| (4-N-methyl)pyridyl | F-1 | K | H. |

¹ TMP=2,4,6-trimethylpyridine.

Substitution of $R_2OH$ by $R_7SH$ in this procedure produces the following cephalosporin compounds:

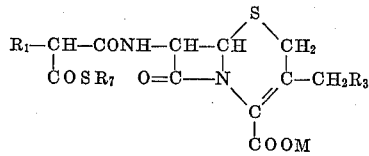

| $R_7$ | Method | M | $R_3$ |
|---|---|---|---|
| Phenyl | A | Na | Ac, H, pyridine, OH. |
| o-Tolyl | A | Na | Ac, H. |
| p-Tolyl | A | Na | Ac, OH. |
| m-Tolyl | B | K | Ac. |
| p-Tolyl | F | H | Pyridine. |
| p-t-Butylphenyl | B | K | Ac. |
| 2,5-dimethylphenyl | B | K | Ac. |
| 2,5-diethylphenyl | B | K | Ac. |
| o-Chlorophenyl | B | Na | Ac, H. |
| p-Chlorophenyl | B | Na | H, OH. |
| m-Bromophenyl | B | Na | H, OH. |
| p-Fluorophenyl | B | Na | H. |
| 2,4-dichlorophenyl | A | Na | H. |
| 2,3,5-trichlorophenyl | A | Na | Ac. |
| 2,4-dibromophenyl | F | H | TEA. |
| 2,4,5-tribromophenyl | A | Na | Ac. |
| 6-chloro-3-methylphenyl | B | Na | H. |
| 6-chloro-3-isopropylphenyl | B | Na | H. |
| 2-chloro-3,5-dimethylphenyl | B | Na | H. |
| 5-chloro-2,4-dimethylphenyl | B | Na | H. |
| 2,4-difluorophenyl | A | Na | Ac. |
| m-Trifluoromethylphenyl | A | Na | Ac. |
| p-Trifluoromethylphenyl | A | Na | Ac. |
| m-Methoxyphenyl | C | Na | Ac, OH. |
| o-Ethoxyphenyl | C | Na | H, pyridine. |
| p-Butoxyphenyl | C | Na | Ac. |
| 2-methoxy-4-methylphenyl | C | Na | Ac. |
| 3-methoxy-4-methylphenyl | C | Na | Ac. |
| 3-t-butyl-4-methoxyphenyl | B | K | Ac. |
| 4-methoxy-2,5-dimethylphenyl | B | K | Ac. |
| 2,5-dimethoxyphenyl | F | H | Ac, H. |
| 4-methoxy-2,5-dipropylphenyl | F-1 | K | Ac. |
| 2-chloro-4-methoxyphenyl | A | Na | Ac. |
| 4-bromo-3-methoxyphenyl | A | Na | Ac. |
| 4-butoxy-2-chlorophenyl | E | Na | Ac. |
| 2,5-dichloro-4-ethoxyphenyl | B | K | Ac, OH. |

EXAMPLE XII

Other arylhalocarbonyl ketenes of Examples II and III wherein $R_1$ is 3-furyl, 3-pyridyl, 4-pyridyl, p-tolyl, o-methoxyphenyl, p-methoxyphenyl, p-trifluoromethylphenyl, p-chlorophenyl, o-dimethylaminophenyl and p-dimethylaminophenyl, are converted to cephalosporins by the compounds of Example X. For convenience only the $R_2$ and $R_3$ values are listed.

| $R_2$ | Method | M | $R_3$ |
|---|---|---|---|
| Methyl | A | Na | Ac, OH, H. |
| n-Butyl | A | Na | Ac. |
| Decyl | D | K | H, pyridine. |
| Tetradecyl | B | Na | Ac, OH. |
| 2-chloroethyl | A | Na | Ac, H. |
| 3-chloropropyl | F | H | Pyridine. |
| 3-chloro-1-butyl | A | Na | OH. |
| 1-methyl-3-chloropropyl | A | Na | H. |
| 2,2-dimethyl-2-chloroethyl | A | Na | Ac, H. |
| 2-bromoethyl | B | K | Ac. |
| 3-bromopropyl | B | K | Ac, TEA. |
| 1,3-dichloropropyl | F | H | Pyridine. |
| 2,3-dibromopropyl | A | Na | Ac. |
| 2-bromo-3-chloropropyl | A | Na | Ac. |
| 3,4-dichloro-1-butyl | A | Na | Ac. |
| 2,2-dichloroethyl | A | Na | H, OH. |
| 2,3,3-tribromopropyl | A | Na | Ac. |
| 2,2,3-trichlorobutyl | A | Na | Ac. |
| 2,2,3,3-tetrabromopropyl | A | Na | Ac. |
| 2,2,2-trichloroethyl | A | Na | H, TEA. |
| 2,2,2-trifluoroethyl | A | Na | H, TEA. |
| 3,3,3-trifluoropropyl | A | Na | Ac. |
| 2-nitroethyl | B | K | Ac, H, OH. |
| 3-nitropropyl | B | K | H. |
| 3-nitrobutyl | B | K | Nicotine. |
| 1-methyl-2-nitropropyl | B | K | Ac. |
| 2,2-dinitroethyl | C | Na | Ac. |
| 2-bromo-2-nitroethyl | B | Na | OH. |
| 2-chloro-2-nitropropyl | B | Na | H. |
| 2-chloro-2-nitrobutyl | B | Na | Ac. |
| 1-trichloromethyl-2-nitroethyl | F | H | Pyridine. |
| 1-trifluoromethylethyl | A | Na | Ac. |
| 1,1-dimethyl-2,2,2-trifluoroethyl | A | Na | Ac. |
| 2-methoxyethyl | F-1 | K | Ac, pyrimidine. |
| 2-n-butoxyethyl | F-1 | K | H. |
| 3-sec-butoxypropyl | F-1 | K | Ac. |
| 4-ethoxy-n-butyl | F-1 | K | H. |
| 1,1-dimethyl-2-methoxyethyl | F-1 | K | OH. |
| 2-cyanoethyl | E | K | Ac, TEA. |
| 3-cyanopropyl | E | K | Ac, H. |
| 1-cyano-2-chloropropyl | B | K | H, OH. |
| 1-cyano-2,2-dichloropropyl | B | K | Ac. |
| 1-cyano-2,2,2-trichloroethyl | F | H | Pyridine. |
| 1-cyano-2,2,2-tribromoethyl | B | K | Ac, pyridine. |
| 1-methyl-1-(1'-cyano-1'-methylethoxy)propyl | B | K | Ac. |
| 2-acetoxyethyl | B | Na | H. |
| 2-acetoxypropyl | B | Na | OH. |
| 3-butyryloxypropyl | B | Na | Ac. |
| 4-propionyloxy-n-butyl | F | H | Isonicotinic acid. |
| Carbobutoxymethyl | B | Na | Ac, OH. |
| 2-carbethoxyethyl | B | Na | H, TBA. |
| 3-carbotutoxypropyl | V | Na | Ac. |
| 4-carbethoxybutyl | C | Na | Ac. |
| 1-trichloromethyl-2-carbomethoxyethyl | B | K | Ac. |
| 1-carbethoxy-2-chloropropyl | B | K | H. |
| 1-carbomethoxy-2,2,2-trichloroethyl | F | H | pyrimidine. |
| 1-carbethoxy-2,2-dichloroethyl | B | K | P. |
| 1-carbomethoxymethyl-2,2,2-trichloroethyl | B | K | Ac, OH. |
| Acetonyl | E | Na | Ac, H. |
| 2-oxopentyl | E | Na | Ac. |
| 1,1-dimethylacetonyl | E | Na | OH, TEA. |
| 1-acetyl-1-methylpropyl | B | Na | Ac. |
| 2-methyl-3-oxopentyl | B | Na | Ac. |
| 4-oxohexyl | F | H | 2-aminopyridine. |
| 1-methoxy-2,2,2-trichloroethyl | A | Na | Ac, H. |
| 1-ethoxy-2,2,2-trichloroethyl | A | Na | OH, TEA. |
| 1-methoxy-2,2,2-trifluoroethyl | A | Na | Ac. |
| 1-butoxy-2,2,2-trifluoroethyl | A | Na | H, TEA. |
| 2,3-diacetoxypropyl | B | K | Ac, pyridine. |
| 2,3-dicapryloxypropyl | B | K | Ac, H. |
| 2,3-distearoyloxypropyl | B | K | Ac, OH. |
| (1,2,3-tricarbomethoxy)-2-propyl | B | K | Ac. |
| (1,2,3-tricarbobutoxy)-2-propyl | B | K | H. |
| 2-chloro-3,3-dimethoxypropyl | B | K | H. |
| 1-methyl-2,2-diethoxyethyl | B | K | Ac. |
| 2-oxo-3-chloropropyl | B | Na | OH. |
| 1-trichloromethyl-3-oxobutyl | B | K | H. |
| 2-fluoroethyl | A | Na | OH. |
| 1-nitro-1-trifluoromethyl-2,2,2-trifluoroethyl | A | Na | Ac. |
| 4,4,4-trifluorobutyl | F | H | Pyrimidine. |
| Dicarbethoxyethoxymethyl | B | N | Ac. pyridine. |
| 1,1-dicarbethoxymethyl-2-ethoxyethyl | B | Na | H. |
| Carbethoxyethoxymethyl | B | Na | OH. |
| Chlorodicarbomethoxymethyl | B | Na | Ac. |
| Bromodicarbomethoxymethyl | B | Na | Ac. |
| 1-isopropoxy-2,2,2-trichloroethyl | A | Na | H, TEA. |
| 1-t-butoxy-2,2,2-trichloroethyl | A | Na | Ac. |
| Dicarbomethoxyethoxymethyl | B | Na | H, OH. |
| Phenyl | B | Na | Ac, H, pyridine. |
| o-tolyl | B | Na | Ac. |
| p-Tolyl | B | Na | H. |
| m-Ethylphenyl | B | Na | H, OH. |
| o-Isopropylphenyl | B | Na | Ac, H. |
| p-t-Butylphenyl | B | N | Ac, TEA. |
| o-Methoxyphenyl | B | Na | Ac, OH. |
| p-Methoxyphenyl | B | Na | H. |
| m-Ethoxyphenyl | B | Na | Ac. |
| p-n-Butoxyphenyl | F | H | Pyrimidine. |
| o-Chlorophenyl | A | Na | Ac, H. |
| p-Chlorophenyl | A | Na | H, TEA. |
| m-Bromophenyl | A | Na | OH. |
| p-Fluorophenyl | A | Na | Ac. |
| o-Formylphenyl | A | Na | Ac, H. |
| m-Formylphenyl | A | Na | H. |
| o-Acetylphenyl | F | H | Sulfapyridine. |
| p-Butyrylphenyl | A | Na | Ac. |
| o-Nitrophenyl | C | K | Ac, H. |
| m-Nitrophenyl | C | K | H, OH. |
| o-Carbomethoxyphenyl | C | Na | Ac, H. |
| m-Carbomethoxyphenyl | C | Na | OH. |
| p-Carbo-n-propoxyphenyl | F | H | Sulfadiazine. |
| o-Dimethylaminophenyl | F-1 | K | Ac, H. |
| o-Diethylaminophenyl | F-1 | K | H. |
| o-Di-n-butylaminophenyl | F-1 | K | OH. |
| m-di-n-Propylaminophenyl | F | K | TEA. |
| p-Methylethylaminophenyl | F-1 | K | Ac. |
| p-methylisopropylaminophenyl | F-1 | K | Ac. |
| 2,3-dimethylphenyl | D | K | H. |
| 2,5-dimethylphenyl | D | K | OH. |
| 2,4-di-n-propylphenyl | F | H | Pyridine. |
| 3-methyl-4-t-butylphenyl | B | Na | H. |
| 2,6-dimethyl-4-ethylphenyl | B | Na | OH. |
| 4,5-dimethyl-2-isopropylphenyl | B | Na | Ac. |
| 2,3,4,6-tetramethylphenyl | F | H | TMA. |
| Pentamethylphenyl | B | Na | Ac, H. |
| 2,6-dichlorophenyl | A | Na | Ac. |
| 2,6-dibromophenyl | A | Na | Ac. |
| 2,4,6-trichlorophenyl | F | H | Pyramidine. |
| 2,4,6-tribromophenyl | A | Na | Ac. |
| Pentachlorophenyl | A | Na | OH. |
| 2,4-dinitrophenyl | C | Na | Ac, H, OH. |
| Pentanitrophenyl | C | Na | Ac, TEA. |
| 2,4-difluorophenyl | A | Na | H. |
| 2,4,6-trifluorophenyl | A | Na | H, OH. |
| Pentafluorophenyl | A | Na | Ac. |
| 3-chloro-4-fluorophenyl | A | Na | H. |
| 2-bromo-4-fluorophenyl | A | Na | Ac, OH. |
| 2,6-dichloro-4-fluorophenyl | F | H | 3-hydroxypyridine. |
| 2-bromo-3,5-dichloro-4-fluorophenyl | A | Na | Ac. |
| 4-bromo-3-methoxyphenyl | A | Na | Ac, OH. |

TABLE.—Continued

| R₂ | Method | M | R₃ |
|---|---|---|---|
| 2-chloro-6-methoxyphenyl | A | Na | H. |
| 3-methoxy-2-methylphenyl | B | K | Ac, OH. |
| 2-methoxy-6-propylphenyl | B | K | H. |
| 2-carbomethoxy-5-fluorophenyl | B | K | Ac, H. |
| 5-fluoro-2-methoxyphenyl | B | K | Ac. |
| 4-acetyl-2-fluorophenyl | B | K | Ac, OH. |
| 4-chloro-2-methylphenyl | B | Na | Ac. |
| 2-bromo-6-methylphenyl | B | Na | H. |
| 2-chloro-4-isopropylphenyl | B | Na | OH. |
| 2-isobutyl-4-fluorophenyl | B | Na | Ac, H. |
| 4-chloro-2,3-dimethylphenyl | B | K | OH. |
| 4-bromo-3-isopropyl-3-methylphenyl | B | K | OH. |
| 4-chloro-2,3-diethylphenyl | B | K | OH. |
| 4,6-dibromo-2-methylphenyl | B | K | Ac, H. |
| 2,4-dichloro-3,5-dimethylphenyl | B | K | H. |
| 4-chloro-2,3,5-trimethylphenyl | B | K | Ac. |
| 4-chloro-2-nitrophenyl | B | K | H, OH. |
| 6-chloro-2,4-dinitrophenyl | B | K | Ac. |
| 3-chloro-4-fluoro-6-nitrophenyl | B | K | Ac. |
| 2,4-dibromo-3-fluoro-6-nitrophenyl | E | K | Ac. |
| 4-chloro-5-fluoro-2-nitrophenyl | E | K | Ac. |
| 4-acetyl-2-fluoro-5-nitrophenyl | E | K | Ac, H. |
| 2-acetyl-6-bromo-4-fluorophenyl | E | K | Ac, OH. |
| 2-fluoro-4-propionylphenyl | E | K | Ac. |
| 3,4-dicarbomethoxy-2,5,6-tribromophenyl | B | K | Ac, H. |
| 2-acetyl-4-chlorophenyl | B | K | Ac. |
| 2-acetyl-3,5-dichlorophenyl | A | Na | Ac. |
| 2-acetyl-6-chloro-4-methylphenyl | A | Na | Ac, OH. |
| 4-chloro-2-propionylphenyl | A | Na | Ac. |
| 2-acetyl-6-dimethylaminophenyl | F-1 | K | Ac. |
| 4-dimethylamino-2-methylphenyl | F-1 | K | Ac. |
| 4-carbomethoxy-2-dimethylaminophenyl | F-1 | K | Ac, H. |
| 4-t-butyl-3-nitrophenyl | B | Na | Ac. |
| 2-methyl-4-nitro-5-isopropylphenyl | B | Na | Ac. |
| 6-nitro-1,2,3,4-tetramethylphenyl | B | Na | Ac. |
| 2-methoxy-5-nitro-4-propylphenyl | B | Na | Ac. |
| 2-ethyl-6-methyl-4-nitrophenyl | B | Na | Ac. |
| 2,3-dimethoxyphenyl | A | Na | Ac, H, OH. |
| 3,5-dimethoxy-2-methylphenyl | A | Na | Ac. |
| 3,4,5-trimethoxyphenyl | A | Na | Ac, OH. |
| m-Acetylphenyl | F | H | TBA. |
| o-Propionylphenyl | B | K | Ac. |
| p-Propionylphenyl | B | K | H. |
| 2-carbomethoxy-4-methoxyphenyl | B | K | Ac, H. |
| 2-carbomethoxy-6-methoxyphenyl | B | K | OH. |
| 3,4-dicarbomethoxyphenyl | B | K | H. |
| 2,3-dicarbethoxyphenyl | B | K | H. |
| 2,4-dicarbomethoxy-3,5-dimethylphenyl | B | K | OH. |
| 4-carbomethoxy-2,5-dimethyl-4-methoxyphenyl | E | K | OH. |
| 4-carbomethoxy-2,6-dichlorophenyl | E | K | Ac. |
| 2-carbomethoxy-3,5-dimethoxy-4,6-dimethylphenyl | E | K | Ac. |
| 2-bromo-4-carbomethoxy-6-methoxyphenyl | E | K | H. |
| 5-carbomethoxy-2-methoxy-3-nitrophenyl | E | K | H. |
| 3-phenyl carbomethoxy-2,4-dinitro-6-methoxy | E | K | OH. |
| -indan4yl | A | Na | Ac, H, OH. |
| 5-indanyl | A | Na | Ac, H, OH. |
| 5-methyl-4-indanyl | A | Na | Ac, H. |
| 3-methyl-4-indanyl | A | Na | Ac, H. |
| 1-methyl-5-indanyl | A | Na | Ac, H. |
| 7-methyl-5-indanyl | A | Na | Ac, OH. |
| 6-t-butyl-5-indanyl | A | Na | Ac, OH. |
| 4,6-dimethyl-5-indanyl | C | Na | Ac. |
| 1,1-dimethyl-4-indanyl | C | Na | Ac. |
| 1,1,2-triethyl-4-indanyl | B | K | Ac. |
| 1,1,2,3-tetramethyl-4-indanyl | B | K | Ac. |
| 5,7-dimethyl-4-indanyl | B | K | Ac. |
| 7-chloro-4-indanyl | A | Na | Ac. |
| 7-bromo-4-indanyl | A | Na | Ac. |
| 6-chloro-5-indanyl | A | Na | Ac, H. |
| 1,1,7-trimethyl-4-indanyl | B | K | Ac. |
| 4-(1-indanyl)phenyl | B | K | Ac. |
| 2,4-(dicyclopent-2-enyl)phenyl | B | K | H. |
| 4-(α,α-dimethylbenzyl)phenyl | B | K | Ac. |
| 1-naphthyl | B | Na | Ac, H. |
| 2-naphthyl | B | Na | Ac, OH. |
| 1-(5,6,7,8-tetrahydronaphthyl) | B | Na | Ac. |
| 2-(5,6,7,8-tetrahydronaphthyl) | B | Ka | Ac. |
| 3-(2-methyl-4-pyronyl) | B | K | Ac. |
| 3-quinolyl | F-1 | K | Ac, H. |
| 5-quinolyl | F-1 | K | Ac. |
| 8-quinolyl | F-1 | K | Ac, H. |
| 5-(1,4-naphthoquinonyl) | B | Na | Ac, OH. |
| 6-(1,4-naphthoquinonyl) | B | Na | Ac. |
| 4-(coumarinyl) | C | K | Ac, H. |
| 5-(coumarinyl) | C | K | Ac. |
| 3-thianaphthenyl | B | Na | Ac. |
| 1-phenazinyl | F-1 | K | Ac, H. |
| 2-phenazinyl | F-1 | K | Ac. |
| 2-(4-methylquinolyl) | F-1 | K | Ac. |
| 1-fluorenyl | A | Na | Ac. |
| 2-fluorenyl | A | Na | Ac. |
| 7-(1,2-naphthoquinonyl) | B | K | Ac. |
| 8-isoquinolyl | F-1 | K | Ac. |
| 4-(1,3-benzodioxolyl) | B | K | Ac. |
| 5-(1,3-benzodioxolyl) | B | K | Ac, H. |
| 3-(4-pyronyl) | B | K | Ac, TEA. |
| 1-(4-methyl-5,6,7,8-tetrahydronaphthyl) | C | Na | Ac. |
| 2-(3-methyl-5,6,7,8-tetrahydronaphthyl) | C | Na | H. |
| 2-(1,6-dimethyl-5,6,7,8-tetrahydronaphthyl) | E | K | OH. |
| 1-(1,2,4-triethyl-5,6,7,8-tetrahydronaphthyl) | E | K | H. |
| 2-(5,5,5,8-tetramethyl-5,6,7,8-tetrahydronaphthyl) | E | K | Ac. |
| 4-bromo-2-carbomethoxy-5-methylphenyl | F | H | Ac. |
| 2-acetyl-6-chloro-5-methylphenyl | B | K | Ac. |
| 2-acetyl-4,5-dimethyl-6-ethylphenyl | D | Na | Ac. |
| 2-acetyl-5-dimethylaminophenyl | F-1 | K | Ac, nicotinamide. |
| 2-furyl | C | K | Ac, H. |
| 3-furyl | C | K | Ac, OH. |
| 2-(1,4-naphthoquinonyl) | B | K | Ac, H. |
| Cyclopropyl | A | Na | Ac, H. |
| Cyclopentyl | F | H | Pyridine. |
| Cyclohexyl | A | Na | Ac. |
| Cycloheptyl | A | Na | H. |
| 1-methyl-1-cyclopentyl | A | Na | OH. |
| 1,3-methyl-1-cyclopentyl | B | K | Ac. |
| 1,2,5-trimethyl-1-cyclopentyl | B | K | H. |
| 3-isopropyl-1-cyclopentyl | B | K | OH. |
| 1-ethyl-1-cyclohexyl | B | K | H. |
| 4-t-butyl-1-cyclohexyl | B | K | Ac. |
| 4,4-isopropyl-1-cyclohexyl | B | K | H. |
| 2,4-dimethyl-1-cyclohexyl | C | Na | Ac. |
| 2-chloro-1-indanyl | E | Na | Ac, H. |
| 3-bromo-1-indanyl | E | Na | OH. |
| 2-methyl-6-propyl-1-cyclohexyl | E | Na | Ac. |
| 2,6-diethyl-1-cyclohexyl | F | K | Ac. |
| 1-methyl-1-cycloheptyl | F-1 | K | Ac. |
| 1-(1,2,3,4-tetrahydronaphthyl) | F-1 | K | Ac. |
| 2-(1,2,3,4-tetrahydronaphthyl) | F-1 | K | Ac, H, OH. |
| 1-indanyl | B | K | Ac. |
| 2-indanyl | B | K | Ac, H. |
| 1-methyl-1-indanyl | B | K | H. |
| 1-ethyl-1-indanyl | B | K | H. |
| 2-bicyclo-[4.4.0]-decyl | A | Na | H, OH. |
| 3-bicyclo-[4.4.0]-decyl | A | Na | Ac. |
| 1-(1-methyl-1,2,3,4-tetrahydronaphthyl) | B | K | Ac. |
| 1-(2-chloro-1,2,3,4-tetrahydronaphthyl) | B | K | Ac. |
| 2-dimethylaminoethyl | F-1 | K | Ac, H. |
| 2-dimethylaminopropyl | F-1 | K | Ac, OH. |
| 2-piperidinoethyl | F-1 | K | Ac, H. |
| 3-morpholinopropyl | F-1 | K | Ac, H. |
| 3-thiomorpholinopropyl | F-1 | K | Ac, pyridine. |
| 2-pyrrolidinoethyl | F-1 | K | Ac, OH. |
| 2-(2-imidazolino)ethyl | F-1 | K | Ac, OH. |
| 2-pyrroloethyl | F-1 | K | Ac, OH. |
| 3-(N-methyl)piperazinopropyl | F-1 | K | Ac, OH. |
| 2-di-(n-propyl)aminopropyl | B | Na | Ac, OH. |
| 3-diisopropylaminopropyl | B | Na | Ac. |
| 3-imidazolopropyl | B | Na | Ac, H. |
| 3-(2-imidazolino)propyl | B | Na | Ac. |
| 3-(2,5-dimethylpyrrolidino)propyl | B | Na | Ac, OH. |
| 3-aziridinopropyl | B | Na | Ac, H. |
| 3-pyrrolopropyl | B | Na | Ac. |
| Aziridinomethyl | C | K | Ac. |
| Pyrrolidinomethyl | C | K | Ac, H. |
| Morpholinomethyl | C | K | Ac. |
| (1,4,5,6-tetrahydropyrimidino)methyl | C | K | Ac. |
| Pyrrolomethyl | C | K | Ac. |
| 3-diisopropylamino-2-propyl | C | K | Ac. |
| 2-dimethylamino-1-propyl | C | K | Ac. |
| 3-aziridino-2-propyl | C | K | Ac. |
| 2-(N-methylanilino)ethyl | B | Na | Ac, H. |
| 3-(N-isopropylanilino)propyl | F-1 | K | Ac, OH. |
| 3-(N-methylanilino)-2-propyl | F-1 | K | Ac. |
| 2-(N-methylanilino)-1-propyl | B | Na | Ac. |
| 3-N-ethylpiperazino-2-propyl | A | Na | Ac. |
| 3-(2-imidazolino)-2-propyl | A | Na | Ac. |
| 3-(4-methylpiperidino)-2-propyl | B | K | Ac, H. |
| 2-aziridino-1-propyl | B | K | Ac. |
| 2-morpholino-1-propyl | B | K | Ac. |
| 2-thiomorpholino-1-propyl | B | K | Ac. |
| 2-imidazolo-1-propyl | B | K | Ac. |
| 2-(1,4,5,6-tetrahydropyrimidino)-1-propyl | B | K | Ac, H. |
| 2-dipropylamino-1-propyl | B | K | Ac. |
| 2-butyramidoethyl | B | K | Ac, H. |
| 3-acetamidopropyl | B | K | Ac. |
| 2-acetamido-1-propyl | B | K | Ac, OH, TEA. |
| 2-(1,4,5,6-tetrahydropyrimidino)ethyl | F-1 | K | H. |
| 3-di-(n-propylamino)-2-propyl | F-1 | K | OH. |
| 2-diethylamino-1-propyl | F-1 | K | Ac, H. |
| 3-pyrrolidino-2-propyl | F-1 | K | |
| 3-piperidino-2-propyl | F-1 | K | Ac, OH. |
| 3-diethylamino-2-propyl | F-1 | K | Ac. |
| 3-morpholino-2-propyl | F-1 | K | Ac, OH. |
| 2-azetidinoethyl | F-1 | K | Ac. |
| 3-azetidino-2-propyl | F-1 | K | Ac. |
| 2-pyridylmethyl | B | Na | Ac. |
| 4-pyridylmethyl | B | Na | Ac, H. |
| 4-imidazolylmethyl | B | Na | Ac. |
| 2-(N-phenylimidazolyl)methyl | B | Na | Ac, H. |
| Phthalimidomethyl | B | Na | Ac. |
| Benzyl | A | Na | Ac, H, OH. |
| σ-Chlorobenzyl | A | Na | Ac, H. |
| m-Chlorobenzyl | A | Na | Ac. |
| p-Bromobenzyl | A | Na | Ac, OH. |
| m-Methylbenzyl | C | Na | Ac. |
| σ-Nitrobenzyl | C | K | Ac. |
| p-Ethoxybenzyl | C | K | Ac. |
| m-Acetylbenzyl | C | K | Ac. |
| σ-Carbomethoxybenzyl | B | Na | Ac. |
| σ-Fluorobenzyl | A | Na | Ac, H. |
| p-Dimethylaminobenzyl | F-1 | K | Ac, H. |
| Benzohydryl | B | Na | Ac, H, TEA. |
| Trityl | B | Na | Ac. |
| Cholesteryl | N | Na | Ac. |
| 2-furylmethyl | D | Na | Ac. |
| 2-pyridylmethyl | F | H | Ac. |
| 2,2-dimethyl-1,3-dioxolon-4-yl-1-methyl | B | Na | Ac. |
| 2-pyrrolidonomethyl | B | Na | Ac. |
| (4-imidazolyl)methyl | F-1 | K | Ac. |
| 2-indanylmethyl | B | Na | Ac. |

The above procedure is repeated but using the appropriate thiophenol R₇SH in place of R₂OH to produce the following cephalosporin compounds:

| R₇ | Method | M | R₃ |
|---|---|---|---|
| Phenyl | A | Na | Ac, H, OH. |
| o-Tolyl | A | Na | Ac, H. |
| m-Tolyl | A | Na | Ac. |
| p-Isopropylphenyl | B | K | Ac. |
| p-Butylphenyl | B | K | Ac, OH. |
| 3,5-dimethylphenyl | B | K | H. |
| 2,5-diethylphenyl | F | H | TBA. |
| o-Chlorophenyl | B | Na | Ac, H |
| m-Chlorophenyl | B | Na | Ac, H |
| p-Bromophenyl | B | Na | H |
| p-Fluorophenyl | B | Na | H |
| 3,4-dichlorophenyl | A | Na | OH |
| 2,4,5-trichlorophenyl | A | Na | Ac |
| 2,4,5-tribromophenyl | A | Na | Ac |
| 4-chloro-2-methylphenyl | B | Na | H |
| 3-chloro-4-methylphenyl | B | Na | H |
| 5-bromo-2-methylphenyl | B | Na | H |
| 4-chloro-3,5-dimethylphenyl | B | K | Ac, H |
| 2,4-dichloro-3-methylphenyl | A | Na | Ac |
| 2,4-difluorophenyl | A | Na | Ac |
| m-Difluorophenyl | A | Na | Ac |
| p-Methoxyphenyl | C | Na | Ac, H |
| o-Ethoxyphenyl | C | Na | Ac, OH |
| m-Ethoxyphenyl | C | Na | Ac |
| p-Isobutoxyphenyl | C | Na | Ac |
| 3-methoxy-4-methylphenyl | C | Na | Ac |
| 3-t-butyl-4-methoxyphenyl | B | K | Ac |
| 4-methoxy-3,5-dimethylphenyl | B | K | Ac |
| 3,4-dimethoxyphenyl | F | H | Ac |
| 3,4-di-isopropoxyphenyl | F | H | Ac |
| 4-methoxy-3,5-dipropylphenyl | F-1 | K | Ac |
| 4-methoxy-3,5-di-isopropoxyphenyl | F-1 | K | Ac |
| 4-chloro-3-methoxyphenyl | A | Na | Ac |
| 2-bromo-5-methoxyphenyl | A | Na | Ac |
| 4-butoxy-2-chlorophenyl | E | Na | Ac |
| 2,5-dichloro-4-ethoxyphenyl | B | K | Ac |

EXAMPLE XIII

Again following the procedures of Example X, the aryl halo carbonyl ketenes wherein the aryl group, R₁, for each of the R₂ and R₃ values given, is m-tolyl, m-methoxyphenyl, m-trifluoromethylphenyl, o-isopropylphenyl, o-chlorophenyl, o-bromophenyl, m-bromophenyl, m-chlorophenyl, o-butoxyphenyl, o-butylphenyl, o-diethylaminophenyl, p-di-(n-propyl)aminophenyl, o-dibutylaminophenyl and m-dimethylaminophenyl are converted to cephalosporin compounds.

| R₂ | Method | M | R₃ |
|---|---|---|---|
| Methyl | A | Na | H, OH. |
| Ethyl | A | Na | Ac, pyridine. |
| t-Butyl | A | Na | Ac. |
| Dodecyl | B | Na | OH. |
| Octadecyl | D | K | Ac, H. |
| 2-chloroethyl | A | Na | Ac, H. |
| 3-chloropropyl | A | Na | OH. |
| 4-chloro-1-butyl | A | Na | Ac. |
| 2,2-dimethyl-2-chloroethyl | A | Na | Ac. |
| 2-bromoethyl | B | K | H. |
| 4-bromo-1-butyl | B | K | Ac. |
| 1,3-dichloropropyl | A | Na | Ac, H. |
| 2-chloro-3-bromopropyl | A | Na | H. |
| 1,4-dibromo-2-butyl | A | Na | H. |
| 3,4-dichloro-1-butyl | A | Na | OH. |
| 2,2-dichloroethyl | A | Na | Ac, OH. |
| 2-chloro-2,3-dibromobutyl | A | Na | Ac. |
| 2,2,3,3-tetrabromopropyl | A | Na | Ac. |
| 2,2,2-trichloroethyl | A | Na | Ac, H, TEA. |
| 2,2,2-trifluoroethyl | A | Na | Ac, H, OH. |
| 2-nitroethyl | B | K | Ac, OH. |
| 3-nitropropyl | B | K | H. |
| 1-methyl-2-nitropropyl | B | K | Ac. |
| 2,2-dinitroethyl | C | Na | Ac. |
| 2-chloro-2-nitropropyl | F | H | TEA. |
| 2-bromo-2-nitropropyl | B | Na | Ac. |
| 1-methyl-2-chloro-2-nitroethyl | B | Na | Ac. |
| 1-methyl-2-bromo-2-nitroethyl | B | Na | Ac. |
| 1-trichloromethyl-2-nitroethyl | B | Na | Ac. |
| 1-trifluoromethylethyl | A | Na | Ac. |
| 2-methoxyethyl | F-1 | K | Ac, OH, TBA. |
| 2-isopropoxyethyl | F-1 | K | H. |
| 4-methoxy-n-butyl | F-1 | K | OH. |
| 4-butoxy-n-butyl | F-1 | K | Pyrimidine. |
| 2-cyanoethyl | E | K | Ac. |
| 3-cyanopropyl | E | K | H. |
| 1-cyano-2-chloropropyl | B | K | OH. |
| 1-cyano-2,2,2-trichloroethyl | B | K | Ac, H. |
| 1-cyano-2,2,2-tribromoethyl | B | K | Ac. |
| 2-acetoxyethyl | B | Na | Ac, OH. |
| 2-butyryloxyethyl | B | Na | Ac. |
| Carbomethoxymethyl | B | Na | Ac, H, pyridine. |
| 2-carbethoxyethyl | B | Na | OH. |
| 3-carbobutoxypropyl | B | Na | H. |
| 1-carbethoxypropyl | C | Na | Ac. |
| 1-chloromethyl-2-carbethoxyethyl | B | K | Ac. |
| 1-trichloromethyl-2-carbomethoxyethyl | B | K | Ac, TEA. |
| 1-carbethoxy-2-dichloropropyl | B | K | Ac, OH. |
| 1-carbomethoxy-2,2,2-trichloroethyl | B | K | Ac, H. |
| 1-carbomethoxymethyl-2,2,2-trichloroethyl | B | K | Ac. |
| Acetonyl | E | Na | Ac, OH. |
| 4-oxopentyl | E | Na | H, TPA. |
| 2-methy-3-oxobutyl | E | Na | Ac. |
| 2-acetylbutyl | B | Na | Ac, pyrimidine. |
| 1-methoxy-2,2,2-trichlorethyl | A | Na | Ac, H. |
| 1-ethoxy-2,2,2-trifluoroethyl | A | Na | Ac, OH. |
| 2,3-diacetoxypropyl | B | K | Ac, H. |
| 2,3-dicaproyloxypropyl | B | K | Ac, TBA. |
| 2,3-distearoyloxypropyl | B | K | Ac, OH. |
| (1,2,3-tricarbomethoxy)-2-propyl | B | K | Ac, H. |
| (1,2,3-tricarbobutoxy)-2-propyl | B | K | Ac. |
| 3,3-diethoxypropyl | B | K | Ac, OH. |
| 2-chloro-3,3-dimethoxypropyl | B | Na | Ac, H. |
| 2-oxo-3-chloropropyl | B | Na | Ac, OH. |
| 1-trichloromethyl-3-oxobutyl | B | K | Ac. |
| 3-fluoropropyl | A | Na | Ac, H. |
| 2,2,3,3,4,4,4-heptafluorobutyl | A | Na | Ac, pyridine. |
| 1-methoxy-2-chloro-2,2-difluoroethyl | A | Na | Ac. |
| Dicarbethoxyethoxymethyl | B | Na | Ac, H. |
| 1,1-dicarbethoxymethyl-2-ethoxyethyl | B | Na | Ac, H. |
| Carbethoxyethoxymehtyl | B | Na | Ac, OH. |
| Chlorodicarbomethoxymehtyl | B | Na | Ac, H. |
| Bromodicarbomethoxymethyl | B | Na | Ac. |
| 1-t-butoxy-2,2,2-trichloroethyl | A | Na | Ac, OH. |
| Dicarbomethoxyethoxymethyl | B | Na | Ac, OH. |
| Phenyl | B | Na | Ac, H, OH. |
| o-Tolyl | B | Na | Ac. |
| m-n-Propylphenyl | B | Na | H. |
| o-Isopropylphenyl | B | Na | H. |
| p-t-Butylphenyl | B | Na | OH. |
| o-Methoxyphenyl | B | Na | Ac. |
| m-Methoxyphenyl | B | Na | H. |
| o-Ethoxyphenyl | B | Na | Ac. |
| p-n-Butoxyphenyl | B | Na | TEA. |
| o-Chlorophenyl | A | Na | Ac, H. |
| m-Chlorophenyl | A | Na | Ac. |
| m-Bromophenyl | A | Na | H. |
| p-Fluorophenyl | F | H | Nicotine. |
| m-Formylphenyl | A | Na | H. |
| o-Acetylphenyl | A | Na | Ac, TEA. |
| p-Butyrylphenyl | A | Na | Ac, OH. |
| m-Nitrophenyl | C | K | Ac, H. |
| p-Nitrophenyl | A | K | Ac, OH. |
| p-Butylphenyl | A | Na | Ac, OH. |
| m-Nitrophenyl | C | K | Ac, H. |
| p-Nitrophenyl | C | K | Ac, OH. |
| m-Carbomethoxyphenyl | C | Na | Ac, OH. |
| o-Carbethoxyphenyl | C | Na | H. |
| p-Carbo-n-propoxyphenyl | C | Na | Ac. |
| o-Dimethylaminophenyl | F-1 | K | Ac, pyrimidine. |
| o-di-n-Butylaminophenyl | F-1 | K | Ac, H. |
| m-di-n-Propylaminophenyl | F-1 | K | Ac, OH. |
| p-Methylisopropylaminophenyl | F-1 | K | Ac. |
| 3,4-dimethylphenyl | D | K | Ac. |
| 2,6-di-n-propylphenyl | D | K | H. |
| 2,3,4-trimethylphenyl | B | Na | Ac, OH. |
| 4,5-dimethyl-2-isopropylphenyl | B | Na | Ac. |
| 2,3,4,6-tetramethylphenyl | B | Na | Ac. |
| Pentamethylphenyl | B | Na | Ac, H. |
| 2,6-dichlorophenyl | A | Na | Ac, TEA. |
| 2,4-dibromophenyl | A | Na | Ac. |
| 2,4,6-trichlorophenyl | A | Na | Ac, H. |
| 2,4,6-tribromophenyl | A | Na | Ac. |
| Pentachlorophenyl | A | Na | 3-hydroxypyridine. |
| 3,5-dinitrophenyl | C | Na | Ac. |
| Pentanitrophenyl | C | Na | Ac. |
| 2,3,5-trifluorophenyl | A | Na | Ac. |
| Pentafluorophenyl | A | Na | Ac, TEA. |
| 3-chloro-4-fluorophenyl | A | Na | Ac. |
| 2,6-dichloro-4-fluorophenyl | A | Na | Ac. |
| 4-bromo-3,5-difluorophenyl | A | Na | Ac. |
| 3-fluoro-2,4,6-trichlorophenyl | A | Na | Ac. |
| 2-methoxy-4-methylphenyl | A | Na | Ac. H, |
| 5-bromo-2-methoxyphenyl | A | Na | Ac. |
| 2-chloro-6-methoxyphenyl | A | Na | Ac. |
| 2-ethoxy-3-methylphenyl | B | K | Ac, OH. |
| 2-carbomethoxy-5-fluorophenyl | B | K | Ac, OH. |
| 5-fluoro-2-methoxyphenyl | B | K | Ac. |
| 2-acetyl-4-fluorophenyl | B | K | Ac. |
| 4-chloro-2-methylphenyl | B | Na | Ac, H. |
| 4-fluoro-3-methylphenyl | B | Na | Ac, H, TBA. |
| 6-bromo-3,4-dimethylphenyl | F | H | 2-aminopyridine. |
| 2-chloro-3,4-dimethylphenyl | B | K | H. |
| 2,4-dichloro-3,5-dimethylphenyl | B | K | OH. |
| 4-chloro-2,3,5-trimethylphenyl | B | K | H. |
| 4-chloro-2,6-dinitrophenyl | F | H | Pyridine. |
| 3-fluoro-4-nitrophenyl | B | K | Ac. |
| 4-chloro-5-fluoro-2-nitrophenyl | E | K | Ac. |
| 4-acetyl-2-fluoro-5-nitrophenyl | E | K | Ac. |
| 3,4-dicarbomethoxy-2,5,6-tribromophenyl | B | K | Ac. |
| 2-acetyl-4-chlorophenyl | B | K | Ac. |
| 2-acetyl-6-chloro-4-methylphenyl | A | Na | H. |
| 2-acetyl-6-methylaminophenyl | F-1 | K | Ac, H. |
| 4-dimethylamino-2-methylphenyl | F-1 | K | OH. |
| 4-carbomethoxy-2-dimethylaminophenyl | F-1 | K | Ac, OH. |

TABLE—Continued

| R₂ | Method | M | R₃ |
|---|---|---|---|
| 2-methoxy-5-nitro-4-propylphenyl | B | Na | Ac. |
| 2-nitro-3,4,5-trimethylphenyl | B | Na | Ac. |
| 2,6-dimethoxyphenyl | A | Na | Ac. |
| 3,5-dimethoxy-4-methylphenyl | A | Na | Ac, OH. |
| 3,5-diethoxy-2,6-dimethylphenyl | A | Na | Ac, H. |
| 3,4,5-trimethoxyphenyl | F | H | Ac, TEA. |
| m-Acetylphenyl | B | K | Ac, H. |
| o-Propionylphenyl | B | K | Ac. |
| 3-carbomethoxy-5-methoxyphenyl | B | K | Ac. |
| 3,4-dicarbethoxyphenyl | B | K | Ac, H. |
| 2,6-dicarbomethoxyphenyl | B | K | Ac, OH. |
| 4-carbomethoxy-2,5-dimethyl-4-methoxyphenyl | E | K | Ac, H. |
| 4-carbomethoxy-2,6-dichlorophenyl | E | K | Ac. |
| 4-carbomethoxy-3,5-dimethoxy-4,6-dimethylphenyl | E | K | Ac. |
| 2-bromo-4-carbomethoxy-6-methoxyphenyl | E | K | Ac. |
| 4-carbomethoxy-2-methoxy-3-nitrophenyl | E | K | Ac. |
| 3-carbomethoxy-2,4-dinitro-6-methoxyphenyl | E | K | Ac. |
| 4-indanyl | A | Na | Ac, H, OH. |
| 5-indanyl | A | Na | Ac, H, OH. |
| 5-methyl-4-indanyl | A | Na | Ac. |
| 3-methyl-4-indanyl | A | Na | Ac. |
| 1-methyl-5-indanyl | A | Na | Ac, H. |
| 6-t-butyl-5-indanyl | A | Na | Ac. |
| 4,6-dimethyl-5-indanyl | C | Na | Ac. |
| 1,1,2,3-tetramethyl-4-indanyl | B | K | Ac. |
| 5,7-dimethyl-4-indanyl | B | K | Ac. |
| 5-chloro-4-indanyl | A | Na | Ac, H. |
| 6-chloro-5-indanyl | A | Na | Ac, OH. |
| 4-(1-indanyl)phenyl | B | K | Ac. |
| 2,4-(dicyclopent-2-enyl)phenyl | B | K | Ac. |
| 4-(α,α-dimethylbenzyl)phenyl | B | K | Ac. |
| 1-naphthyl | B | Na | Ac, OH. |
| 2-naphthyl | B | Na | Ac, H. |
| 2-(5,6,7,8-tetrahydronaphthyl) | B | Na | Ac. |
| 3-(2-methyl-4-pyronyl) | B | Na | Ac. |
| 4-quinolyl | F-1 | K | Ac, H, TEA. |
| 7-quinolyl | F-1 | K | Ac, OH. |
| 5-(1,4-naphthoquinonyl) | B | Na | Ac, H. |
| 6-(1,4-naphthoquinonyl) | B | Na | Ac. |
| 6-(coumarinyl) | C | K | Ac. |
| 4-thianaphthenyl | B | Na | Ac. |
| 1-phenazinyl | F-1 | K | Ac, H. |
| 2-phenzinyl | F-1 | K | Ac. |
| 4-(6-methylquinolyl) | F-1 | K | Ac. |
| 1-fluorenyl | A | Na | Ac, H. |
| 2-fluorenyl | A | Na | Ac. |
| 6-(1,2-naphthoquinonyl) | B | Na | Ac. |
| 7-(1,2-naphthoquinonyl) | B | Na | Ac, OH. |
| 7-isoquinolyl | F-1 | K | Ac. |
| 5-(1,3-benzodioxolyl) | B | K | Ac. |
| 3-(4-pyronyl) | B | K | Ac, H. |
| 1-(3-methyl-5,6,7,8-tetrahydronaphthyl) | C | Na | Ac. |
| 2-(4-methyl-5,6,7,8-tetrahydronaphthyl) | C | Na | Ac. |
| 1-(3,4,6-trimethyl-5,6,7,8-tetrahydronaphthyl) | E | K | OH. |
| 2-(5,5,8,8-tetramethyl-5,6,7,8-tetrahydronaphthyl) | E | K | H. |
| 2-acetyl-5-dimethylaminophenyl | F-1 | K | Ac, OH. |
| 2-acetyl-5-ethoxyphenyl | B | Na | Ac, H. |
| 2-butyryl-3,5-dimethylphenyl | B | Na | Ac. |
| 2-furyl | B | K | Ac, H. |
| 3-furyl | B | K | Ac, OH. |
| Cyclopropyl | A | Na | Ac. |
| Cyclobutyl | A | Na | H. |
| Cyclopentyl | A | Na | OH. |
| Cyclohexyl | F | H | Sulfadiazine. |
| Cycloheptyl | A | Na | Ac. |
| 1-methyl-1-cyclopentyl | A | Na | H. |
| 1,3-dimethyl-1-cyclopentyl | B | K | Ac. |
| 1,2,4-trimethyl-1-cyclopentyl | B | K | Ac. |
| 1-isopropyl-1-cyclopentyl | B | K | Ac. |
| 1-methyl-1-cyclohexyl | B | K | Ac, H. |
| 4-t-butyl-1-cyclohexyl | C | K | OH. |
| 1,3-dimethyl-1-cyclohexyl | C | K | Ac. |
| 4,2,2-trimethyl-1-cyclohexyl | D | Na | Ac. |
| 3,3,5-trimethyl-1-cyclohexyl | E | Na | H. |
| 1-chloro-2-indanyl | B | K | Ac, OH. |
| 1-bromo-1-indanyl | B | K | H. |
| 2-propyl-3-methyl-1-cyclohexyl | E | Na | Ac, TMA. |
| 1-bromo-1-indanyl | B | K | H. |
| 1-propyl-3-methyl-1-cyclohexyl | E | Na | Ac, TMA. |
| 1-methyl-1-cycloheptyl | F-1 | K | Ac. |
| 1-(1,2,3,4-tetrahydronaphthyl) | F-1 | K | Ac. |
| 1-indanyl | B | K | Ac. |
| 2-indanyl | B | K | Ac. |
| 2-methyl-1-indanyl | B | K | H. |
| 1-ethyl-1-indanyl | B | K | OH. |
| 1-bicyclo-[4.4.0]-decyl | A | Na | Ac, H. |
| 1-(1-methyl-1,2,3,4-tetrahydronaphthyl) | B | K | Ac. |
| 2-(3-chloro-1,2,3,4-tetrahydronaphthyl) | B | K | Ac, H. |
| 2-piperidinoethyl | F-1 | K | Ac, H. |
| 2-morpholinoethyl | F-1 | K | Ac. |
| 3-thiomorpholinopropyl | F-1 | K | Ac, H. |
| 2-pyrrolidinoethyl | F-1 | K | Sulfathiazole. |
| 3-pyrrolopropyl | F | H | Sulfathiazole. |
| 2-(1,4,5,6-tetrahydropyrimidino)ethyl | F-1 | K | Ac. |
| 3-di-(n-propylamino)-2-propyl | F-1 | K | Ac, OH. |
| 3-pyrrolidinopropyl | F-1 | K | Ac, OH. |
| 2-dimethylaminoethyl | F | H | Ac, H, OH |
| 2-dibutylaminoethyl | F | H | Ac. |
| 2-pyrroloethyl | F | H | Ac, H. |
| 2-imidazoloethyl | F | H | Ac. |
| 2-(2,5-dimethylpyrrolidino)ethyl | F-1 | K | Ac, OH. |
| 2-azetidinoethyl | F-1 | K | Ac. |
| 2-azetidino-1-propyl | F-1 | K | Ac. |
| 2-dimethylaminopropyl | F-1 | K | Ac, OH. |
| 3-aziridinopropyl | F-1 | K | Ac. |
| 3-(N-methylpiperazino)propyl | F-1 | K | H. |
| 3-(2-imidazolino)propyl | F-1 | K | Ac. |
| 3-(1,4,5,6-tetrahydropyrimidino)propyl | F-1 | K | Ac. |
| Pyrrolidinomethyl | C | Na | OH. |
| Thiomorpholinomethyl | C | Na | H. |
| Pyrrolomethyl | C | Na | OH. |
| (2-imidazolino)methyl | F | H | TEA. |
| Piperidinomethyl | F | H | Isonicotinic acid. |
| 2-pyrrolidino-1-propyl | C | Na | Ac. |
| 2-morpholino-1-propyl | C | Na | Ac. |
| 2-pyrrolo-1-propyl | C | Na | Ac. |
| 2-imidazolo-1-propyl | C | Na | Ac. |
| 3-imidazolo-2-propyl | C | Na | Ac. |
| 3-(2-imidazolino)-2-propyl | C | Na | AC. |
| 2-(methylethylamino)ethyl | C | Na | Ac. |
| 3-(methylpropylamino)propyl | F | H | Sulfapyridine. |
| 3-(methylethylamino)-2-propyl | C | Na | Ac, H. |
| 2-(methylbutylamino)-1-propyl | C | Na | H. |
| 2-acetamidoethyl | C | Na | H. |
| 3-propionamidopropyl | C | Na | OH. |
| 3-acetamido-2-propyl | C | Na | OH. |
| 2-diethylamino-1-propyl | F-1 | K | Ac. |
| 3-pyrrolidino-2-propyl | F-1 | K | Ac, H. |
| 3-piperidino-2-propyl | F-1 | K | Ac. |
| 3-morpholino-2-propyl | F-1 | K | Ac. |
| 3-di-(n-butyl)amino-2-propyl | F-1 | K | Ac, H. |
| 3-dimethylamino-2-propyl | F-1 | K | Ac. |
| 2-(2,6-dimethylpiperidino)ethyl | F-1 | K | Ac. |
| 3-piperidinopropyl | F | H | Picolinic acid. |
| 2-(-methylanilino)ethyl | B | Na | Ac. |
| 3-(N-isopropylanilino)propyl | F-1 | K | Ac. |
| 3-(N-methylanilino)-2-propyl | F-1 | K | H. |
| 2-(N-methylanilino)-1-propyl | F-1 | K | OH. |
| 2-pyridylmethyl | F | H | Nicotinamide. |
| 4-pyridylmethyl | F | H | Pyridine. |
| 4-imidazolylmethyl | B | Na | Ac. |
| 2-(N-phenylimidazolyl)methyl | B | Na | Ac. |
| Phthalimidomethyl | B | Na | Ac. |
| 3-(N-methyl)pyridyl | F-1 | K | Ac. |
| Allyl | A | Na | Ac,H. |
| 1-penten-5-yl | B | K | OH. |
| 2-methyl-3-buten-1-yl | B | K | Ac. |
| 5-hexen-2-yl | F | H | Pryimidine. |
| 2-hepten-1-yl | D | K | Ac. |
| 1-hepten-4-yl | B | K | H. |
| 2-methyl-5-hexen-2-yl | E | K | OH. |
| 2,2,3-trimethyl-3-buten-1-yl | B | Na | Ac. |
| 4-octen-1-yl | B | Na | H. |
| Propargyl | A | Na | Ac, pyridine. |
| 1-butyn-3-yl | A | Na | H. |
| 1-pentyn-3-yl | A | Na | OH. |
| 2-hexyn-1-yl | B | Na | Ac. |
| 2-heptyn-1-yl | B | Na | Ac. |
| 5-methyl-3-hexyn-1-yl | B | Na | Ac. |
| 3-methyl-1-heptyn-3-yl | C | Na | Ac. |
| 3-octyn-1-yl | C | Na | Ac. |
| Benzyl | A | Na | Ac, H, OH. |
| p-Chlorobenzyl | A | Na | Ac, H. |
| o-Bromobenzyl | A | Na | Ac. |
| p-Methylbenzyl | B | Na | Ac. |
| o-Ethylbenzyl | B | Na | Ac. |
| m-Nitrobenzyl | C | K | Ac, H. |
| m-Methoxybenzyl | B | K | Ac, H. |
| p-Acetylbenzyl | B | Na | Ac. |
| p-Carbomethoxybenzyl | B | Na | Ac. |
| p-Fluorobenzyl | A | Na | Ac. |
| o-Dimethylaminobenzyl | F-1 | K | Ac, TEA. |
| Benzohydryl | B | Na | Ac, H. |
| Trityl | B | Na | Ac, OH. |
| Cholesteryl | D | Na | Ac, H. |
| 2-furylmethyl | B | Na | Ac. |
| [2,2-dimethyl-1,3-dioxolon-4-yl]-methyl | B | Na | Ac. |
| (2-pyrrolidono)methyl | B | Na | Ac. |
| 1-indanylmethyl | B | Na | Ac. |
| Phthalimidomethyl | F-1 | K | Ac. |

Repetition of the above procedure but using the appropriate thiophenol R₇SH in place of R₂OH produces the following cephalosporin compounds of Formula I.

| R₇ | Method | M | R₃ |
|---|---|---|---|
| Phenyl | A | Na | Ac, H, OH. |
| o-Tolyl | A | Na | Ac, pyridine. |
| m-Tolyl | A | Na | Ac. |
| o-Isopropylphenyl | B | K | Ac, OH. |
| p-Butylphenyl | B | K | Ac. |
| 2,5-dimethylphenyl | B | K | Ac. |
| 2-methyl-5-isopropylphenyl | B | K | Ac. |
| o-Chlorophenyl | B | Na | Ac, H. |
| p-Chlorophenyl | B | Na | Ac, OH. |
| m-Bromophenyl | B | Na | Ac. |
| p-Fluorophenyl | B | Na | Ac, TBA. |
| 3,4-dichlorophenyl | A | Na | Ac. |
| 2,3,5-trichlorophenyl | A | Na | Ac. |
| 2,4-dibromophenyl | A | Na | Ac. |
| 2,4,5-tribromophenyl | A | Na | Ac. |

TABLE—Continued

| $R_7$ | Method | M | $R_3$ |
|---|---|---|---|
| 4-chloro-3-methylphenyl | B | Na | H. |
| 6-chloro-3-isopropylphenyl | B | Na | H. |
| 4-bromo-3-methylphenyl | B | Na | Ac. |
| 2-chloro-3,5-dimethylphenyl | K | Na | H. |
| 4,6-dichloro-3-methylphenyl | A | Na | OH. |
| 2,4-difluorophenyl | A | Na | Ac. |
| o-Trifluoromethylphenyl | F | H | 2-aminopyridine. |
| p-Methoxyphenyl | C | Na | H. |
| o-Ethoxyphenyl | C | Na | Ac. |
| m-Ethoxyphenyl | C | Na | OH. |
| p-Butoxyphenyl | F | H | TEA. |
| 2-methoxy-3-methylphenyl | C | Na | Ac. |
| 2,5-dimethoxyphenyl | F | H | Ac. |
| 3,4-di-isopropoxyphenyl | F | H | Ac. |
| 4-methoxy-3,5-di-isopropoxyphenyl | F-1 | K | Ac, H. |
| 2-chloro-4-methoxyphenyl | A | Na | Ac, H. |
| 4-bromo-3-methoxyphenyl | A | Na | OH. |
| 4-butoxy-2-chlorophenyl | E | Na | Ac. |
| 2,5-dichloro-4-ethoxyphenyl | F | H | TMP. |

EXAMPLE XIV

The compounds of Examples X–XIII wherein $R_3$ is acetoxy are converted to cephalosporins of the $C_A$ series by the following procedure.

The appropriate cephalosporin C compounds ($R_3$= acetoxy) is mixed with water in a 1:10 proportion by weight, the pH adjusted to 6–7, if necessary, and an excess (4 to 6 fold) of the desired tertiary amine added. The mixture is heated at about 40° C. for two days, then filtered and evaporated to dryness under reduced pressure. The residue is dissolved in a minimum volume of water and re-precipitated by the addition of acetone. The crude product is purified by recrystallization from a suitable solvent, usually water.

In this manner the corresponding compounds in which the tertiary amino group is triethylamine, pyridine, pyrimidine, nicotine, sulfapyridine and picolinic acid are prepared.

EXAMPLE XV

α-Carboxybenzyl cephalosporin C

To a solution of 9.8 g. of phenylmalonic acid in 40 ml. of tetrahydrofuran there is added 10.3 g. of 1,3-dicyclohexylcarbodiimide in 40 ml. of tetrahydrofuran followed by a solution of 13.6 g. of 7-aminocephalosporanic acid (Formula II) in 300 ml. of water: tetrahydrofuran (1:1) containing sufficient sodium bicarbonate to give a pH of 7–8. The mixture is stirred at room temperature for two hours, then filtered to remove 1,3-dicyclohexylurea. The filtrate is diluted to 1000 ml. with cold water then washed at pH 4.2 (adjusted with phosphoric acid) with 2× 150 ml. of cold nitromethane to remove benzylcephalosporin C formed by decarboxylation. The aqueous layer is adjusted to pH 2.8 with phosphoric acid and extracted with 2× 200 ml. of cold nitromethane. The combined nitromethane extracts are washed with 1/10 volume of water and then extracted at pH 7. with one-half volume of water. The aqueous layer is washed with ether and lyophilized to give the mono-potassium salt of the title product.

The following cephalosporin compounds of Formula I ($X=OR_2=OH$) are prepared from the appropriate malonic acid derivative and the proper 7-aminocephalosporanic acid compound of Formula II–V.

| $R_1$ | $R_3$* |
|---|---|
| Phenyl | N, OH, pyridine, pyrimidine, TEA. |
| 3-thienyl | Ac, H, OH, TEA. |
| o-Chlorophenyl | Ac, H, OH, pyridine. |
| p-Tolyl | Ac, H, OH, nicotine. |
| p-Dimethylaminophenyl | Ac, H, OH, sulfadiazine. |
| 2-pyridyl | Ac, H, OH, pyridine. |
| 2-furyl | Ac, nicotinamide, H. |
| m-Methoxyphenyl | Ac, H, 2-aminopyridine. |

*Ac=acetoxy, TEA=triethylamine.

EXAMPLE XVI

To 250 ml. of a solution consisting of 100 ml. of 3% sodium bicarbonate and 150 ml. of acetone there is simultaneously added, over a period of 30 minutes, two separate solutions of equal volume (250 ml.); one an aqueous solution containing 6.8 g. of 7-aminocephalosporanic C acid at pH 7, and the other an acetone solution containing 6.7 g. of the diacid chloride of phenyl malonic acid. (The diacid chloride is prepared by refluxing 4.8 g. of phenyl malonic acid with 10 ml. thionyl chloride/g. of acid for 45 minutes. The excess thionyl chloride is then removed by distillation at 15 mm. pressure, the residue dissolved in benzene and again taken to dryness at 15 mm. pressure.). The reaction is run at room temperature. After one hour 250 ml. of water is added, the pH adjusted to 4.2 with aqueous phosphoric acid and the reaction mixture extracted with 2× 150 ml. of cold nitromethane to remove benzyl cephalosporin C formed by decarboxylation. The aqueous layer is retained, adjusted to pH 2.8 with aqueous phosphoric acid and extracted with 2× 200 ml. of cold nitromethane. The nitromethane extracts are combined, washed with 1/10 volume of water and the aqueous wash discarded. The nitromethane solution is then extracted with one-half volume of water, sufficient 5 N potassium hydroxide being added to bring the pH to 7.5. The aqueous layer is separated, washed with ether and lyophilized to give the mono-potassium salt of α-carboxybenzylcephalosporin C.

Additional α-substituted carboxyarylcephalosporins are prepared as their potassium salts by this procedure beginning with the dichloride of the appropriate malonic acid derivative. The novel cephalosporins thus prepared are listed below.

| $R_1$ | $R_3$ |
|---|---|
| 3-thienyl | Ac, H |
| phenyl | OH, pyrimidine |
| 4-pyridyl | Ac |
| 2-thienyl | Ac, TEA |
| 4-pyridyl | Ac, H |

EXAMPLE XVII

Monobenzylphenyl malonate (2.7 g.) and thionyl chloride (5 ml.) are heated at 65° C. on a water bath for one hour. The excess thionyl chloride is removed under reduced pressure at below 65° C. To the residue benzene (100 ml.) is added and the mixture taken to dryness as before. The residue, dissolved in acetone (10 ml.) is added to a stirred solution of 7-aminocephalosporanic C acid (2.7 g.) in normal sodium bicarbonate solution (25 ml.), water (30 ml.) and acetone (60 ml.) at 0°–5° C. for 0.5 hour and then at room temperature for 1.5 hours. The acetone is then removed by distillation under reduced pressure below 35° C. and the concentrate adjusted to pH 2 with dilute hydrochloric acid. The acid solution is extracted with ether (3× 25 ml.) and the combined ethereal extract washed with water then extracted with normal sodium bicarbonate. The weakly alkaline extract is evaporated at low temperature and pressure to give the sodium salt of α-(benzyloxycarbonyl) benzyl cephalosporin C.

Hydrogenation of this salt in water (75 ml.) using a pre-hydrogenated suspension of 10% palladium on charcoal (1 g.) in water 75 ml.) for one-half hour provides the desired α-carboxybenzyl cephalosporin C. The product is recovered by removal of the catalyst, adjustment of the remaining solution to pH 7.5 with sodium bicarbonate solution, followed by freeze drying.

EXAMPLE XVIII

α-Carboxybenzyl desacetoxy cephalosporin C

To α-carboxybenzyl penicillin potassium salt (16.7 g.) in 300 ml. of water at room temperature there is added sodium metaperiodate (8.4 g.) with stirring. The mixture is stirred for one hour then diluted with water (100 ml.) and the pH adjusted to 2.0 with dilute hydrochloric acid. The sulfoxide precipitates and is recovered by filtration, washed with water and dried.

The sulfoxide is added to sym-tetrachloroethane (125 ml.), the solution heated to reflux for 5 minutes, then taken to dryness under reduced pressure. The residue is dissolved in ethyl acetate, layered with water and adjusted to pH 7 with dilute aqueous sodium hydroxide, and the layers separated. The ethyl acetate layer is washed with water, dried and evaporated to dryness under reduced pressure.

In like manner, the following α-carboxy aryl penicillins are converted to the corresponding desacetoxy cephalosporin C compounds. Formula I, $R_3$=hydrogen, X=hydroxy and $R_1$ is:

| $R_1$ | $R_1$ |
|---|---|
| σ-chlorophenyl | m-ethoxyphenyl |
| p-chlorophenyl | σ-trifluoromethylphenyl |
| p-bromophenyl | m-tolyl |
| p-methoxyphenyl | σ-tolyl |
| 3-thienyl | |

EXAMPLE XIX

The procedure of Example XVIII is repeated but using the appropriate α-carboxy arylpenicillin ester, prepared by the procedure of Example X but using 6-aminopenicillanic acid in place of 7-aminocephalosporanic acid to produce the following desacetoxy cephalosporin C esters (Formula I, $R_3$=hydrogen; X=$OR_2$; $R_1$=aryl):

| $R_1$ | $OR_2$ |
|---|---|
| phenyl | 5-indanyloxy |
| phenyl | 2-(di-n-propylamino)ethoxy |
| phenyl | 2-(N-methylanilino)ethoxy |
| phenyl | 3-piperidinopropoxy |
| phenyl | 4-indanyl |
| σ-chlorophenyl | 2-(5,6,7,8-tetrahydronaphthyl) |
| 3-thienyl | 5-indanyl |
| phenyl | 1-ethoxy-2,2,2-trichloroethoxy |
| p-tolyl | dicarbethoxyethoxymethoxy |
| 2-pyridyl | propargyloxy |
| p-methoxyphenyl | cyclohexoxy |
| 2-furyl | m-tolyl |

EXAMPLE XX

Desacetyl α-carboxybenzyl cephalosporin C potassium salt

A solution of α-carboxybenzylcephalosporin C (4.4 g.) in 250 ml. of water is adjusted to pH 7 by addition of aqueous potassium hydroxide. A 25% by volume of 0.1 M phosphate buffer (pH 7) is added followed by 50% by volume of the original solution of citrus acetyl esterase solution, prepared as described in Example 9 of U.S. Pat. 3,270,009. The mixture is then diluted with an equal volume of water and held at 37° C. and pH 7 (by addition of aqueous KOH) for six hours.

The mixture is then layered with ethyl acetate, adjusted to pH 2 with dilute (1 N) hydrochloric acid and thoroughly agitated. The ethyl acetate extract is separated and brought to pH 6.0 by aqueous potassium hydroxide. The aqueous layer is separated and freeze-dried.

The α-carboxy-α-aryl cephalosporin C compounds of Example XV are similarly converted to their corresponding desacetyl derivatives.

EXAMPLE XXI

Desacetoxy α-carboxybenzyl cephalosporin C

α-Carboxybenzyl cephalosporin C (1.25 g.) in 150 ml. of dioxane is contacted at room temperature with hydrogen at 1500 p.s.i. in the presence of 5.0 g. of 10% palladium-on-charcoal. When hydrogenation is complete the solution is filtered then evaporated to dryness under reduced pressure.

In like manner the α-carboxy-α-aryl cephalosporin C compounds of Example XV are converted to the corresponding desacetoxy α-carboxy-α-aryl cephalosporin C compounds.

EXAMPLE XXII

The sodium and potassium salts of Examples X–XIII, XV–XVII and XX are converted to the corresponding acids by careful neutralization of aqueous solutions of their salts with aqueous phosphoric acid followed by extraction of the acid form into methylisobutylketone. The methylisobutylketone solutions are washed with water, dried with anhydrous sodium sulfate, filtered and evaporated to give the free acids.

EXAMPLE XXIII

The free acids of Examples X–XIII and XXII are converted to their calcium, magnesium, ammonium, procaine, N,N'-dibenzylethylenediamine, N-ethylpiperidine, dibenzylamine, 1-ephenamine, triethylamine, N-benzyl-β-phenethylamine, N,N - bis(dehydroabietyl)ethylenediamine, and benzhydrylamine salts by reaction of aqueous solutions thereof with one equivalent of the appropriate base. The salts are recovered by freeze drying.

EXAMPLE XXIV

The benzyl and substituted benzyl esters of Examples X–XIV are converted to their corresponding free acids by catalytic hydrogenation at room temperature. The general procedure comprises hydrogenating the benzyl ester in water in the presence of a suspension of prehydrogenated 10% palladium on charcoal until hydrogenation is complete. For every 0.05 mole of benzyl ester used, 5.7 g. of catalyst and 1000 ml. of water are used.

When hydrogenation is complete as determined by the hydrogen uptake, the reaction mixture is filtered, the filtrate adjusted to pH 7.5 with sodium or potassium bicarbonate then evaporated to dryness under reduced pressure and below 40° C.

The products are purified by column chromatography on cellulose and eluted with butanol-ethanol-water mixture and recovered from the eluate by evaporation of the solvent.

EXAMPLE XXV

Hydrolysis procedures for conversion of α-carboxy ester groups to α-carboxy groups (A) A solution of the sodium salt of α-[carbo(5-indanyloxy)]benzyl cephalosporin C in water (0.5 g. in 5 ml.) is held at room temperature for 24 hours. The pH is automatically regulated at 7.0–7.2 by the addition of sodium bicarbonate. The solution is then freeze dried and the by-product phenol removed by trituration of the residue with ethanol to give the disodium salt.

Reptition of this procedure but at 35° C. for two hours also produces the disodium salt.

(B) A solution of the sodium salt of desacetyl α-[carbo-(1-ethoxy-2,2,2-trichloroethoxy)]benzyl cephalosporin C (0.5 g.) in a small volume of saturated aqueous sodium bicarbonate (5 ml.) is stirred at room temperature. Samples are withdrawn at 10 minutes, 30 minutes and then at half-hour intervals and examined by paper chromatography in the system isoamyl acetate:citrate-phosphate buffer (pH 4.5) and by bioautographs (*Bacillus subtilis*). The samples are also extracted with chloroform (3×3 ml.), the combined extracts concentrated and the concentrate and the spent aqueous sample examined by paper chromatography and bioautographs.

Hydrolysis of the ester is essentially complete within two hours as evidenced by the absence of the ester on the papergram and the presence of desacetyl α-carboxy benzyl cephalosporin C.

(C) To desacetoxy α-carbo[(2 - N-methylanilino)-ethoxy]benzyl cephalosporin C sodium salt (0.1 g.) in chloroform (5 ml.) there is added a solution of citrate buffer (pH 5.5, 5m l.) and the resulting mixture thoroughly shaken for 75 minutes. The major product observed is α-carboxybenzyl penicillin. A small amount of benzyl penicillin, its degradation product, is also present.

The desacetoxy α-carboxy benzyl cephalosporin C is isolated by lyophilization and the crude product further purified by chromatography on Sephadex LH 20 (a crosslinked dextrose available from HB Pharmacia, Uppsala, Sweden).

(D) A solution of the sodium salt of α-[carbo-(2-di-(n-propyl)amino)-ethoxy]benzyl cephalosporin C in water (0.5 g. in 5 ml.) is held at room temperature for 24 hours. The pH is automatically regulated at 7.0–7.2 by the addition of sodium bicarbonate. The solution is then freeze dried and the by-product phenol removed by trituration of the residue with ethanol to give the disodium salt.

Repetition of this procedure but at 35° C. for two hours also produces the disodium salt.

PREPARATION A

Malonic acids

The following aryl malonic acids not previously described in the literature are prepared by the method of Wallingford et al., J. Am. Chem. Soc. 63, 2056–2059 (1964) which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture. The esters thus produced are hydrolyzed to the acid by known methods.

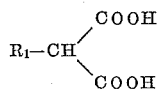

| $R_1$ | $R_1$ |
|---|---|
| o-methoxyphenyl | 3-pyridyl |
| m-methoxyphenyl | 4-pyridyl |
| p-methoxyphenyl | o-butoxyphenyl |
| o-trifluoromethylphenyl [1] | o-dimethylaminophenyl |
| m-trifluoromethylphenyl | o-diethylaminophenyl |
| p-trifluoromethylphenyl | m-dimethylaminophenyl |
| o-isopropylphenyl | p-dimethylaminophenyl |
| 3-furyl | |

[1] The necessary o-trifluoromethylphenylacetic acid is prepared from trifluoromethylbenzonitrile by the procedure of Corse et al., J. Am. Chem. Soc. 70, 2841 (1948) which comprises: (a) conversion of the nitrile to o-trifluoromethylacetophenone by a Grignard reaction with methylmagnesium iodide followed by hydrolysis; (b) reaction of the acetophenone with sulfur and morpholine at 135° C. for 16 hours followed by treatment with glacial acetic acid and hydrochloric acid.

PREPARATION B

Aminoisopropanols

The following aminoisopropanols are prepared by the reaction of propylene oxide with the appropriate amine. The procedure in general comprises reacting the propylene oxide with an aqueous solution of the amine in a 1.0 to 1.4 molar ratio in a sealed tube. The sealed tube is shaken and allowed to stand overnight, then heated to 80° C. for six hours, then at 95° C. for four hours. The tube is then cooled, the contents removed and the aminoisopropanol salted out with potassium carbonate.

The product, if liquid, is separated, dried with solid potassium hydroxide then distilled under reduced pressure. The product, if solid, is filtered off and recrystallized from a suitable solvent.

| $NR_5R_6$ | $NR_5R_6$ |
|---|---|
| dimethylamino | piperidino |
| diethylamino | pyrrolidino |
| di-n-propylamino | pyrrolo |
| diisopropylamino | morpholino |
| di-n-butylamino | thiomorpholino |
| 1,4,5,6-tetrahydropyrimidino | imidazolino |
| N-ethylpiperazino | imidazolidino |

PREPARATION C

2-aminopropanols

The following 2-aminopropanols having the formula

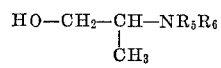

wherein $NR_5R_6$ represents a di(lower alkyl)amino or a heterocyclic group are prepared by the procedure of Moffett, Org. Syn. Coll. vol. IV, p. 834 which comprises lithium aluminum hydride reduction of the appropriate precursor ester of the formula

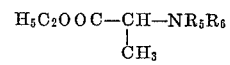

said esters being prepared as described by Moffett, Org. Syn. Coll. vol. IV, p. 466 by reaction of the desired amine with ethyl α-bromopropionate.

| $-NR_5R_6$ | $-NR_5R_6$ |
|---|---|
| di(n-propyl)amino | piperidino |
| di(n-butyl)amino | morpholino |
| diisopropylamino | thiomorpholino |
| 1,4,5,6-tetrahydropyrimidino | pyrrolo |
| N-methylpiperazino | imidazolino |
| N-n-butylpiperazino | imidazolidino |

PREPARATION D

Preparation of (lower)alkylsulfinylalkanols

The appropriate (lower)alkylmercaptoalkanol is mixed with an equimolar proportion of m-chloroperbenzoic acid in sufficient chloroform to permit easy stirring. The mixture is refluxed for two hours, then cooled overnight and filtered to remove m-chlorobenzoic acid. The filtrate is then concentrated to about one-third volume, allowed to stand overnight and again filtered to remove m-chlorobenzoic acid. The filtrate is added to water (3 to 4 ml. per ml. of filtrate), stirred thoroughly and again filtered. The product is recovered from the filtrate by removal of the solvent. In this manner the following compounds are prepared:

$$HO-Z_1-\overset{O}{\underset{\|}{S}}-R_1$$

| $Z_1$ | $R^1$ |
|---|---|
| —CH$_2$—CH$_2$— | CH$_3$ |
| —CH$_2$—CH$_2$— | C$_2$H$_5$ |
| —CH$_2$—CH$_2$— | C$_4$H$_9$ |
| —CH$_2$—CH$_2$— | i-C$_4$H$_9$ |
| —CH$_2$—CH$_2$—CH$_2$— | C$_3$H$_7$ |
| —CH$_2$—CH$_2$—CH$_2$—CH$_2$— | C$_2$H$_5$ |
| —CH$_2$—CH(CH$_3$)— | CH$_3$ |

Other peracids such as acetic acid, performic acid and monoperphthalic acid, and hydrogen peroxide in glacial acetic acid can be used in place of m-chloroperbenzoic acid. This latter peracid is, however, favored since the by-product m-chlorbenzoic is easily removed and over-oxidation of the mercaptan to the dioxide avoided.

PREPARATION E

Preparation of (lower)alkylsulfinylalkanols (1) The desired (lower)alkylmercaptoalkanol is oxidized according to the method of Preparation D but using two molar proportions of m-chlorobenzoic acid instead of one as oxidizing agent.

(2) Alternatively, the (lower)alkylsulfinylalkanols of preparation D are further oxidized with an equimolar proportion of m-chloroperbenzoic acid to the corresponding sulfonyl compounds. The former method is preferred because of the greater availability of the initial mercaptans relative to the sulfinyl compounds.

The following compounds are thus prepared:

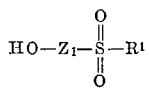

| $Z_1$ | $R_7$ | Method |
|---|---|---|
| —CH$_2$—CH$_2$— | CH$_3$ | 1 |
| —CH$_2$—CH$_2$— | C$_2$H$_5$ | 2 |
| —CH$_2$—CH$_2$— | C$_4$H$_9$ | 1 |
| —CH$_2$—CH$_2$—CH$_2$— | C$_3$H$_7$ | 1 |
| —CH$_2$—CH$_2$—CH$_2$—CH$_2$— | C$_2$H$_5$ | 1 |
| —CH$_2$—CH(CH$_3$)— | CH$_3$ | 1 |

What is claimed is:

1. A compound of the formula:

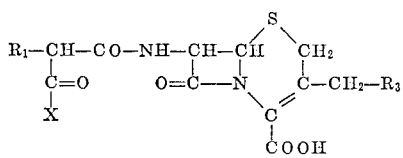

and the pharmaceutically acceptable salts thereof wherein $R_3$ is selected from the group consisting of hydrogen, hydroxy, acetoxy and tertiary amino;

$R_1$ is selected from the group consisting of thienyl, furyl, pyridyl, phenyl and substituted phenyl wherein the substituent is selected from the group consisting of (lower alkyl), chloro, bromo, (lower)alkoxy, di(lower) alkylamino and trifluoromethyl; and X is selected from the group consisting of —OR$_2$ and —SR$_7$ wherein $R_2$ is selected from the group consisting of:

phenyl
  substituted phenyl wherein the substituent is selected from the group consisting of at least one of chloro, bromo, fluoro, lower alkyl, lower alkoxy, lower alkanoyl, carbo(lower)alkoxy, and di(lower)alkyl amino;
  furyl
  quinolyl
  methyl substituted quinolyl
  phenazinyl
  (1,3-benzodioxolyl)
  3-(2-methyl-4-pyronyl)
  3-(4-pronyl) and
  N-(methylpyridyl;

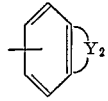

wherein $Y_2$ is selected from the group consisting of:

—CH=CH—O—
  —CH=CH—S—
  —CH$_2$—CH$_2$—S—
  —CH=N—CH=CH—
  —CH=CH—CH=CH—
  —C(O)—CH=CH—C(O)—
  —C(O)—C(O)—CH=CH—;

and

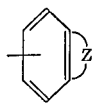

wherein Z is lower alkylene and is selected from the group consisting of —(CH$_2$)$_3$— and —(CH$_2$)$_4$—, and substituted derivatives thereof wherein the substituent is selected from the group consisting of methyl, chloro and bromo; $R_2$ is also selected from benzyl and
  substituted benzyl wherein the substituent is selected from the group consisting of chloro, bromo, fluoro, lower alkyl, lower alkoxy, lower alkanoyl, carbo(lower)alkoxy, nitro, and di(lower) alkylamino;
  phthalimidomethyl
  benzohydryl
  trityl
  cholesteryl
  alkenyl having up to 8 carbon atoms
  alkynyl having up to 8 carbon atoms
  (1-indanyl)methyl
  (2-indanyl)methyl
  furylmethyl
  pyridylmethyl
  (2-pyrrolidono)methyl
  (4-imidazolyl)methyl
  [2,2-di(lower alkyl)-1,3-dioxolon-4-yl]methyl
  cycloalkyl and (lower alkyl)substituted cycloalkyl having from 3 to 7 carbon atoms in the cycloalkyl moiety;
  bicyclo [4·4·0] decyl
  substituted lower alkyl wherein the substituent is selected from the group consisting of at least one of:

chloro
  bromo
  fluoro
  nitro
  carbo(lower alkoxy)
  lower alkanoyl
  lower alkoxy
  cyano
  (lower)alkylmercapto
  (lower)alkylsulfinyl
  (lower)alkylsulfonyl ac-indanyl and substituted derivatives thereof wherein the substituent is selected from the group consisting of methyl chloro and bromo;
  ac-tetrahydronaphthyl and substituted derivatives thereof wherein the substituent is selected from the group consisting of methyl, chloro and bromo;

—CH$_2$—CH$_2$—NR$_5$R$_6$
  —CH$_2$—CH$_2$—CH$_2$—NR$_5$R$_6$
  —CH$_2$—CH(CH$_3$)—NR$_5$R$_6$ and
  —CH(CH$_3$)—CH$_2$—NR$_5$R$_6$ wherein —NR$_5$R$_6$ is selected from the group consisting of —NH(lower alkanoyl),

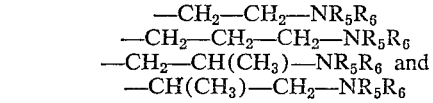

wherein the (lower alkyl) groups may be alike or different; —N(lower alkyl)anilino and substituted —N(lower alkyl)anilino wherein the substituent is selected from the group consisting of chloro, bromo, lower alkyl and lower alkoxy; and —(lower alkylene)—Y$_1$ wherein (lower alkylene) contains from 1 to 3 carbon atoms; and $Y_1$ is selected from the group consisting of:

azetidino
  aziridino
  pyrrolidino
  piperidino
  morpholino
  thiomorpholino
  N-(lower alkyl)piperazino
  pyrrolo
  imidazolo
  2-imidazolino
  2,5-dimethylpyrrolidino
  1,4,5,6-tetrahydropyrimidino
  4-methylpiperidino and
  2,6-dimethylpiperidino;

and $R_7$ is selected from the group consisting of hydrogen, phenyl and mono-, di-, and tri-substituted phenyl wherein the substituent is selected from the group consisting of at least one of chloro, bromo, fluoro, lower alkyl, lower alkoxy and trifluoromethyl.

2. The compound of claim wherein $R_1$ is phenyl, X is —$OR_2$ wherein $R_2$ is substituted phenyl, $R_3$ is hydrogen, and the pharmaceutically acceptable salts thereof.

3. The compound of claim 1 wherein $R_1$ is phenyl, X is —$OR_2$ wherein $R_2$ is substituted (lower)alkyl, $R_3$ is tertiary amino and the pharmaceutically acceptable salts thereof.

4. The compound of claim 1 wherein $R_1$ is thienyl, X is —$OR_2$ wherein $R_2$ is

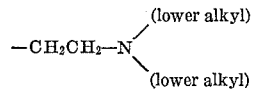

$R_3$ is acetoxy and the pharmaceutically acceptable salts thereof.

5. The compound of claim 1 wherein $R_1$ is substituted phenyl, X is $OR_2$ wherein $R_2$ is substituted phenyl, $R_3$ is acetoxy and the pharmaceutically acceptable salts thereof.

6. The compound of claim 1 wherein $R_1$ is phenyl, X is $OR_2$ wherein $R_2$ is ac-indanyl, $R_3$ is hydrogen and the pharmaceutically acceptable salts thereof.

7. The compound of claim 1 wherein $R_1$ is phenyl, X is $OR_2$ wherein $R_2$ is —$CH_2CH_2$—N(lower alkyl)$_2$, $R_3$ is hydrogen and the pharmaceutically acceptable salts thereof.

8. The compound of claim 2 wherein $R_1$ is phenyl, $R_2$ is σ-isopropylphenyl, $R_3$ is hydrogen and the pharmaceutically acceptable salts thereof.

9. The compound of claim 3 wherein $R_1$ is phenyl, $R_2$ is 1-ethoxy 2,2,2-trichloroethyl, $R_3$ is pyridine and the pharmaceutically acceptable salts thereof.

10. The compound of claim 4 wherein $R_1$ is 3-thienyl, $R_2$ is —$CH_2CH_2N(C_3H_7)_2$, $R_3$ is acetoxy and the pharmaceutically acceptable salts thereof.

11. The compound of claim 5 wherein $R_1$ is σ-chlorophenyl, $R_2$ is 4-chloro-2,3-dimethylphenyl, $R_3$ is acetoxy and the pharmaceutically acceptable salts thereof.

12. The compound of claim 6 wherein $R_1$ is phenyl, $R_2$ is 5-indanyl, $R_3$ is hydrogen and the pharmaceutically acceptable salts thereof.

13. The compound of claim 7 wherein $R_1$ is phenyl, $R_2$ is —$CH_2CH_2N(C_3H_7)_2$, $R_3$ is hydrogen and the pharmaceutically acceptable salts thereof.

References Cited

UNITED STATES PATENTS

| 3,351,597 | 11/1967 | Higgins | 260—243 C |
| 3,338,897 | 8/1967 | Tekano et al. | 260—243 C |
| 3,341,532 | 9/1967 | Lewis et al. | 260—243 C |

OTHER REFERENCES

Wertheim, Texabook of Organic Chemistry, pages 291–292, Second Edition (1945).

Ferguson, Textbook of Organic Chemistry, page 327, Second Edition (1965).

NICHOLAS S. RIZZO, Primary Examiner

U.S. Cl. X.R.

424—246